United States Patent
Hirosawa et al.

(10) Patent No.: US 11,498,563 B2
(45) Date of Patent: Nov. 15, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Nozomu Hirosawa, Wako (JP); Tadahiko Kanoh, Wako (JP); Kanta Tsuji, Wako (JP); Atsushi Ishioka, Wako (JP); Daichi Kato, Wako (JP); Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 306 days.

(21) Appl. No.: 16/817,645

(22) Filed: Mar. 13, 2020

(65) Prior Publication Data

US 2020/0307593 A1 Oct. 1, 2020

(30) Foreign Application Priority Data

Mar. 28, 2019 (JP) .............................. JP2019-063987

(51) Int. Cl.
*B60W 30/00* (2006.01)
*B60W 30/18* (2012.01)
(Continued)

(52) U.S. Cl.
CPC ...... *B60W 30/18163* (2013.01); *B60W 10/04* (2013.01); *B60W 10/20* (2013.01);
(Continued)

(58) Field of Classification Search
None
See application file for complete search history.

(56) References Cited

U.S. PATENT DOCUMENTS 8,346,473 B2 * 1/2013 Nakamura ............. G01C 21/30
  701/28
8,892,356 B1 * 11/2014 Weiland .................. G01C 21/26
  701/454
(Continued)

FOREIGN PATENT DOCUMENTS

JP 2018-105692 7/2018

OTHER PUBLICATIONS

Japanese Office Action for Japanese Patent Application No. 2019-063987 dated May 31, 2022.

*Primary Examiner* — Jonathan M Dager
(74) *Attorney, Agent, or Firm* — Amin, Turocy & Watson, LLP

(57) ABSTRACT

A vehicle control device includes a recognizer configured to recognize situations around a vehicle; a determiner configured to determine any of lanes included in a road on which the vehicle travels as a reference lane; and a driving controller configured to control at least one of a speed and steering of the vehicle according to the situations recognized by the recognizer and the reference lane determined by the determiner, wherein the determiner is configured to, when the vehicle moves from a first road to a second road different from the first road, among a plurality of lanes included in the first road, according to a relative position of a first reference lane determined at a time before the vehicle moves to the second road with respect to the plurality of lanes, determine a second reference lane on the second road.

23 Claims, 42 Drawing Sheets

(51) Int. Cl.
  *B60W 10/04* (2006.01)
  *B60W 10/20* (2006.01)
  *B60W 50/10* (2012.01)

(52) U.S. Cl.
  CPC ......... *B60W 50/10* (2013.01); *B60W 2520/10* (2013.01); *B60W 2552/10* (2020.02); *B60W 2720/10* (2013.01)

(56) References Cited

U.S. PATENT DOCUMENTS

| | | | | |
|---|---|---|---|---|
| 9,672,734 | B1* | 6/2017 | Ratnasingam | H04W 4/44 |
| 11,022,457 | B2* | 6/2021 | Fowe | G06V 20/588 |
| 11,079,762 | B2* | 8/2021 | Matsunaga | B60W 30/18154 |
| 11,155,249 | B2* | 10/2021 | Ben Shalom | B60T 7/22 |
| 11,161,504 | B2* | 11/2021 | Yanagihara | B60W 30/18159 |
| 11,225,257 | B2* | 1/2022 | Okuyama | G01C 21/26 |
| 11,260,849 | B2* | 3/2022 | Zhu | B60W 10/18 |
| 11,267,468 | B2* | 3/2022 | Mizoguchi | B60W 30/18163 |
| 2011/0098922 | A1* | 4/2011 | Ibrahim | B60W 40/08 701/532 |
| 2013/0304279 | A1* | 11/2013 | Mudalige | G08G 1/164 701/2 |
| 2014/0278052 | A1* | 9/2014 | Slavin | G01C 21/3492 701/400 |
| 2015/0345967 | A1* | 12/2015 | Meuleau | G01C 21/3453 701/25 |
| 2016/0229409 | A1* | 8/2016 | Pascheka | B60W 30/18154 |
| 2016/0341561 | A1* | 11/2016 | Woolley | G01C 21/3658 |
| 2016/0347327 | A1* | 12/2016 | Kondo | B60W 50/0098 |
| 2017/0082452 | A1* | 3/2017 | Sumizawa | B60W 60/001 |
| 2017/0113665 | A1* | 4/2017 | Mudalige | G08G 1/166 |
| 2017/0247054 | A1* | 8/2017 | Lee | B62D 13/00 |
| 2018/0143643 | A1* | 5/2018 | Fairfield | G01C 21/3469 |
| 2019/0018419 | A1 | 1/2019 | Lee et al. | |
| 2019/0111930 | A1* | 4/2019 | Katsura | B60W 30/18154 |
| 2019/0171206 | A1* | 6/2019 | Abrams | B60W 30/18154 |
| 2019/0184990 | A1* | 6/2019 | Lee | B60W 30/143 |
| 2019/0265059 | A1* | 8/2019 | Warnick | G08G 1/20 |
| 2020/0047771 | A1* | 2/2020 | Yoon | B60W 50/08 |
| 2020/0064846 | A1* | 2/2020 | Chen | G01C 21/32 |
| 2020/0126405 | A1* | 4/2020 | Wette | G06V 20/59 |
| 2020/0184233 | A1* | 6/2020 | Berberian | G06T 7/74 |
| 2020/0278684 | A1* | 9/2020 | Naserian | G05D 1/0221 |
| 2021/0094547 | A1* | 4/2021 | Garcia | B60W 30/18109 |
| 2021/0107566 | A1* | 4/2021 | Seegmiller | B60W 30/18163 |
| 2021/0213953 | A1* | 7/2021 | Yarmohamadi | B60W 50/14 |
| 2021/0364305 | A1* | 11/2021 | Rizk | G06V 20/588 |
| 2021/0372810 | A1* | 12/2021 | Hato | G08G 1/0962 |
| 2021/0381849 | A1* | 12/2021 | Aviel | H04N 7/18 |
| 2022/0001872 | A1* | 1/2022 | Taieb | B60W 40/06 |
| 2022/0082403 | A1* | 3/2022 | Shapira | G01C 21/3896 |

\* cited by examiner

FIG. 11

Please, operate second switch
when auto lane changing (ALC) is performed

VEHICLE CONTROL DEVICE, VEHICLE CONTROL METHOD, AND STORAGE MEDIUM

CROSS-REFERENCE TO RELATED APPLICATION

This application is based upon and claims the benefit of priority from Japanese Patent Application No. 2019-063987, filed Mar. 28, 2019, the entire content of which is incorporated herein by reference.

BACKGROUND

Field of the Invention

The present invention relates to a vehicle control device, a vehicle control method, and a storage medium.

Description of Related Art

In recent years, studies have been conducted on automatically controlling driving of a vehicle (hereinafter referred to as automated driving). In connection with this, a technology in which a lane in which a vehicle is traveling when automated driving starts is determined as a default lane, and the vehicle is automatically driven along the default lane is known (for example, refer to Japanese Unexamined Patent Application, First Publication No. 2018-105692).

SUMMARY

However, in the related art, when a vehicle enters another road via a junction from a road on which the vehicle is currently traveling, a relative position of a reference lane on the road changes between before and after in automated driving when the vehicle moves on the two different roads. As a result, an occupant of the vehicle may have a feeling of unease.

According to aspects of the present invention, there are provided a vehicle control device, a vehicle control method, and a storage medium through which it is possible to perform automated driving in which an occupant is unlikely to feel uncomfortable.

The vehicle control device, the vehicle control method, and the storage medium according to the present invention have the following configurations.

According to Aspect (1) of the present invention, there is provided a vehicle control device which includes a recognizer configured to recognize situations around a vehicle; a determiner configured to determine any of lanes included in a road on which the vehicle travels as a reference lane; and a driving controller configured to control at least one of a speed and steering of the vehicle according to the situations recognized by the recognizer and the reference lane determined by the determiner, wherein the determiner is configured to, when the vehicle moves from a first road to a second road different from the first road, among a plurality of lanes included in the first road, according to a relative position of a first reference lane determined at a time before the vehicle moves to the second road with respect to the plurality of lanes, determine a second reference lane on the second road.

According to Aspect (2), in the vehicle control device according to Aspect (1), the determiner is configured to determine the second reference lane according to a relative position of the first reference lane when the number of lanes of the first road and the number of lanes of the second road are the same.

According to Aspect (3), in the vehicle control device according to Aspect (2), when the n-th lane out of lanes in one direction among a plurality of lanes included in the first road is determined as the first reference lane, the determiner is configured to determine the n-th lane out of lanes in the one direction among a plurality of lanes included in the second road as the second reference lane.

According to Aspect (4), in the vehicle control device according to Aspect (1) or (2), when the number of lanes of the first road is different from the number of lanes of the second road, the determiner is configured to determine the second reference lane according to a relative position of the first reference lane and predetermined regulations applying to the first road and the second road.

According to Aspect (5), in the vehicle control device according to Aspect (4), when the number of lanes of the second road is larger than the number of lanes of the first road and the n-th lane out of lanes determined by the predetermined regulations among a plurality of lanes included in the first road is determined as the first reference lane, the determiner is configured to determine the n-th lane out of lanes determined by the predetermined regulations among a plurality of lanes included in the second road as the second reference lane.

According to Aspect (6), in the vehicle control device according to Aspect (4), when the number of lanes of the second road is fewer than the number of lanes of the first road, and the n-th lane from the outermost lane opposite to the lane determined by the predetermined regulations among a plurality of lanes included in the first road is determined as the first reference lane, the determiner is configured to determine the n-th lane counted from the outermost lane opposite to the lane determined by the predetermined regulations among a plurality of lanes included in the second road as the second reference lane.

According to Aspect (7), in the vehicle control device according to Aspect (5) or (6), when a ratio between the number of lanes of the first road and the number of lanes of the second road is equal to or larger than a first threshold value which is smaller than 1 or less than a second threshold value which is larger than 1, the determiner is configured to determine the second reference lane.

According to Aspect (8), in the vehicle control device according to any one of Aspects (1) to (7), if the number of lanes of the first road is different from the number of lanes of the second road, when the second reference lane in the second road is determined, the determiner is configured to reduce a degree of correspondence of a relative position of the first reference lane.

According to Aspect (9), in the vehicle control device according to any one of Aspects (1) to (8), when a ratio between the number of lanes of the first road and the number of lanes of the second road is less than a first threshold value which is smaller than 1 or equal to or larger than a second threshold value which is larger than 1, the determiner is configured to determine the second reference lane so that a relative position of the first reference lane in the first road and a relative position of the second reference lane in the second road match.

According to Aspect (10), in the vehicle control device according to any one of Aspects (1) to (9), the determiner is configured to determine the second reference lane according to a relative position of the first reference lane at a position a predetermined distance away from a connection point between the first road and the second road.

According to Aspect (11), in the vehicle control device according to Aspect (10), among the plurality of lanes included in the first road, at the connection point, when a lane connected to a junction connecting the first road and the second road is closer to a lane determined by predetermined regulations than the first reference lane, the determiner is configured to set the predetermined distance to be longer than when the lane connected to the junction is farther from a lane determined by the predetermined regulations than the first reference lane.

According to Aspect (12), in the vehicle control device according to any one of Aspects (1) to (11), when a speed at which the vehicle passes along the first road is different from a speed at which the vehicle passes along the second road, the determiner is not configured to determine the second reference lane according to a relative position of the first reference lane.

According to Aspect (13), in the vehicle control device according to any one of Aspects (1) to (12), when an entering lane in which the vehicle enters from the first road is different from the second reference lane among a plurality of lanes included in the second road, the driving controller is configured to determine a control mode of a lane change from the entering lane to the second reference lane according to a relative position between the entering lane and the second reference lane.

According to Aspect (14), in the vehicle control device according to Aspect (13), the driving controller is configured to reduce a traveling speed or a traveling distance when lanes are changed from the entering lane to the second reference lane compared to when left-hand traffic regulations are applied to the first road and the second road, when the second reference lane is a lane on the left side of the entering lane, or when the second reference lane is a lane on the right side of the entering lane, and reduce a traveling speed or a traveling distance when lanes are changed from the entering lane to the second reference lane compared to when a right-hand traffic regulations are applied to the first road and the second road, when the second reference lane is a lane on the right side of the entering lane, or when the second reference lane is a lane on the left side of the entering lane.

According to Aspect (15), the vehicle control device according to any one of Aspects (1) to (14) further includes a detector configured to detect an instruction to change lanes issued from an occupant of the vehicle, wherein, when the detector detects the instruction, the driving controller is configured to control a speed and steering of the vehicle, and causes the vehicle to change lanes to the lane instructed by the occupant, and wherein, when the first reference lane determined at a time before the vehicle moves to the second road is the lane instructed by the occupant, the determiner is configured to determine the second reference lane according to a relative position of the first reference lane.

According to Aspect (16), in the vehicle control device according to any one of Aspects (1) to (15), when the number of lanes of the second road is equal to or larger than a threshold value, the determiner is not configured to determine the second reference lane according to a relative position of the first reference lane.

According to another Aspect (17) of the present invention, there is provided a vehicle control method causing a computer mounted in a vehicle to perform: recognizing situations around the vehicle; determining any of lanes included in a road on which the vehicle travels as a reference lane; controlling at least one of a speed and steering of the vehicle according to the recognized situations and the determined reference lane; and when the vehicle moves from a first road to a second road different from the first road, among a plurality of lanes included in the first road, according to a relative position of a first reference lane determined at a time before the vehicle moves to the second road with respect to the plurality of lanes, determining a second reference lane on the second road.

According another Aspect (18) of the present invention, there is provided a computer readable non-transitory storage medium storing a program causing a computer mounted in a vehicle to execute: recognizing situations around the vehicle; determining any of lanes included in a road on which the vehicle travels as a reference lane; controlling at least one of a speed and steering of the vehicle according to the recognized situations and the determined reference lane; and when the vehicle moves from a first road to a second road different from the first road, among a plurality of lanes included in the first road, according to a relative position of a first reference lane determined at a time before the vehicle moves to the second road with respect to the plurality of lanes, determining a second reference lane on the second road.

According to any one of Aspects (1) to (18), it is possible to perform automated driving in which the occupant is unlikely to feel uncomfortable.

BRIEF DESCRIPTION OF THE DRAWINGS

FIG. 11 is a diagram showing an example of a screen of the display device on which prompting information is displayed.

DESCRIPTION OF EMBODIMENTS

A vehicle control device, a vehicle control method, and a storage medium according to embodiments of the present invention will be described below with reference to the drawings. In the embodiments, an example in which, when driving assistance of a vehicle is performed, recognition results for around the vehicle are displayed on a display device will be described. The driving assistance refers to controlling at least one of the steering and speed of the vehicle, for example, as in an adaptive cruise control system (ACC) and a lane keeping assistance system (LKAS), or controlling both of them. In particular, controlling the steering and speed of the vehicle is also called automated driving. In the following, a case in which left-hand traffic regulations are applied will be described. However, when right-hand traffic regulations are applied, left and right may be switched. The left-hand traffic regulations or the right-hand traffic regulations are examples of the "predetermined regulations."

[Overall Configuration]

Figure 1:
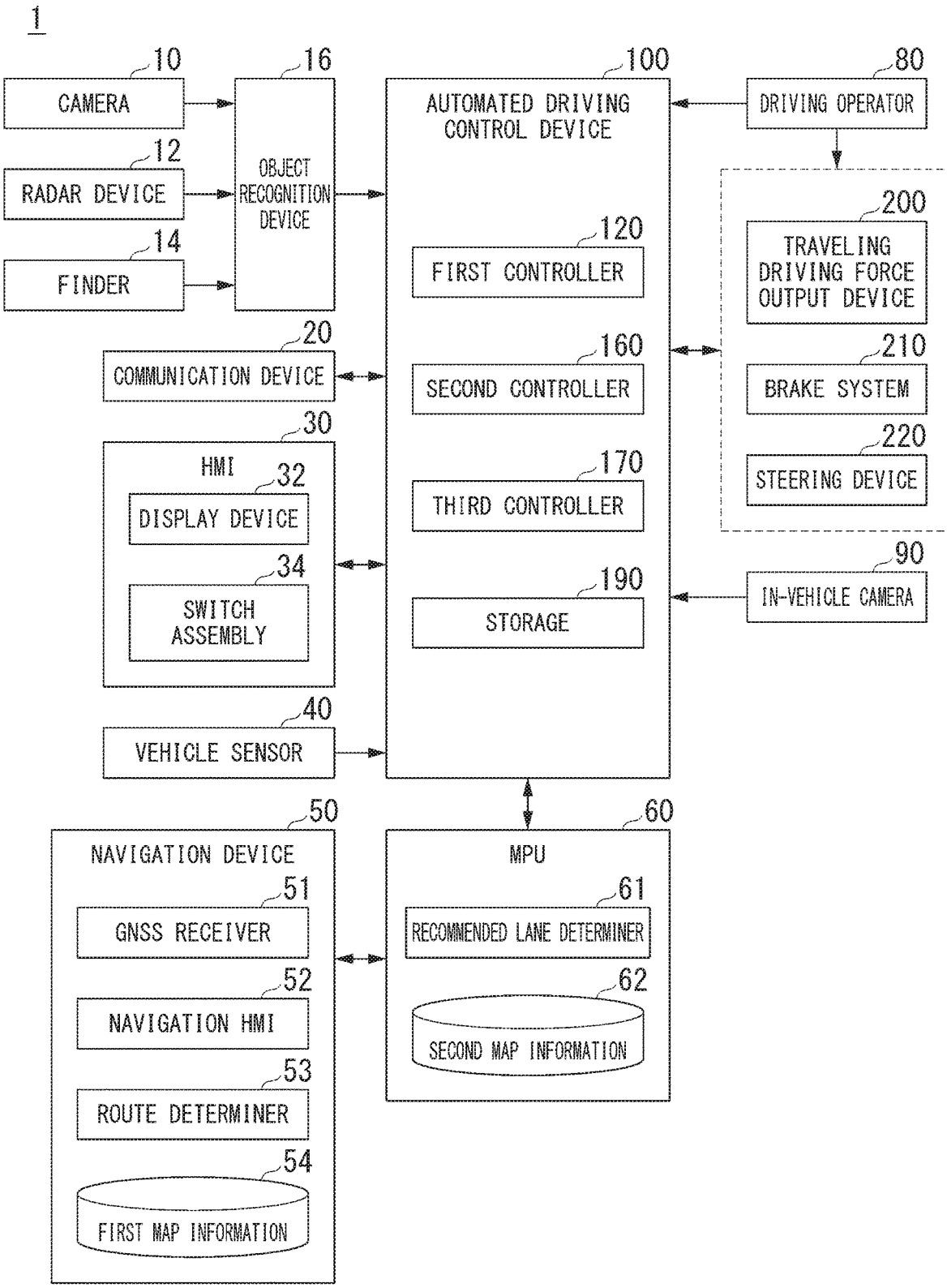
FIG. 1 is a configuration diagram of a vehicle system using a vehicle control device according to an embodiment.

FIG. 1 is a configuration diagram of a vehicle system 1 using a vehicle control device according to an embodiment. A vehicle on which the vehicle system 1 is mounted (hereinafter referred to as a host vehicle M) is, for example, a vehicle with two wheels, three wheels, four wheels, or the like, and a driving source thereof includes an internal combustion engine such as a diesel engine and a gasoline engine, an electric motor, or a combination thereof. The electric motor operates using power generated by a power generator connected to the internal combustion engine or power discharged from a secondary battery or a fuel cell.

For example, the vehicle system 1 includes a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an in-vehicle camera 90, an automated driving control device 100, a traveling driving force output device 200, a brake system 210, and a steering device 220. These devices and instruments are connected to each other via a multiplex communication line such as a controller area network (CAN) communication line, a serial communication line, a wireless communication network, or the like. The configuration shown in FIG. 1 is only an example, and some of the components may be omitted or other components may be additionally added.

The camera 10 is, for example, a digital camera using a solid-state imaging device such as a charge coupled device (CCD) and a complementary metal oxide semiconductor (CMOS). The camera 10 is attached to an arbitrary part of the host vehicle M. When the camera 10 captures an image in front of the vehicle, it is attached to an upper part of the front windshield, a rear surface of the rearview mirror, or the like. For example, the camera 10 images periodically and repeatedly the surroundings of the host vehicle M. The camera 10 may be a stereo camera.

The radar device 12 emits radio waves such as millimeter waves to the vicinity of the host vehicle M and detects radio waves (reflected waves) reflected at an object and detects at least a position (a distance and a direction) of the object. The radar device 12 is attached to an arbitrary part of the host vehicle M. The radar device 12 may detect a position and speed of the object according to a frequency modulated continuous wave (FM-CW) method.

The finder 14 is a sensor using light detection and ranging (LIDAR). The finder 14 emits light to the vicinity of the host vehicle M and measures scattered light. The finder 14 detects a distance to the object based on a time from when light is emitted until light is received. The light which is emitted is, for example, a pulsed laser beam. The finder 14 is attached to an arbitrary part of the host vehicle M.

The object recognition device 16 performs sensor fusion processing on detection results obtained by some or all of the camera 10, the radar device 12, and the finder 14, and recognizes a position, type, speed and the like of the object.

The object recognition device 16 outputs the recognition results to the automated driving control device 100. The object recognition device 16 may output the detection results of the camera 10, the radar device 12, and the finder 14 to the automated driving control device 100 without change. The object recognition device 16 may be omitted from the vehicle system 1.

The communication device 20 communicates with other vehicles present around the host vehicle M using, for example, a cellular network, a Wi-Fi network, Bluetooth (registered trademark, hereinafter omitted), or dedicated short range communication (DSRC), or communicates with various sensor devices through a wireless base station.

The HMI 30 presents various types of information to an occupant in the host vehicle M and receives an operation input by the occupant. For example, the HMI 30 includes a display device 32 and a switch assembly 34. For example, the display device 32 includes a first display 32A and a second display 32B. For example, the switch assembly 34 includes a first switch 34A and a second switch 34B. The HMI 30 may further include a speaker, a buzzer, a touch panel and the like.

Figure 2:
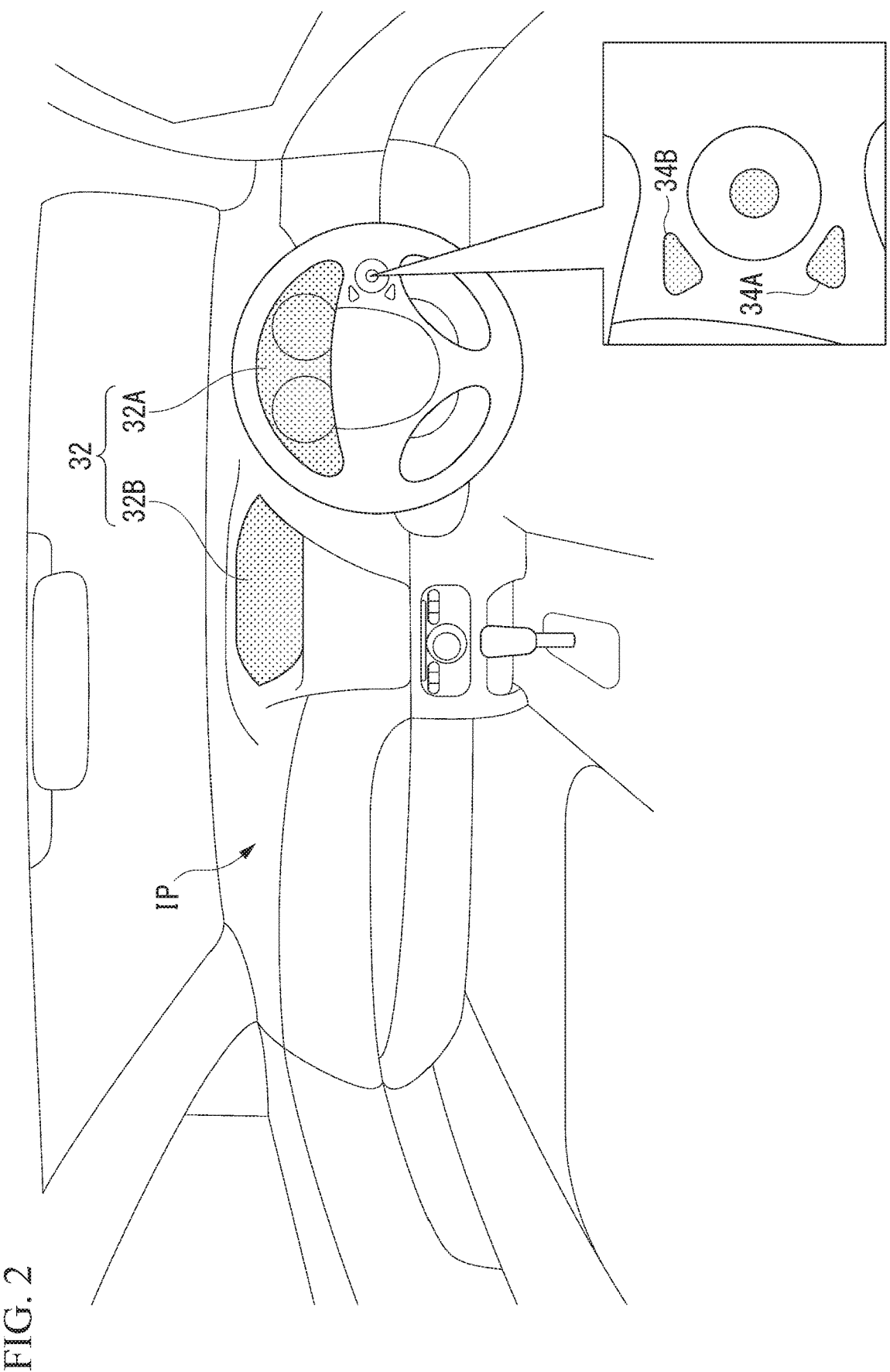
FIG. 2 is a diagram schematically showing a status inside a host vehicle.

FIG. 2 is a diagram schematically showing the status inside the host vehicle M. For example, the first display 32A is provided near the front of a driver's seat (seat closest to the steering wheel) in an instrument panel IP and installed at a position at which the occupant can see from a gap by the steering wheel or through the steering wheel. The first display 32A is, for example, a liquid crystal display (LCD) or an organic electro luminescence (EL) display device. Information necessary for travelling of the host vehicle M during manual driving or during driving assistance is displayed as an image on the first display 32A. The information necessary for travelling of the host vehicle M during manual driving is, for example, a speed of the host vehicle M, an engine rotational speed, a remaining fuel amount, a radiator water temperature, a traveling distance, and other information. The information necessary for driving the host vehicle M during driving assistance is information, such as for example, a future trajectory of the host vehicle M (a target trajectory to be described below), whether lane change is to be performed, a destination lane of a lane change, the recognized lane (lane marking), and other vehicles. In addition, the information necessary for driving the host vehicle M during driving assistance may include a part or all of the information necessary for driving the host vehicle M during manual driving.

For example, the second display 32B is installed near the center of the instrument panel IP. Like the first display 32A, the second display 32B is, for example, an LCD or an organic EL display device. For example, the second display 32B displays navigation results of the navigation device 50 as an image. The second display 32B may display a TV program, reproduce a DVD, or display content such as a downloaded movie.

For example, the switch assembly 34 is attached to the steering wheel. The first switch 34A and the second switch 34B are physically independent switches. For example, when the first switch 34A is operated, the driving mode of the host vehicle M is switched from a manual driving mode to a driving assistance mode. When the second switch 34B is operated, the driving mode of the host vehicle M is switched from a driving assistance mode to an automated driving mode having a higher degree of control.

The manual driving mode is a mode in which the speed and steering of the host vehicle M are controlled according to the driving operation of the occupant. The driving assistance mode is a mode in which one of the speed and steering of the host vehicle M is controlled independently of driving operations of the occupant. For example, in the driving assistance mode, controls such as ACC and LKAS are performed. In the driving assistance mode, LKAS is restricted while ACC is performed, and ACC is restricted while LKAS is performed. That is, in the driving assistance mode, the steering control and the speed control are sequentially performed.

The automated driving mode is a mode in which both the speed and steering of the host vehicle M are controlled independently of driving operations of the occupant. For example, in the automated driving mode, control such as auto lane changing (ALC) is performed in addition to the above ACC and LKAS. Hereinafter, the automated driving mode in which ALC is performed will be specifically described as an "automated lane change mode." The automated driving mode including the automated lane change mode includes a first automated driving mode and a second automated driving mode. In these automated driving modes, a duty (also called tasks) according to the degree of control of the host vehicle M is imposed on the occupant in the host vehicle M.

In the first automated driving mode, for example, a first duty and a second duty are imposed on the occupant. The first duty is a duty to monitor the surroundings of (particularly, in front of) the host vehicle M, and the second duty is a duty to grip the steering wheel. "Grip" means to grasp with a hand or touch with a hand. On the other hand, in the second automated driving mode, for example, the first duty is imposed and the second duty is not imposed on the occupant. In the above driving assistance mode, the first duty and the second duty are imposed as in the first automated driving mode. In each driving mode, when the occupant does not perform his or her duty, the driving mode of the host vehicle M transitions to a driving mode having a lower degree of control than the driving mode that is currently being performed.

In the manual driving mode, when the occupant operates the first switch 34A and turns the first switch 34A on, the driving mode of the host vehicle M transitions from the manual driving mode to the driving assistance mode. Then, when the host vehicle M in the driving assistance mode enters a restricted section in which automated driving is permitted (hereinafter referred to as an automated driving permitted section), the driving mode of the host vehicle M transitions from the driving assistance mode to the second automated driving mode (the automated driving mode in which the first duty is imposed). The automated driving permitted section is, for example, a road section in which the host vehicle M can recognize a host lane or a relative position of the host vehicle M with respect to the host lane can be recognized. Specifically, the automated driving permitted section is a highway in which relative positional relationships between lane markings of lanes are defined in second map information 62 to be described below.

When the host vehicle M has already entered the automated driving permitted section before the occupant operates the first switch 34A, that is, when the host vehicle M in the manual driving mode has entered the automated driving permitted section, the driving mode of the host vehicle M does not transition to the second automated driving mode and the manual driving mode is maintained. When the host vehicle M in the manual driving mode is traveling in the automated driving permitted section, if the occupant operates the first switch 34A, the driving mode of the host vehicle M transitions to the second automated driving mode at a timing at which the first switch 34A is operated.

In the second automated driving mode, when the occupant operates the second switch 34B and turns the second switch 34B on, the driving mode of the host vehicle M transitions from the second automated driving mode to the automated lane change mode. In the automated lane change mode, the first duty is imposed as in the second automated driving mode before transition.

When the second switch 34B is in the manual driving mode, the driving assistance mode, or the first automated driving mode, that is, in the driving mode in which the second duty is imposed, operations are disabled (the operations of the occupant are not received), or when the second switch 34B is at least in the second automated driving mode in which the second duty is not imposed, operations are enabled (operations of the occupant are received).

The above automated driving mode may include a third automated driving mode in which a degree of duty imposed on the occupant is smaller. For example, in the third automated driving mode, neither the first duty nor the second duty is imposed on the occupant.

The description will return to FIG. 1. The vehicle sensors 40 include a vehicle speed sensor that detects a speed of the host vehicle M, an acceleration sensor that detects an acceleration, a yaw rate sensor that detects an angular velocity around a vertical axis, a direction sensor that detects a direction of the host vehicle M, and the like.

For example, the navigation device 50 includes a global navigation satellite system (GNSS) receiver 51, a navigation HMI 52, and a route determiner 53. The navigation device 50 maintains first map information 54 in a storage device such as a hard disk drive (HDD) or a flash memory.

The GNSS receiver 51 identifies a position of the host vehicle M based on signals received from GNSS satellites. The position of the host vehicle M may be identified or supplemented by an inertial navigation system (INS) using an output of the vehicle sensor 40.

The navigation HMI 52 includes a display device, a speaker, a touch panel, a key, and the like. A part or all of the navigation HMI 52 may be shared with the above HMI 30.

For example, the route determiner 53 determines a route to a destination input by the occupant (hereinafter referred to as a route on the map) from the position (or any input position) of the host vehicle M identified by the GNSS receiver 51, using the navigation HMI 52 with reference to the first map information 54. The first map information 54 is, for example, information in which a road pattern is expressed with links indicating roads and nodes connected by links. The first map information 54 may include a road curvature, point of interest (POI) information, and the like. The route on the map is output to the MPU 60.

The navigation device 50 may perform route guidance using the navigation HMI 52 based on the route on the map. The navigation device 50 may be realized by, for example, a function of a terminal device such as a smartphone and a tablet terminal that the occupant holds. The navigation device 50 may transmit the current position and destination to a navigation server through the communication device 20 and acquire the same route as the route on the map from the navigation server.

The MPU 60 includes, for example, a recommended lane determiner 61, and maintains the second map information 62 in a storage device such as an HDD and a flash memory. The recommended lane determiner 61 divides the route on the map provided from the navigation device 50 into a plurality of blocks (for example, divides every 100 [m] with respect to the travelling direction of the vehicle), and determines a recommended lane for each block with reference to the second map information 62. The recommended lane determiner 61 determines in which lane numbered from the left to travel. When there is a branching point on the route on the map, the recommended lane determiner 61 determines a recommended lane so that the host vehicle M can travel along a reasonable route to a branch destination.

The second map information 62 is map information wither higher accuracy than the first map information 54. The second map information 62 may include, for example, information on the center of the lane, information on the boundary of the lane, information on the type of the lane, and the like. The second map information 62 may include road information, traffic regulation information, address information (address and zip code), facility information, phone number information, and the like. The second map information 62 may be updated at any time according to communication by the communication device 20 with other devices.

The driving operators 80 include, for example, an accelerator pedal, a brake pedal, a shift lever, a steering wheel, a direction indicator, a joystick, and other handlers. A sensor that detects an operation amount or whether or not an operation has been performed is attached to the driving operators 80, and the detection result is output to the automated driving control device 100, or some or all of the traveling driving force output device 200, the brake system 210, and the steering device 220.

For example, the sensor attached to the steering wheel (hereinafter referred to as a steering sensor) detects a weak current that is generated when the occupant touches the steering wheel. The steering sensor may detect a steering torque that is generated around a rotation axis (shaft) of the steering wheel. When the steering sensor detects a current or steering torque, it outputs a signal indicating the detection result to the automated driving control device 100.

The in-vehicle camera 90 is a camera that images the inside of a cabin of the host vehicle M. The in-vehicle camera 90 is, for example, a digital camera using a solid-state imaging device such as a CCD and a CMOS. When the in-vehicle camera 90 images the inside of the cabin of the host vehicle M, it outputs image data to the automated driving control device 100.

The automated driving control device 100 includes, for example, a first controller 120, a second controller 160, a third controller 170, and a storage 190. The first controller 120, the second controller 160, and the third controller 170 are realized, for example, when a processor such as a central processing unit (CPU) and a graphics processing unit (GPU) executes a program (software). Some or all of these components may be realized by hardware (circuit unit; including a circuitry) such as a large scale integration (LSI), an application specific integrated circuit (ASIC), and a field-programmable gate array (FPGA) or may be realized in cooperation of software and hardware. The program may be stored in the storage 190 of the automated driving control device 100 in advance or may be stored in a removable storage medium such as a DVD and a CD-ROM, and may be installed in the storage 190 when the storage medium is mounted in a drive device.

The storage 190 is realized by, for example, an HDD, a flash memory, an electrically erasable programmable read only memory (EEPROM), a read only memory (ROM), or a random access memory (RAM). The storage 190 stores, for example, a program that is read and executed by a processor.

Figure 3:
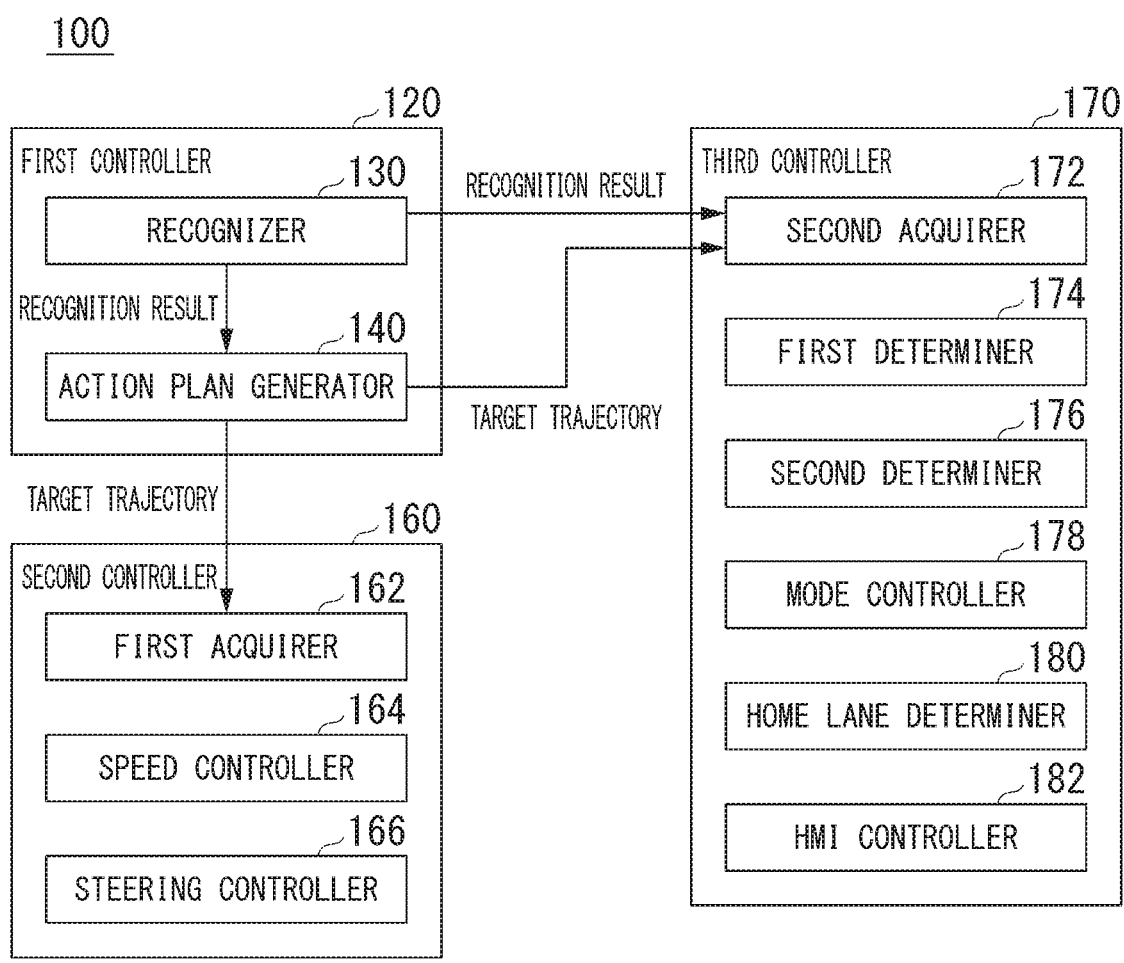
FIG. 3 is a functional configuration diagram of a first controller, a second controller, and a third controller.

FIG. 3 is a functional configuration diagram of the first controller 120, the second controller 160, and the third controller 170. The first controller 120 includes, for example, a recognizer 130 and an action plan generator 140. For example, the first controller 120 realizes a function based on artificial intelligence (AI) and a function based on a model provided in advance in parallel. For example, a function of "recognizing an intersection" may be realized according to recognition of an intersection using deep learning and the like and recognition based on conditions provided in advance (pattern-matchable signals, road lanes and the like) executed in parallel, and scoring and comprehensively evaluating them. Thereby, the reliability of the automated driving is secured.

The recognizer 130 recognizes an object present around the host vehicle M based on information input from the camera 10, the radar device 12, and the finder 14 through the object recognition device 16. Examples of objects recognized by the recognizer 130 include bicycles, motorcycles, four-wheeled vehicles, pedestrians, road signs installed on roadsides, road lanes formed on road surfaces, lane markings, utility poles, guardrails, and fallen objects. The recognizer 130 recognizes the status of the object such as the position, speed, and acceleration. For example, the position of the object is recognized as a position on relative coordinates (that is, a relative position with respect to the host vehicle M) using a representative point (center of gravity, center of the drive shaft, or the like) of the host vehicle M as the origin and is used for control. The position of the object may be represented by a representative point such as the center of gravity or a corner of the object or may be represented by a representative region. The "status" of the object may include the acceleration or jerk of the object or "action status" (for example, whether it is changing or about to change lanes).

The recognizer 130 recognizes that a road section in which the host vehicle M is traveling is an automated driving permitted section with reference to the second map information 62. For example, the recognizer 130 compares a pattern of road lane lines (for example, an arrangement of solid lines and broken lines) obtained from the second map information 62 with a pattern of road lane lines around the host vehicle M recognized from the image captured by the camera 10, and thus recognizes the automated driving permitted section. In addition, the recognizer 130 recognizes a host lane in which the host vehicle M is traveling and an adjacent lane adjacent to the host lane based on the comparison of patterns of road lane lines.

The recognizer 130 may recognize the host lane and the adjacent lane and recognize the automated driving permitted section by recognizing roadway boundaries (road boundaries) including road lane lines, shoulders, curbstones, median strips, and guardrails without limitation to road lane lines. In this recognition, the position of the host vehicle M acquired from the navigation device 50 and the processing result by INS may be taken into consideration. The recognizer 130 recognizes temporary stop lines, obstacles, red lights, tollgates, and other road events.

When the host lane is recognized, the recognizer 130 recognizes the relative position and direction of the host vehicle M with respect to the host lane. For example, the recognizer 130 may recognize the deviation of a reference point on the host vehicle M with respect to the center of the lane and an angle formed with respect to the line connected to the center of the lane in the travelling direction of the host vehicle M as the relative position and direction of the host vehicle M with respect to the host lane. Alternatively, the recognizer 130 may recognize the position of the reference point on the host vehicle M with respect to any side end (road lane line or road boundary) of the host lane as the relative position of the host vehicle M with respect to the host lane.

The action plan generator 140 includes, for example, an event determiner 142 and a target trajectory generator 144. When the host vehicle M is under automated driving on the route in which the recommended lane is determined, the event determiner 142 determines the traveling mode of the automated driving. Hereinafter, information defining the traveling mode of the automated driving will be described as an event.

Examples of events include a constant-speed traveling event, a following traveling event, a lane change event, a branching event, a merging event, and a takeover event. The constant-speed traveling event is an event in which the host vehicle M is caused to travel in the same lane at a certain speed. The following traveling event is an event in which the host vehicle M is caused to follow another vehicle (hereinafter referred to as a preceding vehicle X) which is within a predetermined distance (for example, within 100 [m]) in front of the host vehicle M and closest to the host vehicle M. "Following" may be, for example, a traveling mode in which an inter-vehicle distance (relative distance) between the host vehicle M and the preceding vehicle X is kept constant or a traveling mode in which, in addition to keeping an inter-vehicle distance between the host vehicle M and the preceding vehicle X constant, the host vehicle M is caused to travel in the center of the host lane. The lane change event is an event in which the host vehicle M is caused to change lanes from the host lane to the adjacent lane. The branching event is an event in which the host vehicle M is caused to branch to a destination lane at a branching point of the road. The merging event is an event in which the host vehicle M is caused to merge into the main line at a merging point. The takeover event is an event in which automated driving is caused to end and the driving is caused to be switched to manual driving. Examples of events include a passing event and an avoidance event. The passing event is an event in which the host vehicle M is caused to change lanes to an adjacent lane temporarily, pass the preceding vehicle X on the adjacent lane and then change lanes again to the original lane. The avoidance event is an event in which the host vehicle M is caused to perform at least one of braking and steering in order to avoid obstacles existing in front of the host vehicle M.

For example, the event determiner 142 may change an event already determined for the current section to another event and determine a new event for the current section according to the surrounding situation recognized by the recognizer 130 when the host vehicle M is traveling.

The event determiner 142 may change an event already determined for the current section to another event and determine a new event for the current section according to the operation of the occupant on in-vehicle unit. For example, when the occupant operates the direction indicator, the event determiner 142 may change an event already determined for the current section to the lane change event and determine a new lane change event for the current section.

For example, when the occupant operates a lever (also referred to as a stoke or a switch) of the direction indicator and instructs the vehicle to turn left, the event determiner 142 determines a lane change event in which the host vehicle M is caused to change lanes to an adjacent lane on the left side when viewed from the host vehicle M. For example, when the occupant operates a lever of the direction indicator and instructs the vehicle to turn right, the event determiner 142 determines a lane change event in which the host vehicle M is caused to change lanes to an adjacent lane on the right side when viewed from the host vehicle M. The lever of the direction indicator is an example of a "detector."

In principle, the target trajectory generator 144 generates a future target trajectory in which the host vehicle M travels on the recommended lane determined by the recommended lane determiner 61, and additionally, in order to respond the surrounding situation when the host vehicle M is traveling on the recommended lane, the host vehicle M is caused to automatically (independently of operations of the driver) travel in the traveling mode defined by the event. The target trajectory includes, for example, a position element that determines the future position of the host vehicle M and a speed element that determines the future speed of the host vehicle M.

For example, the target trajectory generator 144 determines a plurality of points (trajectory points) which the host vehicle M will reach sequentially as the position element of the target trajectory. The trajectory point is a point which the host vehicle M will reach for each of predetermined traveling distances (for example, about every several [m]). The predetermined traveling distance can be calculated by, for example, a distance along the route when the vehicle travels along the route.

The target trajectory generator 144 determines a target speed and a target acceleration for each of predetermined sampling times (for example, about every several fractions of a [sec]) as a speed element of the target trajectory. The trajectory point may be a position that the host vehicle M will reach at a sampling time for each of predetermined sampling times. In this case, the target speed and target acceleration are determined according to intervals between the sampling times and the trajectory points. The target trajectory generator 144 outputs information indicating the generated target trajectory to the second controller 160.

Figure 4:
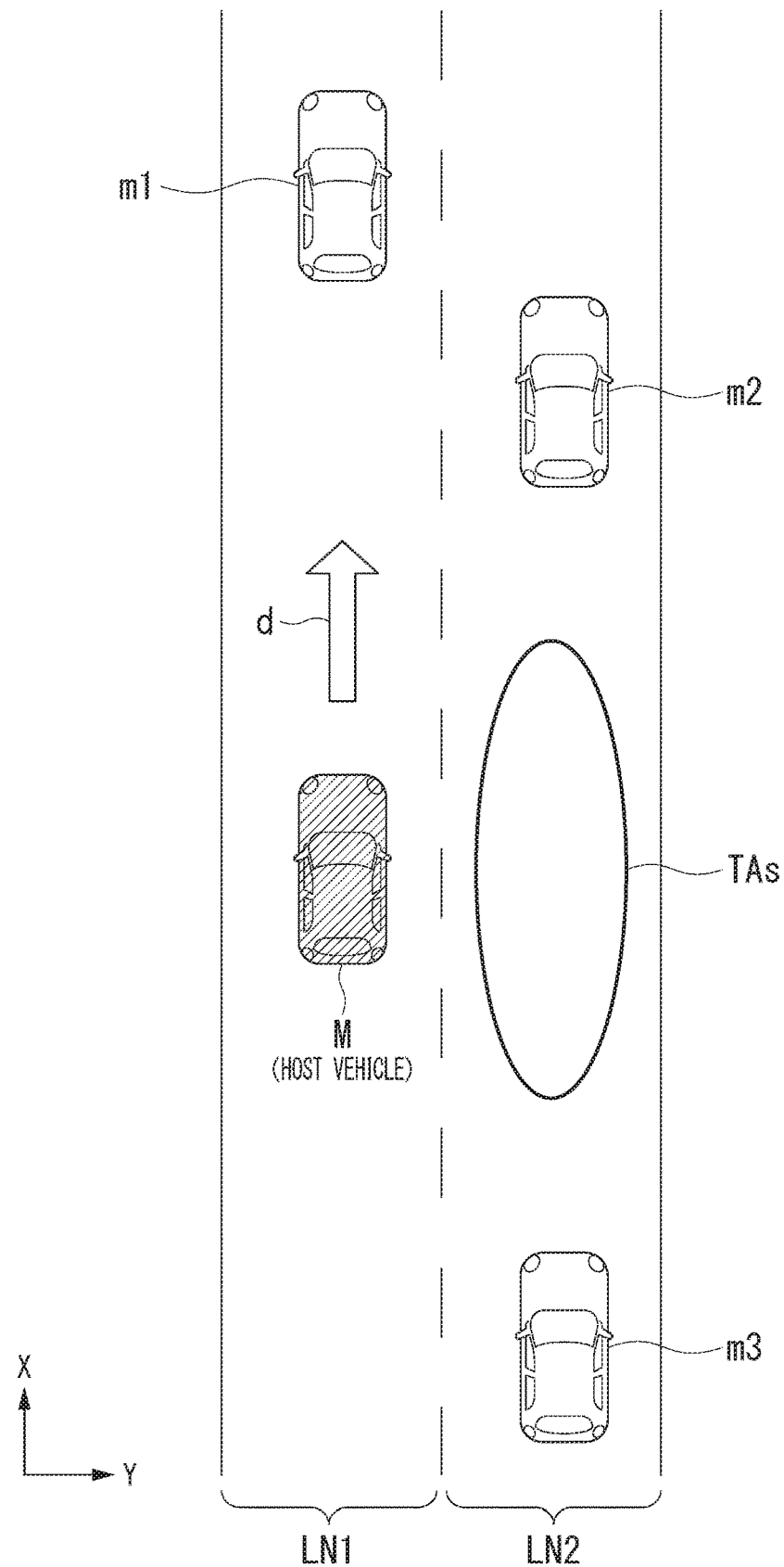
FIG. 4 is a diagram showing a scenario in which the host vehicle is caused to change lanes.
Figure 5:
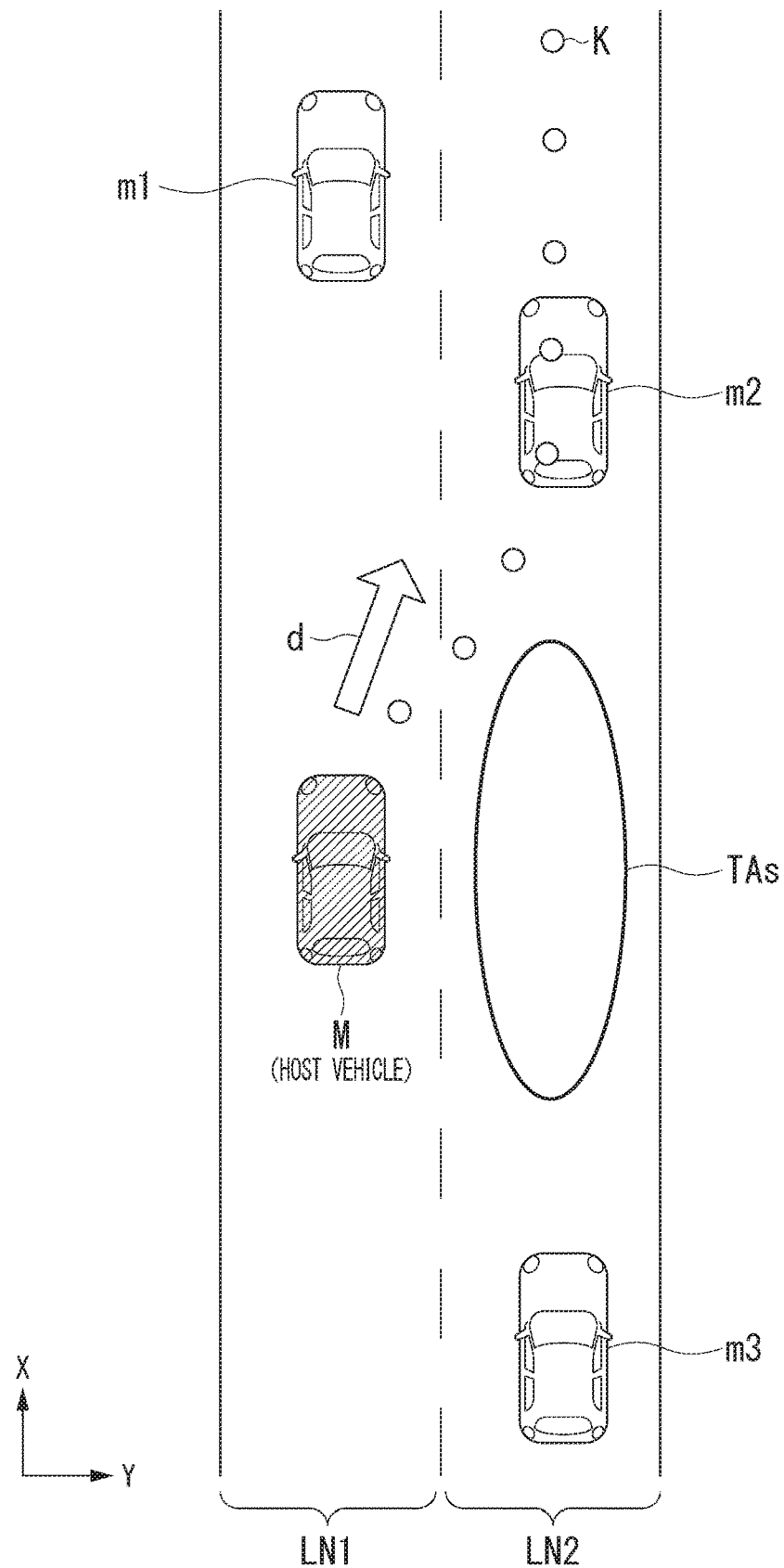
FIG. 5 is a diagram showing a scenario in which the host vehicle is caused to change lanes.
Figure 6:
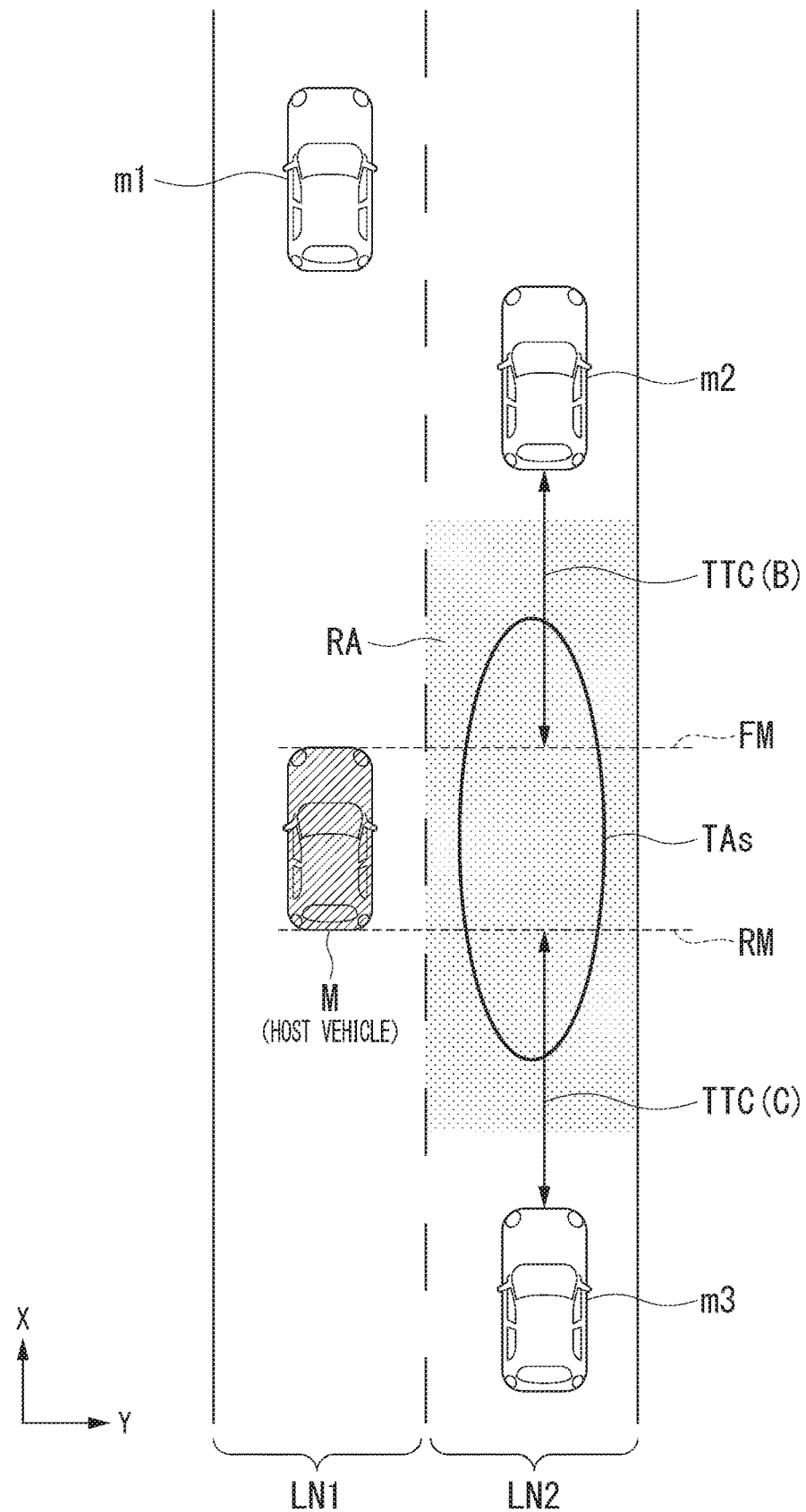
FIG. 6 is a diagram showing a scenario in which the host vehicle is caused to change lanes.

Hereinafter, as an example, a scenario in which the host vehicle M travels in a section in which the lane change event is planned, that is, a scenario in which the host vehicle M is caused to change lanes, will be described. FIG. 4 to FIG. 6 are diagrams showing scenarios in which the host vehicle M is caused to change lanes. In the drawings, LN1 indicates a host lane, and LN2 indicates an adjacent lane adjacent to the host lane. X indicates an extending direction of the road or a travelling direction of the host vehicle M, and Y indicates a vehicle width direction orthogonal to the X direction.

When the event in the current section is a lane change event, the target trajectory generator 144 selects two other vehicles from among a plurality of other vehicles that are traveling in the adjacent lane LN2 and sets a lane change target position TAs between the two selected other vehicles. The lane change target position TAs is a position of a target lane change destination and is a relative position between the host vehicle M and other vehicles m2 and m3. In the shown example, since the other vehicles m2 and m3 are traveling on the adjacent lane, the target trajectory generator 144 sets the lane change target position TAs between the other vehicles m2 and m3. When only one other vehicle is in the adjacent lane LN2, the target trajectory generator 144 may set the lane change target position TAs to any position in front of or behind the other vehicle. When there are no other vehicles in the adjacent lane LN2, the target trajectory generator 144 may set the lane change target position TAs to any position on the adjacent lane LN2. Hereinafter, another vehicle (in the shown example, m2) that travels immediately before the lane change target position TAs in the adjacent lane will be referred to as a forward reference vehicle mB and another vehicle (in the shown example, m3) that travels immediately after the lane change target position TAs in the adjacent lane will be referred to as a rearward reference vehicle mC.

When the lane change target position TAs is set, the target trajectory generator 144 generates a plurality of target trajectory candidates for causing the host vehicle M to change lanes. In the example in FIG. 5, the target trajectory generator 144 assumes that each of the other vehicle m1 as the preceding vehicle mA, the other vehicle m2 as the forward reference vehicle mB, and the other vehicle m3 as the rearward reference vehicle mC travels with a predetermined speed model and generates a plurality of target trajectory candidates based on speed models of these three vehicles and the speed of the host vehicle M so that the host vehicle M is at the lane change target position TAs between the forward reference vehicle mB and the rearward reference vehicle mC at a certain time in the future without interfering with the preceding vehicle mA.

For example, the target trajectory generator 144 smoothly connects the position of the forward reference vehicle mB at a certain time in the future from the current position of the host vehicle M, the center of the lane of the lane change destination, and the end point of a lane change using a polynomial curve such as a spline curve, and a predetermined number of trajectory points K are arranged at equal intervals or unequal intervals on this curve. In this case, the target trajectory generator 144 generates a plurality of target trajectory candidates such that at least one of the trajectory points K is arranged within the lane change target position TAs.

Then, the target trajectory generator 144 selects an optimal target trajectory from among the generated plurality of target trajectory candidates. The optimal target trajectory is, for example, a target trajectory in which a yaw rate predicted to be generated when the host vehicle M is caused to travel based on the target trajectory is less than a threshold value and the speed of the host vehicle M is within a predetermined speed range. The threshold value of the yaw rate is set to, for example, a yaw rate at which there is no overload (the acceleration in the vehicle width direction becomes a threshold value or more) on the occupant when the lanes change. The predetermined speed range is set to, for example, a speed range of about 70 to 110 [km/h].

When the target trajectory generator 144 sets the lane change target position TAs and generates a target trajectory for causing the host vehicle M to change lanes to the lane change target position TAs, it is determined whether the lane can be changed to the lane change target position TAs (that is between the forward reference vehicle mB and the rearward reference vehicle mC).

For example, the target trajectory generator 144 sets a prohibited region RA in which the presence of another vehicle is prohibited in the adjacent lane LN2, and when a part of another vehicle is not present in the prohibited region RA, and each of the time to collision (TTC) of the host vehicle M and the forward reference vehicle mB and the rearward reference vehicle mC is larger than a threshold value, it is determined that it is possible to change lanes. The determination condition is an example when the lane change target position TAs is set to the side of the host vehicle M.

As exemplified in FIG. 6, for example, the target trajectory generator 144 projects the host vehicle M onto the lane LN2 of the lane change destination and sets the prohibited region RA having a certain margin distance in front and behind thereof. The prohibited region RA is set as a region that extends from one end of the lane LN2 in the lateral direction (Y direction) to the other end.

When there are no other vehicles in the prohibited region RA, the target trajectory generator 144 sets, for example, a virtual extension line FM and extension line RM at the front end and rear end of the host vehicle M on the side of the lane LN2 of the lane change destination. The target trajectory generator 144 calculates a time to collision TTC(B) between the extension line FM and the forward reference vehicle mB and a time to collision TTC(C) between the extension line RM and the rearward reference vehicle mC. The time to collision TTC(B) is a time derived by dividing a distance between the extension line FM and the forward reference vehicle mB by a relative speed of the host vehicle M and the forward reference vehicle mB (the other vehicle m2 in the shown example). The time to collision TTC(C) is a time derived by dividing a distance between the extension line RM and the rearward reference vehicle mC (the other vehicle m3 in the shown example) by a relative speed of the host vehicle M and the rearward reference vehicle mC. When the time to collision TTC(B) is larger than the threshold value Th(B) and the time to collision TTC(C) is larger than the threshold value Th(C), the target trajectory generator 144 determines that it is possible to change lanes. The threshold values Th(B) and Th(C) may be the same value or different values.

When it is determined that it is not possible to change lanes, the target trajectory generator 144 selects two other new vehicles from among a plurality of other vehicles that are traveling in the adjacent lane LN2, and resets the lane change target position TAs between the two newly selected other vehicles. One of the two newly selected other vehicles may be a previously selected other vehicle.

The target trajectory generator 144 repeats setting of the lane change target position TAs until it is determined that it is possible to change lanes. In this case, the target trajectory generator 144 may generate a target trajectory for causing the host vehicle M to wait in the host lane LN1 or generate a target trajectory for causing the host vehicle M to decelerate or accelerate so that it is moved to the side of the lane change target position TAs in the host lane LN1.

When it is determined that it is possible to change lanes, the target trajectory generator 144 outputs information indicating the generated target trajectory to the second controller 160.

The second controller 160 controls the traveling driving force output device 200, the brake system 210, and the steering device 220 so that the host vehicle M passes along the target trajectory generated by the target trajectory generator 144 according to a scheduled time.

The second controller 160 includes, for example, a first acquirer 162, a speed controller 164, and a steering controller 166. A combination of the event determiner 142, the target trajectory generator 144, and the second controller 160 is an example of a "driving controller."

The first acquirer 162 acquires information on the target trajectory (trajectory point) from the target trajectory generator 144 and stores it in a memory of the storage 190.

The speed controller 164 controls one or both of the traveling driving force output device 200 and the brake system 210 based on the speed element (for example, a target speed and a target acceleration) included in the target trajectory stored in the memory.

The steering controller 166 controls the steering device 220 according to the position element (for example, a curvature indicating the degree of curve of the target trajectory) included in the target trajectory stored in the memory.

The processing of the speed controller 164 and the steering controller 166 is realized by, for example, a combination of feedforward control and feedback control. As an example, the steering controller 166 executes a combination of feedforward control according to the curvature of the road in front of the host vehicle M and feedback control based on the deviation from the target trajectory.

The traveling driving force output device 200 outputs a traveling driving force (torque) with which vehicle travels to drive wheels. The traveling driving force output device 200 includes, for example, a combination of an internal combustion engine, an electric motor, a transmission and the like, and a power electronic controller (ECU) that controls them. The power ECU controls the above configuration according to information input from the second controller 160 or information input from the driving operator 80.

The brake system 210 includes, for example, a brake caliper, a cylinder that transmits a hydraulic pressure to a brake caliper, an electric motor that generates a hydraulic pressure in the cylinder, and a brake ECU. The brake ECU controls the electric motor according to information input from the second controller 160 or information input from the driving operator 80, and outputs a brake torque according to the braking operation to wheels. The brake system 210 may include a mechanism that transmits a hydraulic pressure generated when the brake pedal included in the driving operator 80 is operated to the cylinder via a master cylinder as a backup. The brake system 210 is not limited to the above-described configuration, and may be an electronically controlled hydraulic brake system that controls an actuator according to information input from the second controller 160 and transmits a hydraulic pressure of the master cylinder to the cylinder.

The steering device 220 includes, for example, a steering wheel ECU and an electric motor. The electric motor applies a force to, for example, a rack and pinion mechanism, and changes the direction of steered wheels. The steering wheel ECU drives the electric motor according to information input from the second controller 160 or information input from the driving operator 80, and changes the direction of the steered wheels.

The third controller 170 includes, for example, a second acquirer 172, a first determiner 174, a second determiner 176, a mode controller 178, a home lane determiner 180, and an HMI controller 182.

The second acquirer 172 acquires information on the result recognized by the recognizer 130 and acquires information on the target trajectory generated by the target trajectory generator 144.

The first determiner 174 determines whether the occupant is grasping the steering wheel with his or her hands or is touching the steering wheel with his or her hands based on the detection results of the steering sensor in the first automated driving mode in which at least the second duty is imposed. That is, the first determiner 174 determines whether the occupant is performing the second duty. For example, when the current value or steering torque detected by the steering sensor is equal to or larger than a threshold value, the first determiner 174 determines that the occupant is grasping the steering wheel with his or her hands or is touching the steering wheel with his or her hands. Hereinafter, a state in which the occupant is grasping the steering wheel with his or her or a state in which the occupant is touching the steering wheel with his or her hands, that is, the second duty is performed, will be referred to as "hands-on," and a state in which he or she is not will be referred to as "hands-off."

The second determiner 176 analyzes an image generated by the in-vehicle camera 90 in the first automated driving mode or second automated driving mode in which the first duty is imposed, and detects a direction of a gaze or a direction of the face of the occupant in the driver's seat. The second determiner 176 determines whether the occupant in the driver's seat is monitoring the vicinity of the host vehicle M based on the detected direction of the gaze or face. That is, the second determiner 176 determines whether the occupant is performing the first duty. For example, when the occupant is looking outside the vehicle through the front windshield, that is, when the occupant is looking forward, the second determiner 176 determines that the occupant is monitoring the vicinity of the host vehicle M. For example, when the occupant is looking at the second display 32B provided in the vehicle, that is, when the occupant is not looking forward, the second determiner 176 determines that the occupant is not monitoring the vicinity of the host vehicle M. Hereinafter, a state in which the occupant is monitoring the vicinity of the host vehicle M, that is, a state in which the first duty is being performed, will be referred to as "eyes-on," and otherwise, a state will be referred to as "eyes-off."

The mode controller 178 controls the driving mode of the host vehicle M based on the section in which the host vehicle M is traveling. For example, when the host vehicle M has entered the automated driving permitted section, if the first switch 34A has already been operated, the mode controller 178 switches the driving mode to the second automated driving mode. When the host vehicle M exits the automated driving permitted section, the mode controller 178 switches the driving mode from the automated driving mode to the driving assistance mode or the automated driving mode.

The mode controller 178 controls the driving mode of the host vehicle M based on the operation input to the switch assembly 34. For example, when the first switch 34A is operated in the manual driving mode, the mode controller 178 switches the driving mode from the manual driving mode to the driving assistance mode. When the host vehicle M has entered the automated driving permitted section and the driving mode is switched to the second automated driving mode, the mode controller 178 enables operation input to the second switch 34B. For example, in the second automated driving mode, when the second switch 34B in which input operation is enabled is operated by a user, the mode controller 178 switches the driving mode to the automated lane change mode.

The mode controller 178 controls the driving mode of the host vehicle M based on the determination results of the first determiner 174 and the second determiner 176. For example, in the first automated driving mode, when hands-off is determined by the first determiner 174, the mode controller 178 determines that the occupant is not performing the second duty, and when eyes-off is determined by the second determiner 176, the mode controller 178 determines that the occupant is not performing the first duty. In this case, for example, the mode controller 178 switches the driving mode from the first automated driving mode to the driving assistance mode. For example, in the second automated driving mode, when eyes-off is determined by the second determiner 176, the mode controller 178 determines that the occupant is not performing the first duty. In this case, for example, the mode controller 178 switches the driving mode from the second automated driving mode to the driving assistance mode.

The mode controller 178 may control the driving mode based on a detection signal input from the driving operator 80. For example, in the automated driving mode or the driving assistance mode, when the occupant operates the steering wheel, the accelerator pedal, or the brake pedal with an operation amount exceeding a threshold value, the mode controller 178 may switch the driving mode to the manual driving mode.

The home lane determiner 180 determines a lane recognized as a host lane by the recognizer 130 when the driving mode is switched to the automated driving mode among one or a plurality of lanes recognized by the recognizer 130 as a home lane. The home lane is an example of a "reference lane."

The home lane is a lane in which it is determined to be reasonable for the automated driving control device 100 to cause the host vehicle M to travel or a lane in which the host vehicle M should travel as instructed by the occupant operating a direction indicator or the like. For example, when there is a branching point or merging point midway along the route to the destination and it is necessary to pass a preceding vehicle, the lane in which the host vehicle M should travel dynamically changes. Therefore, the home lane determiner 180 flexibly changes the home lane determined when the driving mode is switched to the automated driving mode according to the surrounding situation of the host vehicle M and an instruction of the occupant.

The HMI controller 182 controls the HMI 30 based on information acquired by the second acquirer 172 and causes the HMI 30 to output various types of information. For example, the HMI controller 182 causes the display device 32 (particularly, the first display 32A) of the HMI 30 to display a first layer image depicting the road on which the host lane, the adjacent lane and the like are recognized by the recognizer 130 and a second layer image depicting the home lane determined by the home lane determiner 180 which are superimposed. In addition, the HMI controller 182 may cause the display device 32 to display a third layer image depicting other vehicles such as the preceding vehicle mA, the forward reference vehicle mB, and the rearward reference vehicle mC recognized by the recognizer 130, a fourth layer image depicting the target trajectory generated by the action plan generator 140, and the like, which are superimposed on the first layer image or the second layer image.

Figure 7:
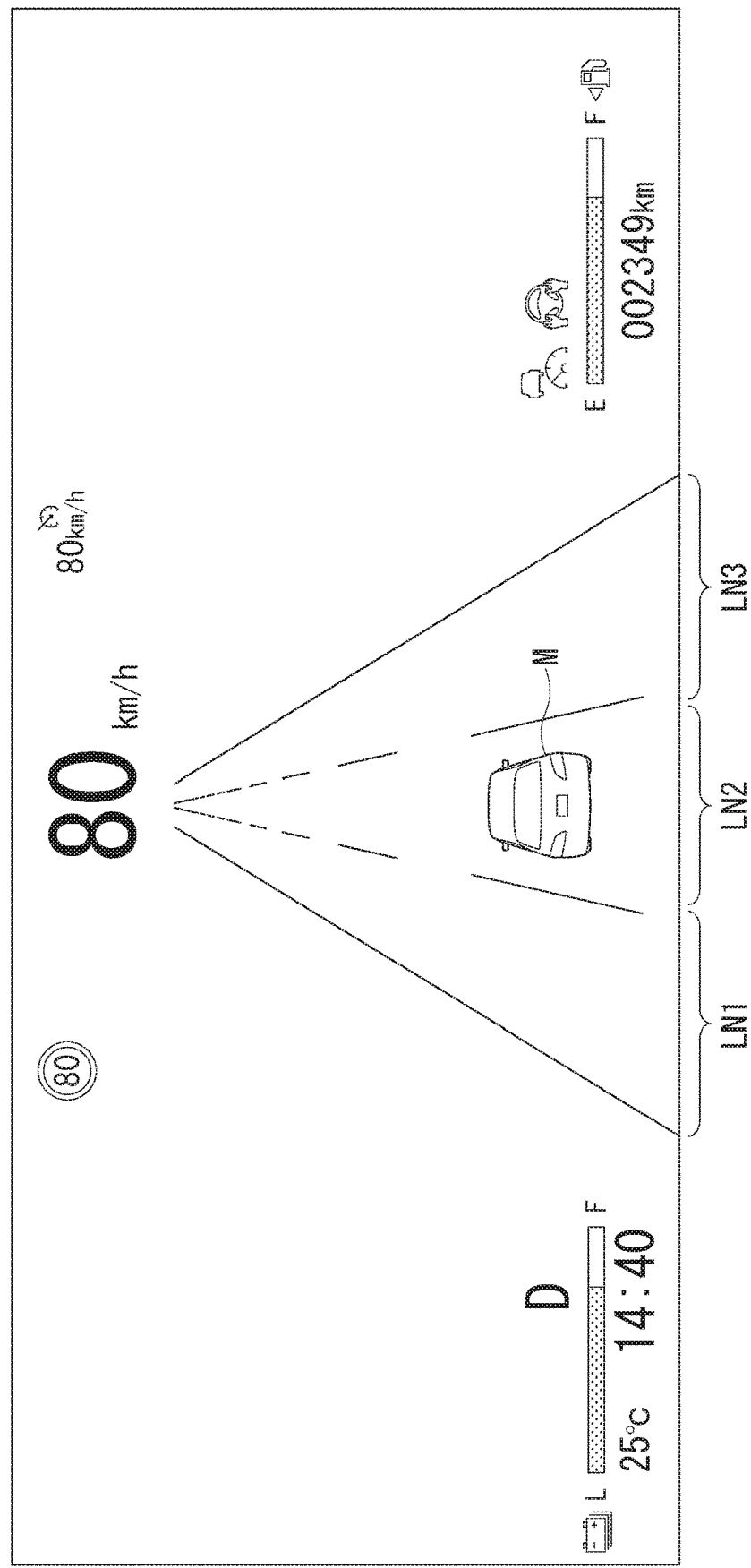
FIG. 7 is a diagram showing an example of a screen of a display device when a driving mode is a manual driving mode.

FIG. 7 is a diagram showing an example of a screen of the display device 32 when the driving mode is the manual driving mode. In the drawing, LN1 to LN3 indicate lanes recognized by the recognizer 130. In the example in the drawing, the HMI controller 182 causes a first layer image of a road including the three lanes LN1 to LN3 to be displayed on the screen of the display device 32.

Figure 8:
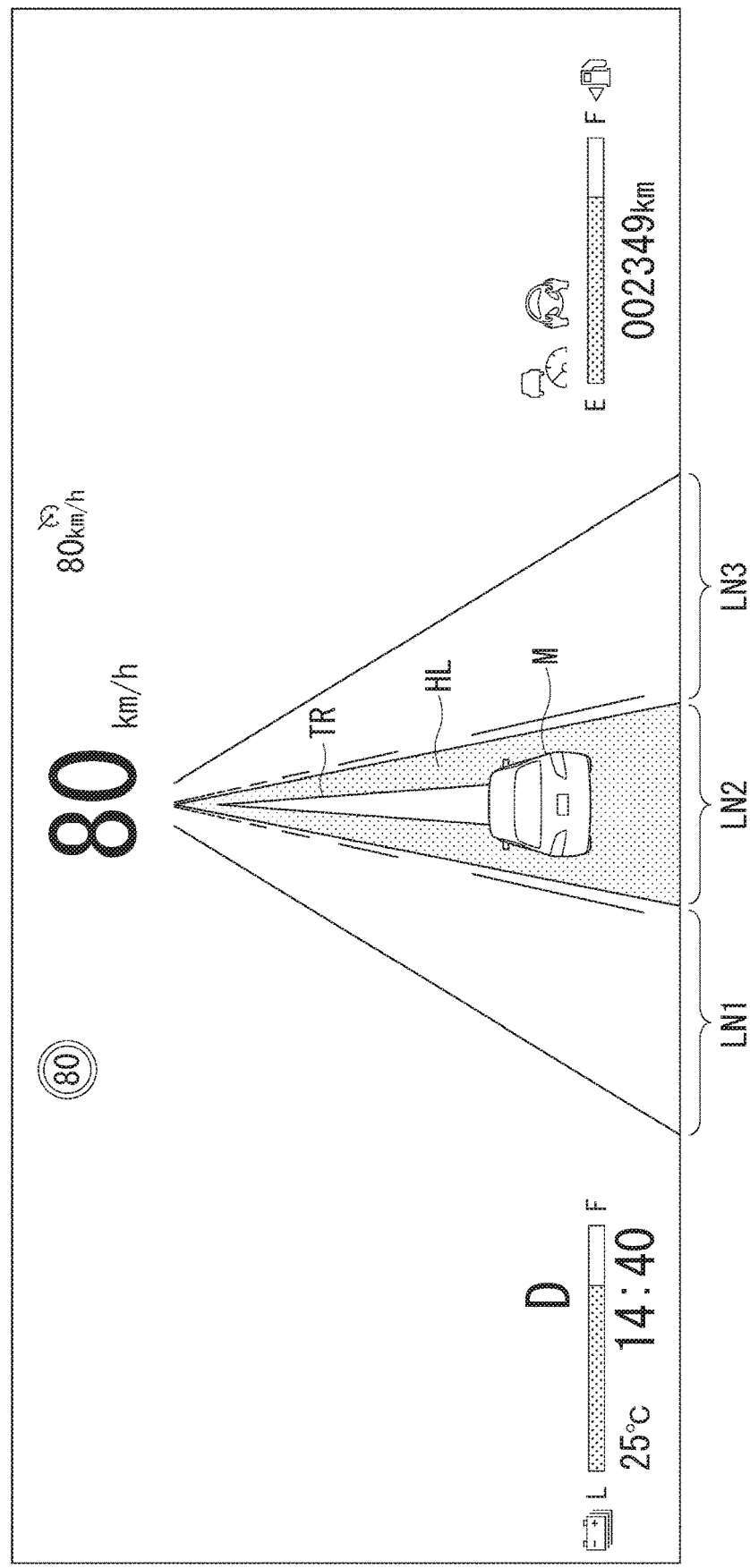
FIG. 8 is a diagram showing an example of a screen of the display device when the driving mode is an automated driving mode.

FIG. 8 is a diagram showing an example of a screen of the display device 32 when the driving mode is the automated driving mode. In the drawing, TR indicates a target trajectory, and HL indicates a home lane. In the example in the drawing, the HMI controller 182 additionally superimposes the second layer image of the home lane HL and the fourth layer image of the target trajectory TR in addition to the first layer image described in FIG. 7, and causes the display device 32 to display it. For example, the home lane TR may be colored in a different color from other lanes.

Figure 9:
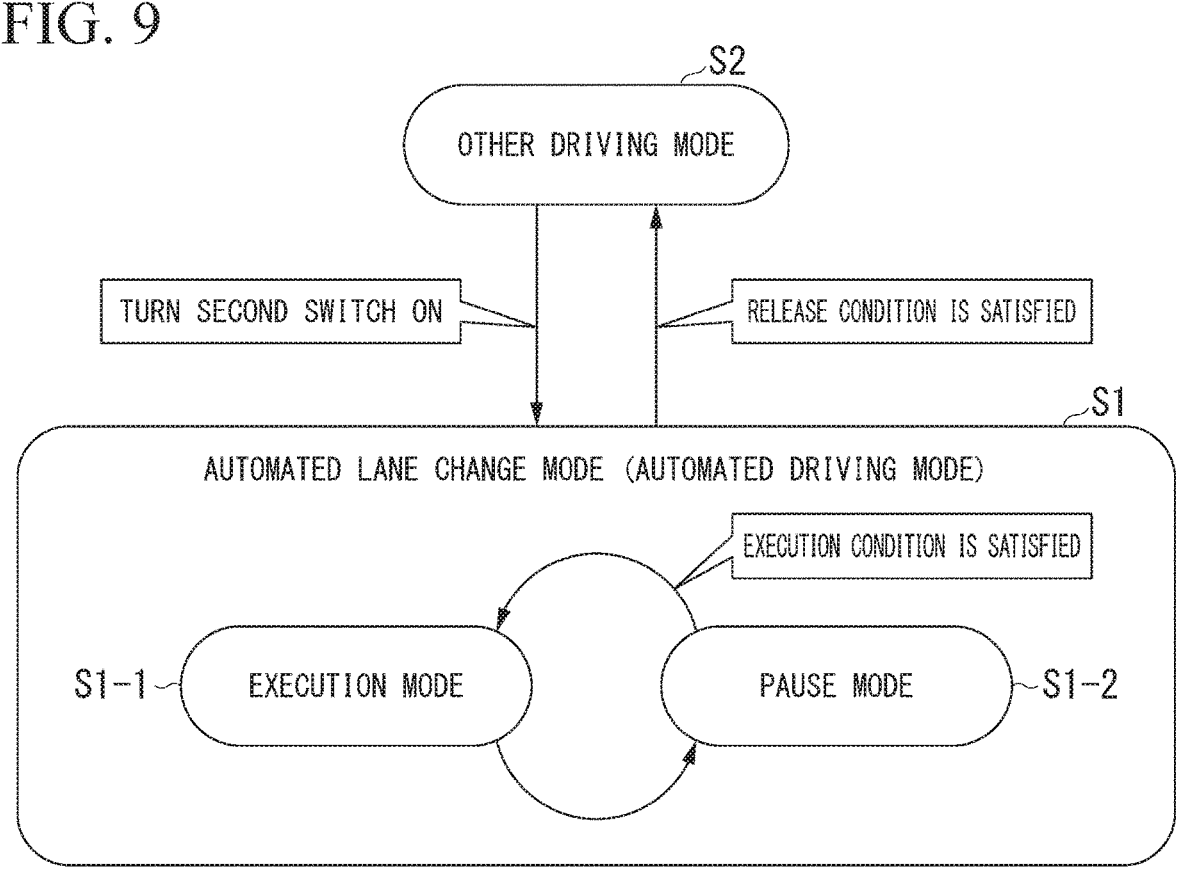
FIG. 9 is a diagram showing an example of a state transition diagram of the driving mode.

FIG. 9 is a diagram showing an example of a state transition diagram of the driving mode. In the drawing, S1 indicates an automated lane change mode which is one of the automated driving modes, and S2 indicates an automated driving mode other than the automated lane change mode S1, that is, an automated driving mode in which at least ALC is not performed. The other automated driving mode S2 is specifically an automated driving mode in which ACC and LKAS are performed in parallel, and traffic jam pilot (TJP) for controlling the steering and speed of the host vehicle M on a congested road is performed.

A condition for transition from the other automated driving mode S2 to the automated lane change mode S1 is that, as described above, the second switch 34B is operated, and the second switch 34B is turned on. On the other hand, a condition for transition from the automated lane change mode S1 to the other automated driving mode S2 is that a release condition of the automated lane change mode S1 is satisfied.

The release condition includes, for example, at least one of a condition that the second switch 34B has been operated and the second switch 34B is turned off, a condition that the direction indicator has been operated and ALC performed in the automated lane change mode S1 has been canceled, and a condition that the host vehicle M has exited the automated driving permitted section.

The automated lane change mode S1 includes an execution mode S1-1 and a pause mode S1-2. ALC is performed in the execution mode S1-1, and ALC is temporarily stopped in the pause mode S1-2. An execution condition is satisfied in the pause mode S1-2, and the state transitions from the pause mode S1-2 to the execution mode S1-1.

The execution conditions include, for example, a condition that there is no merging point or branching point in front of the host vehicle M in the travelling direction, a condition that various sensors are functioning properly and the recognizer 130 can recognize the situation surrounding the host vehicle M, a condition that the speed of the host vehicle M is less than a threshold value (for example, 60 [km/h]), a condition that the curvature of the road is less than a threshold value, a condition that an acceleration (also referred to as a lateral acceleration) generated in the host vehicle M in the vehicle width direction is less than a threshold value, a condition that the lane markings that partition off the host lane are not specific lane markings that prohibit lane change, and a condition that the recognizer 130 can recognize lane markings that partition off the host lane. The execution conditions may include a condition that the target trajectory generator 144 determines that it is possible to change lanes to the adjacent lane based on a TTC with vehicles around the lane change target position TAs.

When the execution conditions including these various conditions are not satisfied, the state transitions from the execution mode S1-1 to the pause mode S1-2. The above various conditions exemplified as execution conditions are only examples, and some of the conditions may be replaced with other conditions, some of the conditions may be omitted, and other conditions may be additionally added.

[Processing Flow]

Figure 10:
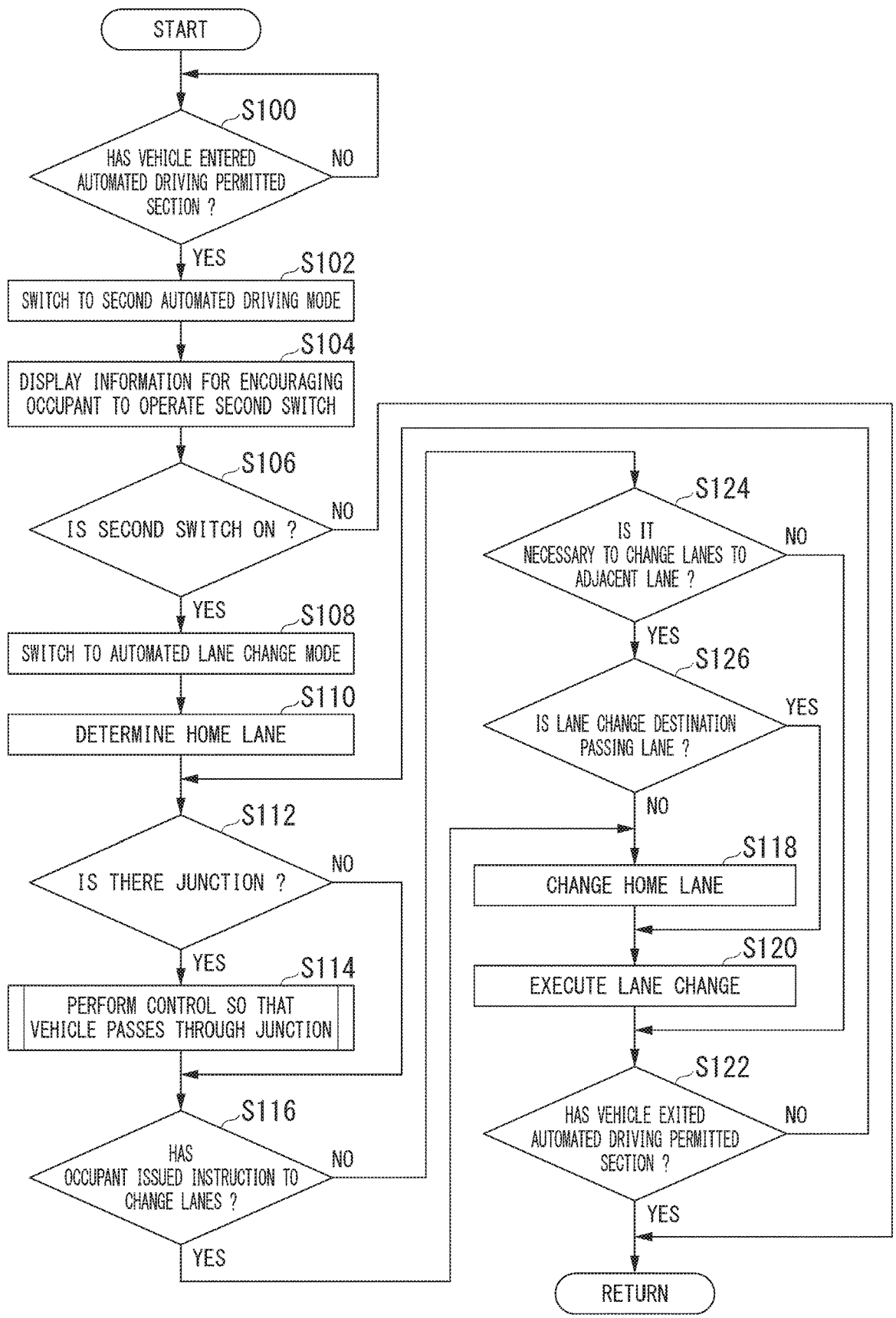
FIG. 10 is a flowchart showing an example of a flow of a series of processes performed by an automated driving control device according to an embodiment.

Hereinafter, a flow of a series of processes performed by the automated driving control device 100 according to the embodiment will be described with reference to a flowchart. FIG. 10 is a flowchart showing an example of a flow of a series of processes performed by the automated driving control device 100 according to the embodiment. For example, the processes of this flowchart may be repeatedly performed at a predetermined cycle when the first switch 34A is operated and the driving mode transitions to the driving assistance mode.

First, the recognizer 130 determines whether the host vehicle M has entered the automated driving permitted section (Step S100).

When the host vehicle M has entered the automated driving permitted section, the mode controller 178 switches the driving mode of the host vehicle M from the driving assistance mode to the second automated driving mode (Step S102).

Next, the HMI controller 182 causes the display device 32 to display information for encouraging the occupant to operate (turn on) the second switch 34B in the second automated driving mode (hereinafter referred to as prompting information) (Step S104).

FIG. 11 is a diagram showing an example of a screen of the display device 32 on which prompting information is displayed. As in the example shown, the HMI controller 182 may cause the display device 32 to display text or an image indicating what kind of function is a function of driving assistance provided by operating the second switch 34B.

As described above, switching to the driving assistance mode is performed by operating the first switch 34A, and switching to the automated lane change mode which is one of the automated driving modes is performed by operating the second switch 34B which is physically different from the first switch 34A. Therefore, even if the first switch 34A is operated, steering control or speed control of the host vehicle M is allowed under constraint conditions that the host vehicle M does not deviate from the host lane such as ACC and LKAS, and steering control such as crossing a plurality of lanes as in ALC or speed control associated therewith is not allowed unless the second switch 34B is operated.

Among users in the host vehicle M, some users may perform driving assistance with speed control or steering control within the host lane, but they may think that they do not want to perform automated driving with steering control such as moving to another lane. Therefore, in the present embodiment, when one physical switch (including a switch that functions as two switches virtually but is physically one) is operated, instead of switching from the manual driving mode to the automated lane change mode which substantially including the driving assistance mode, the switch is physically separated into a switch that triggers switching to the driving assistance mode and a switch that triggers switching to the automated lane change mode, and switching is gradually performed to the driving mode with a higher degree of control according to the operation of each switch. Thereby, appropriate automated driving (including driving assistance) can be performed according to the user's request.

Next, the mode controller 178 determines whether the second switch 34B is operated (turned on) (Step S106). It is considered that, when the second switch 34B is not operated (not turned on), the mode controller 178 determines that the user does not want a function such as ALC provided in the automated lane change mode, and ends the process of this flowchart.

On the other hand, when the second switch 34B is operated (turned on), the mode controller 178 switches the driving mode to the automated lane change mode (Step S108). The automated lane change mode switched at the timing of the process of S108 is the second automated driving mode in which the first duty is imposed.

Next, the home lane determiner 180 determines a lane recognized as a host lane by the recognizer 130 among one or a plurality of lanes recognized by the recognizer 130 when the driving mode is switched to the automated lane change mode as the home lane (Step S110).

For example, when the second switch 34B is operated after the host vehicle M has entered the automated driving permitted section, the home lane determiner 180 determines a lane recognized as a host lane by the recognizer 130 at the timing at which the second switch 34B is operated as the home lane.

Next, when the host vehicle M travels along the route to the destination, the recognizer 130 determines whether there is a junction through which the host vehicle M should pass in front of the host vehicle M in the travelling direction (Step S112). When there is a junction through which the host vehicle M should pass in front of the host vehicle M in the travelling direction, the automated driving control device 100 performs control so that the vehicle is caused to pass through the junction (hereinafter referred to as junction traffic control) (Step S114). A detailed description of the junction traffic control will be described below.

On the other hand, when there is no junction through which the host vehicle M should in front of the host vehicle M in the travelling direction, the home lane determiner 180 determines whether the occupant is issuing an instruction to change lanes (Step S116).

For example, when the occupant operates the lever of the direction indicator, the home lane determiner 180 determines that the lane change has been instructed. Operating the lever of the direction indicator to instruct a lane change is also called a one-touch function. The lane change instruction may be performed, in addition to or instead of operating the lever of the direction indicator, by inputting sound to a microphone, or by operating other switches or buttons. The lever of the direction indicator, the microphone, and other switches and buttons are examples of the "detector."

When the occupant issues an instruction to change lanes, the home lane determiner 180 changes the lane of the instructed lane change destination to a new home lane (Step S118). For example, when the occupant activates the direction indicator and instructs the vehicle to turn right, the home lane determiner 180 changes a lane adjacent to the right side of the host lane when viewed from the host vehicle M in the travelling direction to a new home lane.

When the occupant is issuing an instruction to change lanes, the action plan generator 140 plans a lane change event and generates a target trajectory for causing the host vehicle M to change lanes to the lane instructed by the occupant. In this case, the action plan generator 140 sets the lane change target position TAs in the lane instructed by the occupant and determines whether it is possible to change lanes based on TTC with other vehicles around the lane change target position TAs. For example, if it is determined that it is not possible to change lanes when the lane change is instructed by the occupant, the action plan generator 140 temporarily suspends the instruction and continues a determination of whether it is possible to change lanes while changing the lane change target position TAs. Then, the action plan generator 140 outputs the target trajectory to the second controller 160 when it is determined that it is possible to change lanes. Thereby, the automated driving control device 100 causes the host vehicle M to change lanes to the lane instructed by the occupant (Step S120).

Next, the recognizer 130 determines whether the host vehicle M has exited the automated driving permitted section (Step S122). When the host vehicle M has not exited the automated driving permitted section, the automated driving control device 100 returns the process to S112, and ends the process of this flowchart when the host vehicle M has exited the automated driving permitted section.

On the other hand, when it is determined that the occupant is not issuing an instruction to change lanes in the process of S116, the action plan generator 140 determines whether it is necessary to change lanes to the adjacent lane (Step S124). For example, when the recognizer 130 recognizes that there is an obstacle in front of the host vehicle M on the host lane, the action plan generator 140 determines that it is necessary to change lanes to the adjacent lane. The obstacle is an object that hinders traveling of the host vehicle M, and examples thereof include an object whose absolute speed or relative speed with respect to the host vehicle M is equal to or larger than a threshold value and an object whose movement amount in a road width direction is equal to or larger than a threshold value. Specific examples of obstacles include a preceding vehicle or a meandering preceding vehicle that is significantly slower than the host vehicle M and a falling object that has fallen on the road.

When it is determined that it is necessary to change lanes to the adjacent lane, the action plan generator 140 additionally determines whether the lane of the lane change destination is a passing lane (Step S126).

When the action plan generator 140 determines that the lane of the lane change destination is not a passing lane, the home lane determiner 180 advances the process to S118, and determines an adjacent lane to which the lane is changed temporarily in order to pass the object ahead as a new home lane.

On the other hand, when the action plan generator 140 determines that the lane of the lane change destination is a passing lane, the home lane determiner 180 omits the process of S118 and does not change the home lane. Then, the automated driving control device 100 advances the process to S120 and S122, changes the lane of the host vehicle M to the adjacent lane in order to pass the object ahead and then determines whether the host vehicle M has exited the automated driving permitted section. Thereby, the process of this flowchart ends.

[Flow of Junction Traffic Control]

Figure 12:
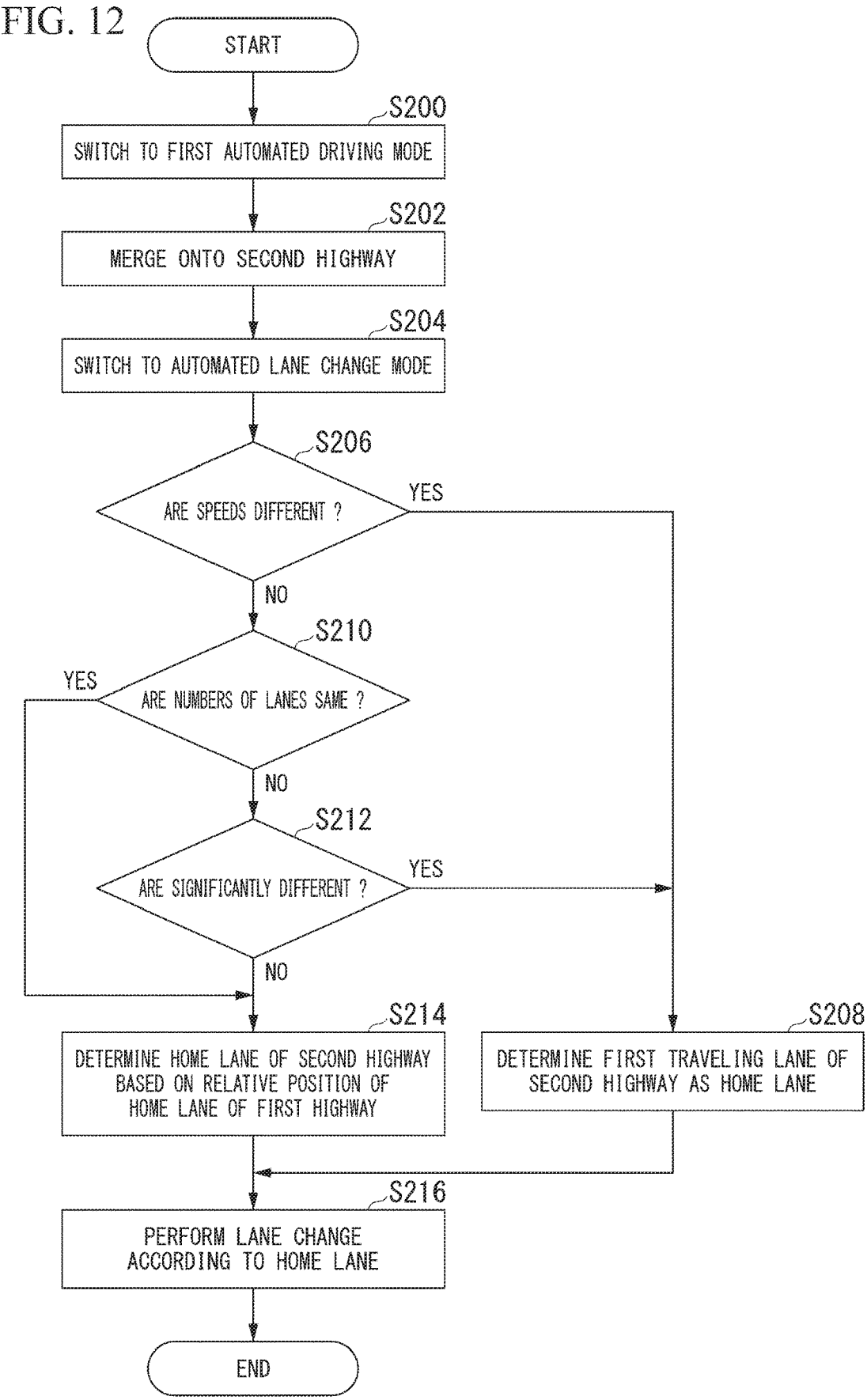
FIG. 12 is a flowchart showing an example of a flow of a junction traffic control process.

FIG. 12 is a flowchart showing an example of a flow of a junction traffic control process. In the following description, a junction that connects at least two highways will be described. Between two highways connected via a junction, based on the travelling direction of the host vehicle M, one highway on the side in front of the junction will be referred to as a "first highway" and the other highway behind the junction will be referred to as a "second highway." The first highway is an example of a "first road," and the second highway is an example of a "second road." The home lane of the first highway is an example of a "first reference lane," and the home lane of the second highway is an example of a "second reference lane."

First, when the host vehicle M enters the junction from the first highway, the mode controller 178 switches the driving mode from the automated lane change mode (second automated driving mode) to the first automated driving mode in which the degree of duty imposed on the occupant is higher (Step S200).

Next, the action plan generator 140 generates a target trajectory for causing the host vehicle M to merge onto the second highway from the junction. In this case, the action plan generator 140 may use a gradually increasing or decreasing target acceleration as a speed element of the target trajectory so that the vehicle can smoothly merge onto the second highway ahead of the junction. Then, the second controller 160 controls the steering and speed of the host vehicle M based on the target trajectory and causes the host vehicle M to merge onto the second highway from the junction (Step S202).

Next, the mode controller 178 switches the driving mode from the first automated driving mode to the automated lane change mode (Step S204).

Next, the home lane determiner 180 determines whether the speed of the host vehicle M is different before and after passing through the junction (Step S206). For example, the home lane determiner 180 compares a legal speed of the first highway on which the vehicle has traveled before entering the junction with a legal speed of the second highway onto which the vehicle has merged from the junction, and determines that the speed of the host vehicle M is the same before and after passing through the junction when these legal speeds are the same, and determines that the speed of the host vehicle M is different before and after passing through the junction when these legal speeds are different from each other.

These speeds need not exactly match and certain errors may be allowed. For example, the home lane determiner 180 may determine that two speeds to be compared are the same when the speed difference is about several [km/h] or several tens of [km/h], and may determine that two speeds to be compared are the same when the speed ratio is within ±several [%] or several tens of [%] based on 1.0. Specifically, when the threshold value of the speed difference is 20 [km/h] or the threshold value of the speed ratio is 80[%], the legal speed of the first highway is 80 [km/h], and the legal speed of the second highway is 120 [km/h]. In this case, since the speed difference is 40 [km/h] and the speed ratio is 0.67, the error is outside an allowable range. Therefore, the home lane determiner 180 determines that the speed of the host vehicle M is different before and after passing through the junction.

Instead of or in addition to the legal speed, the home lane determiner 180 compares a set speed (for example, a speed range from a lower speed limit of 60 [km/h] to an upper speed limit of 120 [km/h]) under automated driving (for example, ACC) with an average speed of other vehicles that travel on the highway, and thus it may be determined whether the speed of the host vehicle M is different before and after passing through the junction.

When it is determined that the speed of the host vehicle M is different before and after passing through the junction, that is, when a rapid acceleration or deceleration is required when passing through the junction, the home lane determiner 180 determines the first traveling lane among one or a plurality of lanes included in the second highway as the home lane (Step S208). The first traveling lane is also called a slow lane and is a lane in which the speed of vehicles that pass is the slowest. For example, in countries and regions with the left-hand traffic regulations and custom, the first traveling lane is the leftmost lane.

On the other hand, when it is determined that the speed of the host vehicle M is the same before and after passing through the junction, the home lane determiner 180 determines whether the number of lanes of the first highway and the number of lanes of the second highway are the same (Step S210).

When it is determined that the number of lanes of the first highway is different from the number of lanes of the second highway, the home lane determiner 180 additionally determines whether the numbers of lanes are significantly different from each other (Step S212). "Significantly different" means that, for example, a ratio (B/A) when the number of lanes of the first highway A is the denominator and the number of lanes of the second highway B is the numerator is less than a first threshold value (for example, 50[%]) (that is, when the number of lanes B is smaller) or the ratio (B/A) is equal to or larger than a second threshold value (for example, 200[%]) (that is, when the number of lanes A is smaller). "Significantly different" may mean that the difference (absolute value A-B) between the number of lanes of the first highway A and the number of lanes of the second highway B is equal to or less than a third threshold value (for example, 1).

When it is determined that the number of lanes of the first highway and the number of lanes of the second highway are significantly different, the home lane determiner 180 advances the process to S208 and determines the first traveling lane of the second highway as the home lane.

On the other hand, when it is determined that the number of lanes of the first highway and the number of lanes of the second highway are not significantly different but substantially the same, the home lane determiner 180 determines the home lane of the second highway based on a relative position of the home lane with respect to one or a plurality of lanes included in the first highway (Step S214).

In addition to or instead of the process of S212, the home lane determiner 180 may determine whether a traveling distance that the host vehicle M travels on the second highway after passing through the junction is equal to or larger than a threshold value. In this case, when the traveling distance in the second highway is shorter than a threshold value, the home lane determiner 180 advances the process to S208, and determines the first traveling lane of the second highway as the home lane. On the other hand, when the traveling distance in the second highway is longer than a threshold value, the home lane determiner 180 advances the process to S214, and determines the home lane of the second highway based on a relative position of the home lane in the first highway. A scenario in which a traveling distance on the second highway is shorter than a threshold value is, for example, a scenario in which the vehicle travels on the second highway through the first junction but approaches the second junction toward a third highway as a movement destination or a scenario in which the vehicle immediately exits the second highway and moves down to a general road.

Next, the action plan generator 140 generates a target trajectory for causing the host vehicle M to change lanes to the home lane according to the position of the home lane. Then, the second controller 160 controls the steering and speed of the host vehicle M based on the target trajectory and causes the host vehicle M to change lanes to the home lane (Step S216). Thereby, the process of this flowchart ends.

[Scenario Description-Part 1-]

Figure 13:
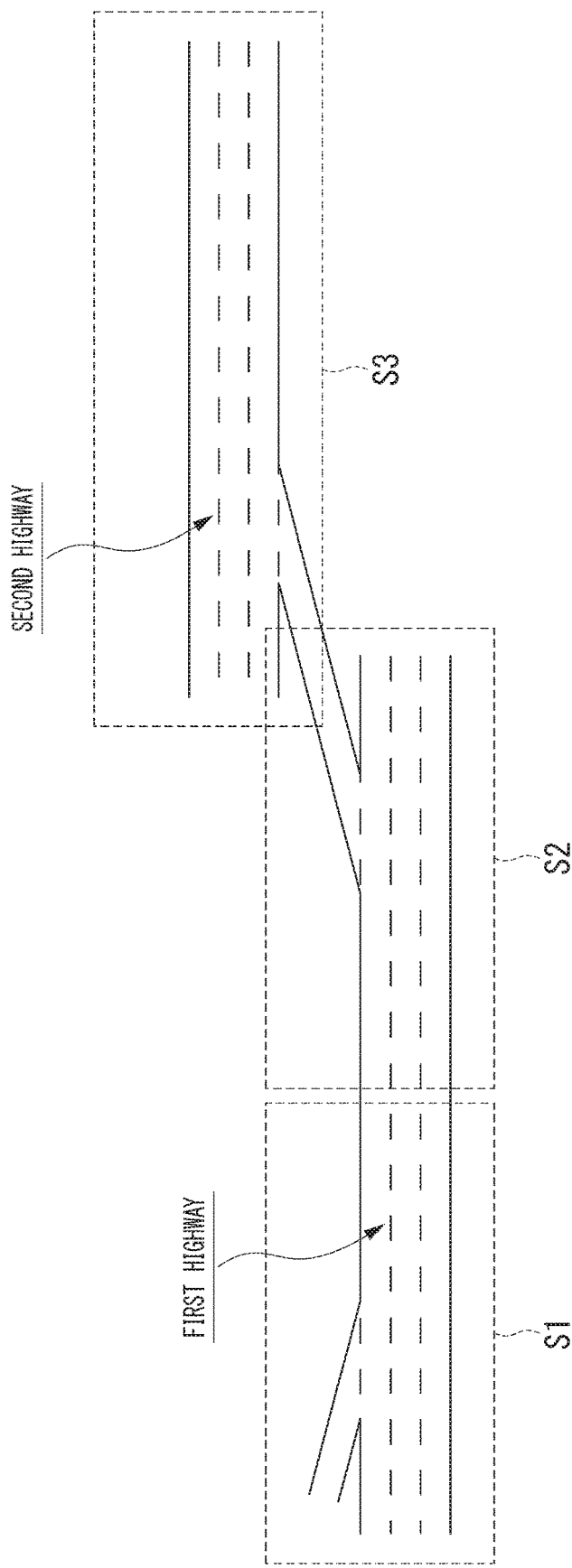
FIG. 13 is a diagram showing an example of a first highway and a second highway which are connected to each other via a junction.

Hereinafter, a method of determining a home lane on the second highway will be described with reference to some exemplary scenarios. FIG. 13 is a diagram showing an example of the first highway and the second highway which are connected to each other via a junction. In the shown example, the second highway is present on the left side of the first highway. Hereinafter, the first highway and the second highway will be described by dividing them into sections S1, S2, and S3. In order to simplify description, the numbers of lanes of the first highway and the second highway are the same, and the legal speeds and average speeds of vehicles that pass are the same.

Figure 14:
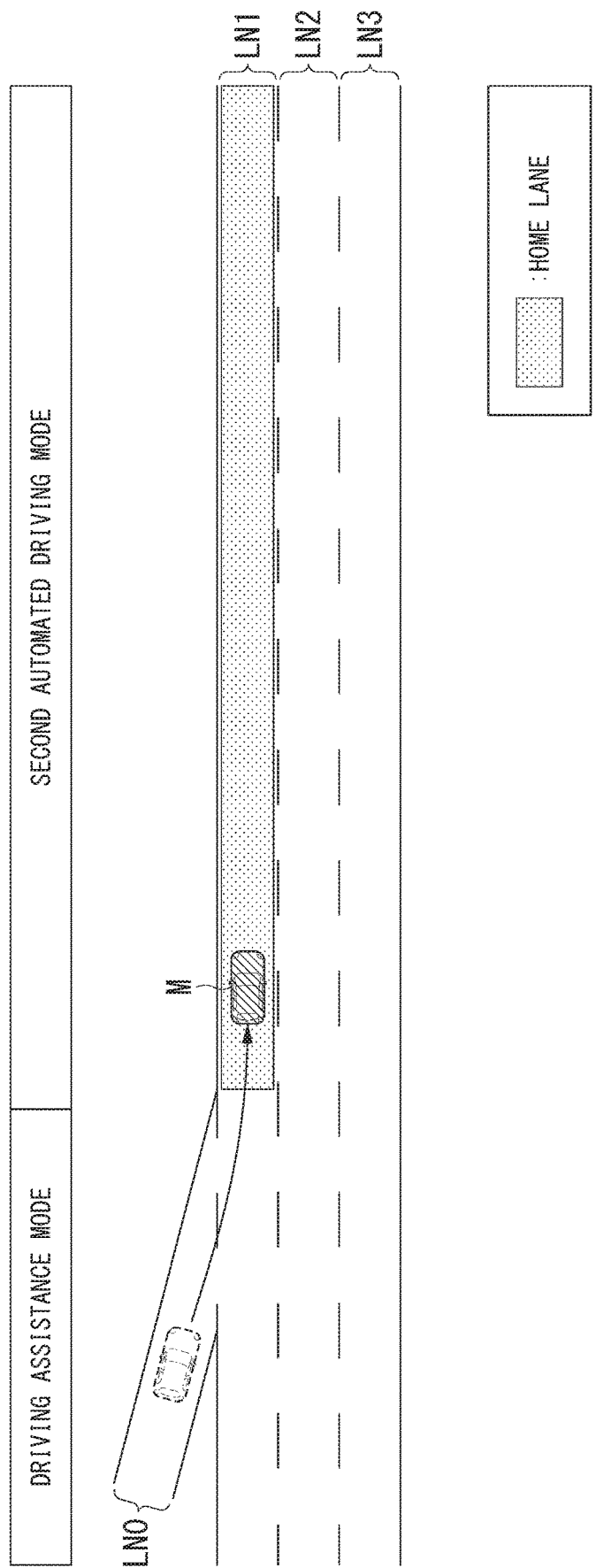
FIG. 14 is a diagram showing an example of a scenario in which the host vehicle travels in a section.

FIG. 14 is a diagram showing an example of a scenario in which the host vehicle M travels in the section S1. In the drawing, LN0 indicates a branch line that merges onto the first highway (hereinafter referred to as a merging lane), and LN1 to LN3 indicate lanes included in the first highway as the main line. Among the lanes LN1 to LN3, the lane LN3 indicates a passing lane, the lane LN1 farthest from the passing lane LN3 indicates a first traveling lane, and the lane between the passing lane LN3 and the first traveling lane LN1 indicates a second traveling lane.

For example, while the host vehicle M travels on the merging lane LN0, the mode controller 178 determines the driving mode as the driving assistance mode. In this case, in principle, the occupant causes the host vehicle M to merge into the first traveling lane LN1 by manual driving. When the host vehicle M changes lanes from the merging lane LN0 to the first traveling lane LN1, the mode controller 178 switches the driving mode from the driving assistance mode to the second automated driving mode. In response to this, the HMI controller 182 causes the display device 32 to display prompting information for encouraging the occupant to operate (turn on) the second switch 34B. In the shown example, since the occupant quickly operates the second switch 34B, the driving mode transitions to the automated lane change mode at substantially the same timing at which the host vehicle M enters the first highway. Therefore, the home lane determiner 180 determines the first traveling lane LN1 as the home lane as illustrated.

Figure 15:
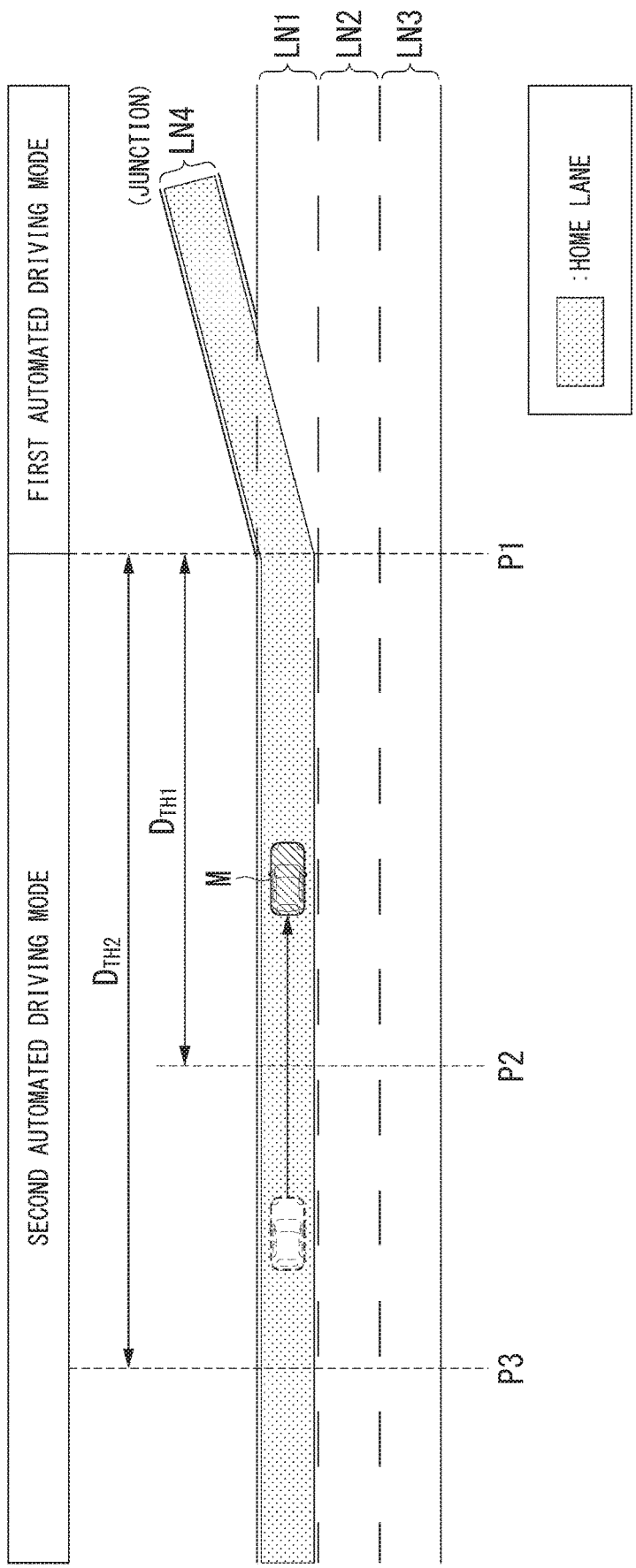
FIG. 15 is a diagram showing an example of a scenario in which the host vehicle travels in a section.

FIG. 15 is a diagram showing an example of a scenario in which the host vehicle M travels in the section S2. In the drawing, LN4 indicates a branch line branching from the first highway (hereinafter referred to as a branch lane). In the shown example, among lanes LN1 to LN3 as the main lines, the branch lane LN4 is connected to the first traveling lane LN1, and additionally, the second highway is connected to the branch lane LN4. That is, the branch lane LN4 is a rampway that connects the first highway and the second highway, and functions as a junction. P1 indicates a branching point at which the branch line is branched from the first highway (an example of a connection point), P2 indicates a start point of a lane change according to the branching point P1, and P3 indicates a position at which a relative position of the home lane is determined. The start point P2 of the lane change is set to a point before a first predetermined distance $D_{TH1}$ from the branching point P1 when viewed from the host vehicle M. The first predetermined distance $D_{TH1}$ is, for example, a distance of about several [km]. The determination position P3 is set to a point before the second predetermined distance $D_{TH2}$ from the branching point P1 when viewed from the host vehicle M. The second predetermined distance $D_{TH2}$ is a distance longer than the first predetermined distance $D_{TH1}$.

In the case of scenarios illustrated, the host vehicle M needs to change lanes from the main line to the branch lane LN4. In this case, if the host vehicle M is not traveling the first traveling lane LN1, the action plan generator 140 plans a lane change event in which the host vehicle M is caused to change lanes to the first traveling lane LN1 at the lane change start point P2.

In addition, the home lane determiner 180 determines the first traveling lane LN1 as the home lane up to the branching point P1. Specifically, the home lane determiner 180 determines a section from the branching point P1 to the start point P2 of the lane change as the home lane. In the shown example, since the host vehicle M travels on the first traveling lane LN1, the first traveling lane LN1 is always determined as the home lane. Therefore, the home lane is the leftmost first traveling lane LN1 among three lanes at the time of the determination position P3. In another point of view, when the lane determined as the home lane is a numbered lane from the first traveling lane LN1, the home lane indicates the $0^{th}$ lane, that is, the first traveling lane LN1, at the time of the determination position P3.

When the first traveling lane LN1 is determined as the home lane up to the branching point P1, the home lane determiner 180 determines the branch lane LN4 as the home lane at the branching point P1 or thereafter. When the host vehicle M enters the branch lane LN4, the mode controller 178 switches the driving mode from the second automated driving mode to the first automated driving mode.

Figure 16:
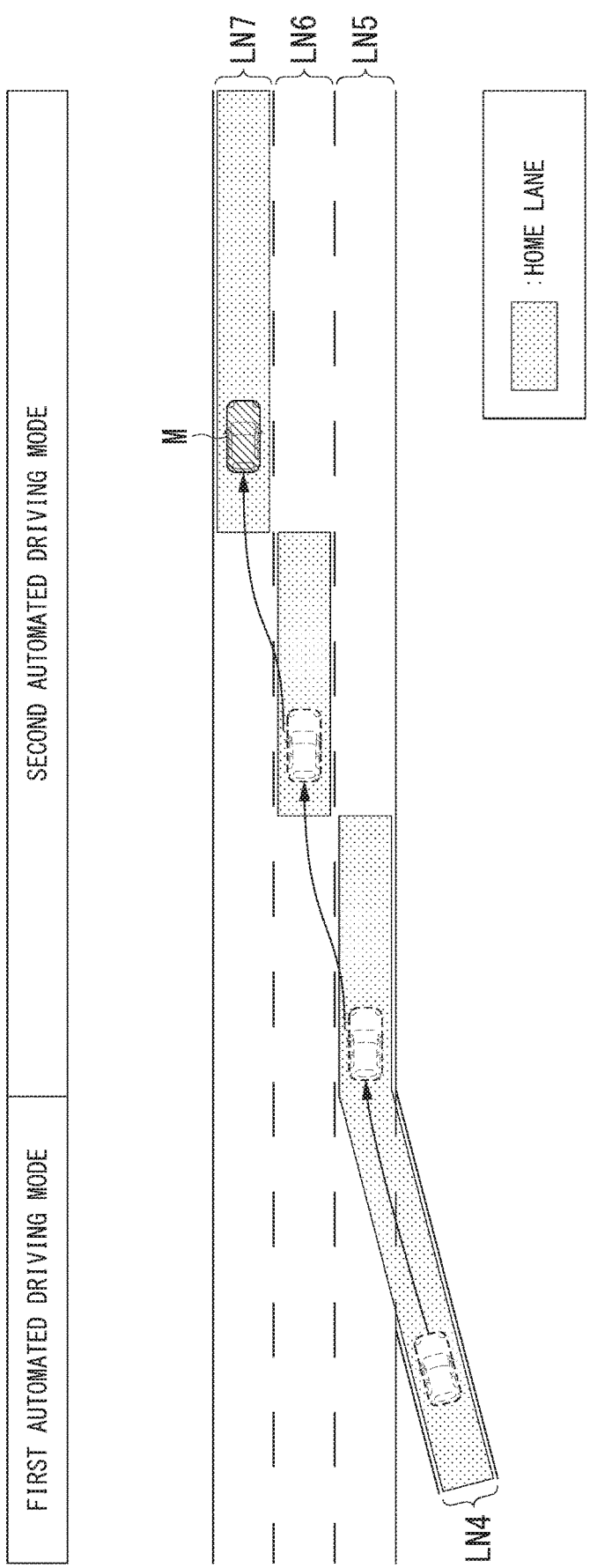
FIG. 16 is a diagram showing an example of a scenario in which the host vehicle travels in a section.

FIG. 16 is a diagram showing an example of a scenario in which the host vehicle M travels in the section S3. In the drawing, LN5 to LN7 indicate lanes included in the second highway. That is, the second highway has the same number of lanes as the first highway. Among the lanes LN5 to LN7, the lane LN5 indicates a passing lane, the lane LN7 farthest from the passing lane LN3 indicates a first traveling lane, and a lane between the passing lane LN5 and the first traveling lane LN7 indicates a second traveling lane. The branch line LN4 as a branch lane of the first highway including the lanes LN1 to LN3 is a merging lane of the second highway including the lanes LN5 to LN4 in this scenario.

In the shown example, the merging lane LN4 is connected to the passing lane LN5. In this case, among three lanes LN5 to LN7, the home lane determiner 180 determines a lane at the same position as a relative position of the lane determined as the home lane at the determination position P3 of the section S2 as the home lane in the second highway. In the scenario exemplified in FIG. 15, the home lane at the time of the determination position P3 is the leftmost first traveling lane LN1 among three lanes. Therefore, the home lane determiner 180 determines the leftmost first traveling lane LN7 among three lanes as the home lane in the second highway.

In this case, when the lane into which the host vehicle M merges and the lane determined as the home lane are different from each other, the home lane determiner 180 may determine a lane interposed between these lanes as a temporary home lane. In the shown example, a lane into which the host vehicle M merges is the rightmost passing lane LN5 among three lanes, and lane determined as the home lane is the leftmost first traveling lane LN7 among three lanes. Therefore, the home lane determiner 180 determines the second traveling lane LN6 as a temporary home lane.

The home lane for the second traveling lane LN6 is set in a section with a certain length in order to prevent a plurality of lane changes from being continuously performed before moving from the passing lane LN5 to the first traveling lane LN7 (in order to allow a lane change at certain intervals). Specifically, the distance is about several tens of [m] to several hundreds of [m].

When the host vehicle M merges into the passing lane LN5 from the merging lane LN4, the mode controller 178 returns to the driving mode to the original automated lane change mode. When the driving mode returns to the automated lane change mode, the action plan generator 140 plans a lane change event in which lanes are caused to be gradually changed from the passing lane LN5 into which the host vehicle M merges to the first traveling lane LN7 as the home lane. As a result, the host vehicle M moves from the passing lane LN5 to the first traveling lane LN7.

In this case, since the passing lane LN5 into which the host vehicle M merges from the merging lane LN4 is different from the first traveling lane LN7 as the home lane, the action plan generator 140 determines the speed element and the position element of the target trajectory based on a relative position between the passing lane LN5 and the first traveling lane LN7. For example, when the home lane determined based on a relative position of the home lane of the first highway is a lane on the left side of a lane into which the host vehicle M merges from the junction, compared to when the home lane is a lane on the right side of a lane into which the host vehicle M merges from the junction, the action plan generator 140 reduces a target speed or shortens a traveling distance when the lane is changed to a lane determined as the home lane from the merged lane. In the shown example, since the home lane determined based on a relative position of the home lane of the first highway is the first traveling lane LN7, and the lane into which the host vehicle M merges from the junction is the passing lane LN5, the action plan generator 140 reduces a target speed or shortens a traveling distance when the lane is changed from the passing lane LN5 to the first traveling lane LN7.

In this manner, when the vehicle moves different highways through the junction, since the home lane is determined in the same relative positional relationship with respect to the second highway according to a relative position of the home lane of the first highway, it is possible to prevent the relative position of the home lane from changing before and after passing through the junction. As a result, when the first layer image and the second layer image that are superimposed are displayed on the display device 32, it is possible to allow the occupant to understand the lane in which the host vehicle M travels in the automated driving mode without causing the occupant who watches the screen of the display device 32 to feel uncomfortable.

Figure 17:
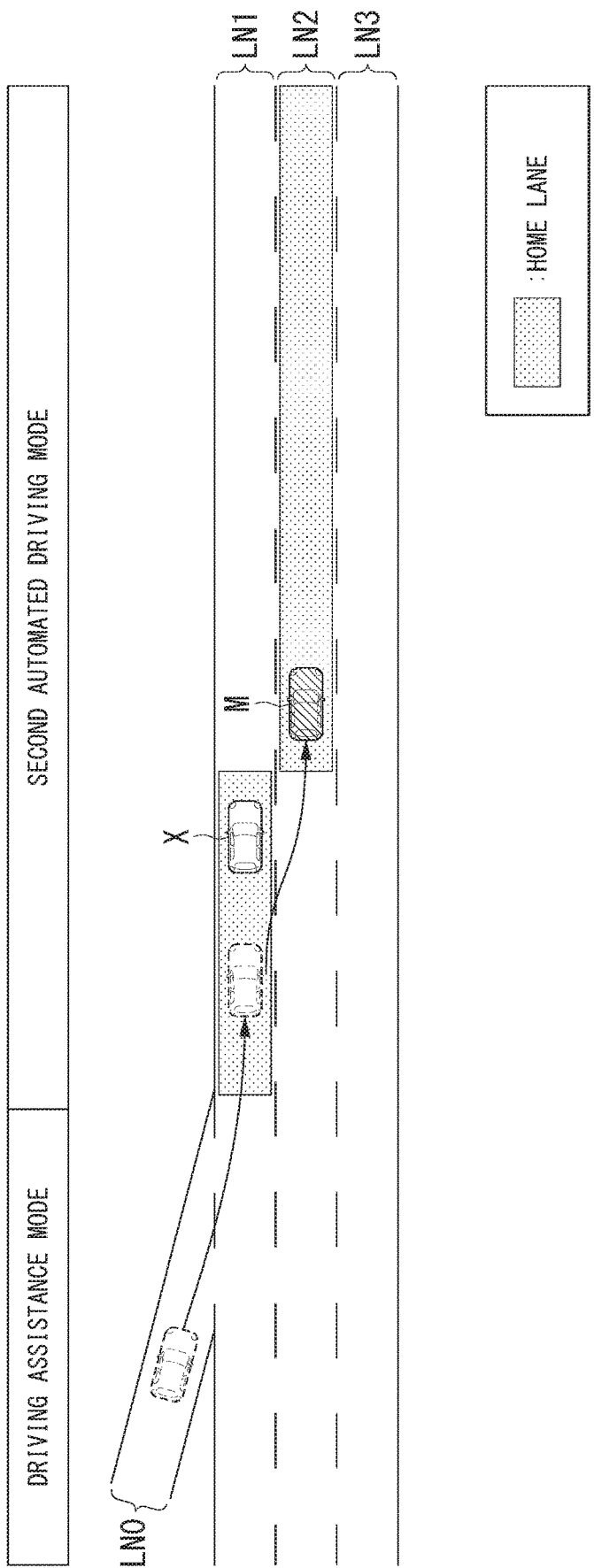
FIG. 17 is a diagram showing another example of the scenario in which the host vehicle travels in a section.

FIG. 17 is a diagram showing another example of the scenario in which the host vehicle M travels in the section S1. In the drawing, X indicates a preceding vehicle whose speed is lower than the host vehicle M and whose relative speed with respect to the host vehicle M is equal to or larger than a threshold value. In the case of scenarios illustrated, the action plan generator 140 determines that it is necessary to change lanes to an adjacent lane in order to cause the host vehicle M to pass the preceding vehicle X. Then, the action plan generator 140 plans a passing event which is a type of lane change event, and determines that the host vehicle M will be caused to change lanes to an adjacent second traveling lane LN2. In response to this, the home lane determiner 180 changes the home lane from the first traveling lane LN1 to the second traveling lane LN2. The action plan generator 140 generates a target trajectory for causing the host vehicle M to change lanes to the second traveling lane LN2 based on the passing event, and outputs information on the target trajectory to the second controller 160. The second controller 160 controls the speed and steering based on the target trajectory and causes the host vehicle M to change lanes to the second traveling lane LN2 according to automated driving.

Figure 18:
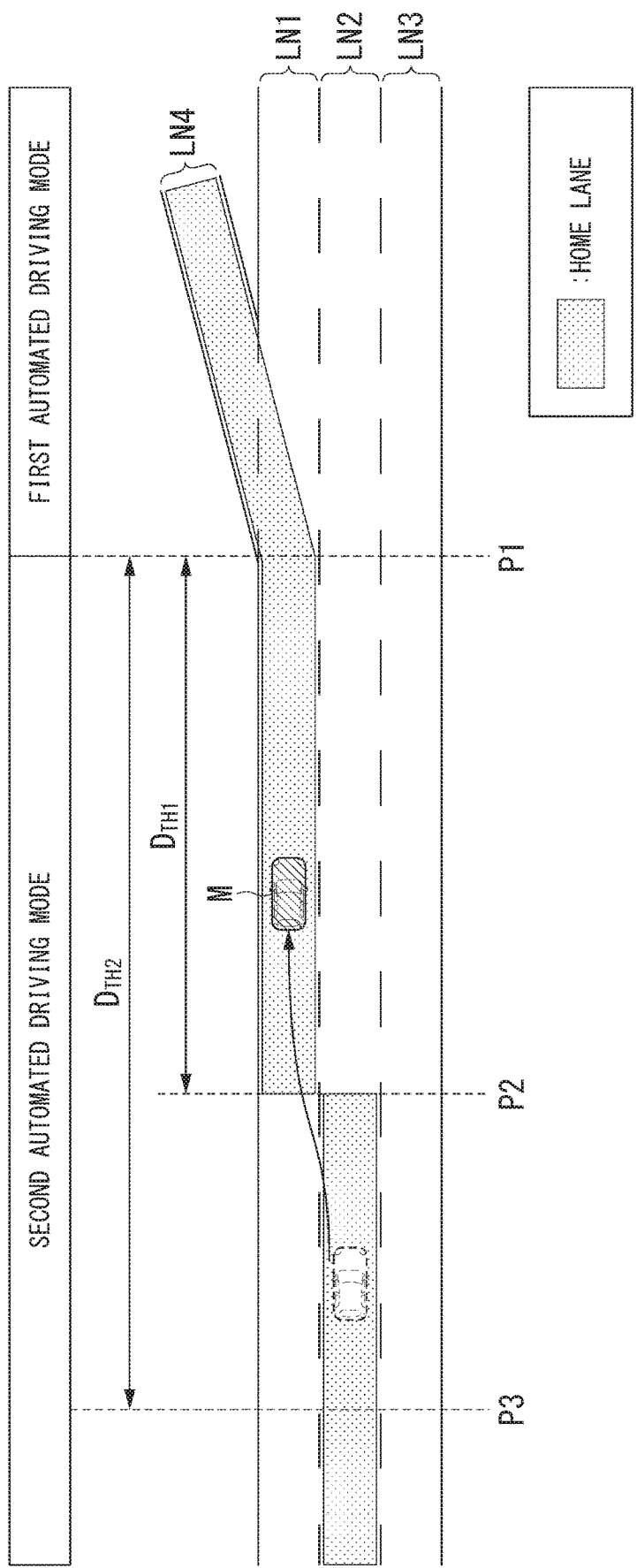
FIG. 18 is a diagram showing another example of the scenario in which the host vehicle travels in a section.

FIG. 18 is a diagram showing another example of the scenario in which the host vehicle M travels in the section S2. As in the scenario of FIG. 17, the illustrated example shows a scenario in which the home lane is determined as the second traveling lane LN2 in the section S1 and then the host vehicle M has entered the section S2. Since the host vehicle M needs to change lanes from the main line to the branch lane LN4, the action plan generator 140 plans a lane change event in which the host vehicle M is caused to change lanes from the second traveling lane LN2 to the first traveling lane LN1 at the lane change start point P2. Accordingly, the home lane determiner 180 changes the home lane from the second traveling lane LN2 to the first traveling lane LN1 at the lane change start point P2.

Figure 19:
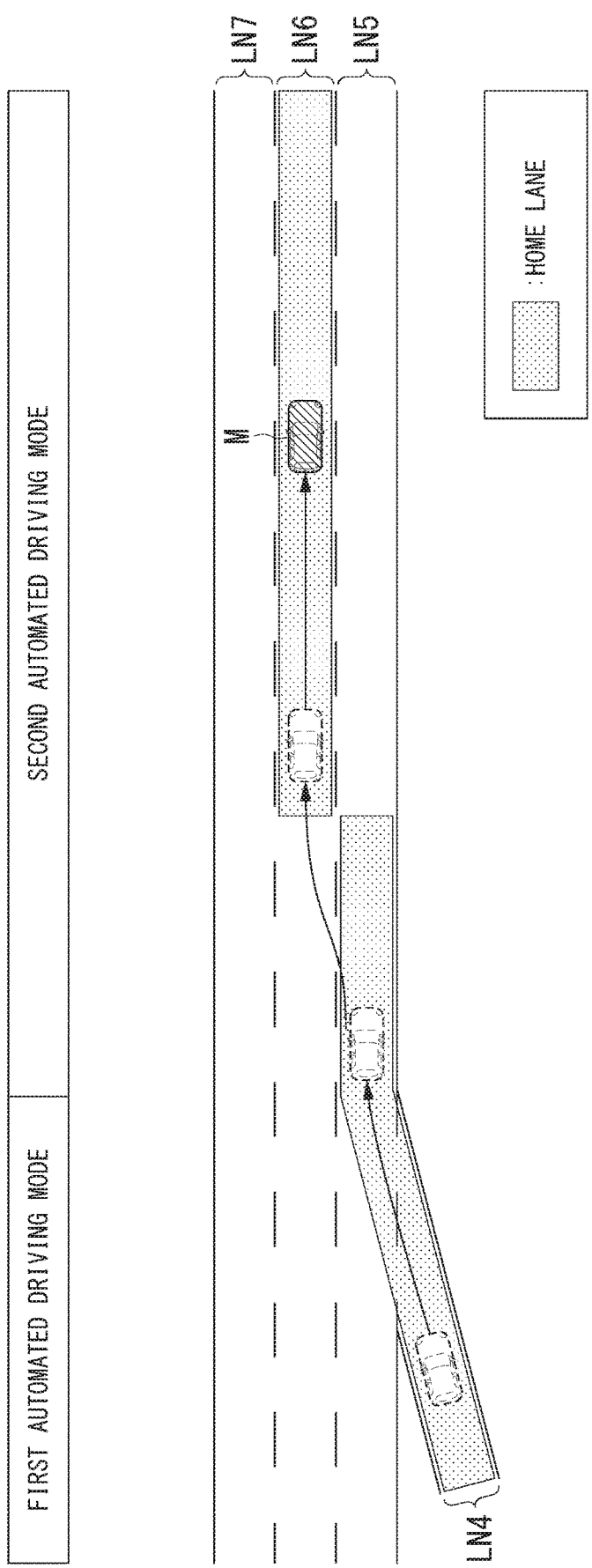
FIG. 19 is a diagram showing another example of the scenario in which the host vehicle travels in a section.

FIG. 19 is a diagram showing another example of the scenario in which the host vehicle M travels in the section S3. As in the scenario of FIG. 18, the illustrated example shows a scenario in which the host vehicle M has entered the section S3 from the section S2 in which the home lane is determined as the second traveling lane LN2 at the time of the determination position P3. In such a scenario, also in the second highway, the home lane determiner 180 determines a certain section of the passing lane LN5 connected to the merging lane LN4 as the home lane and changes the home lane to the second traveling lane LN6 at the termination of the section. As a result, a relative position of the home lane before the host vehicle M merges onto the second highway is restored.

Figure 20:
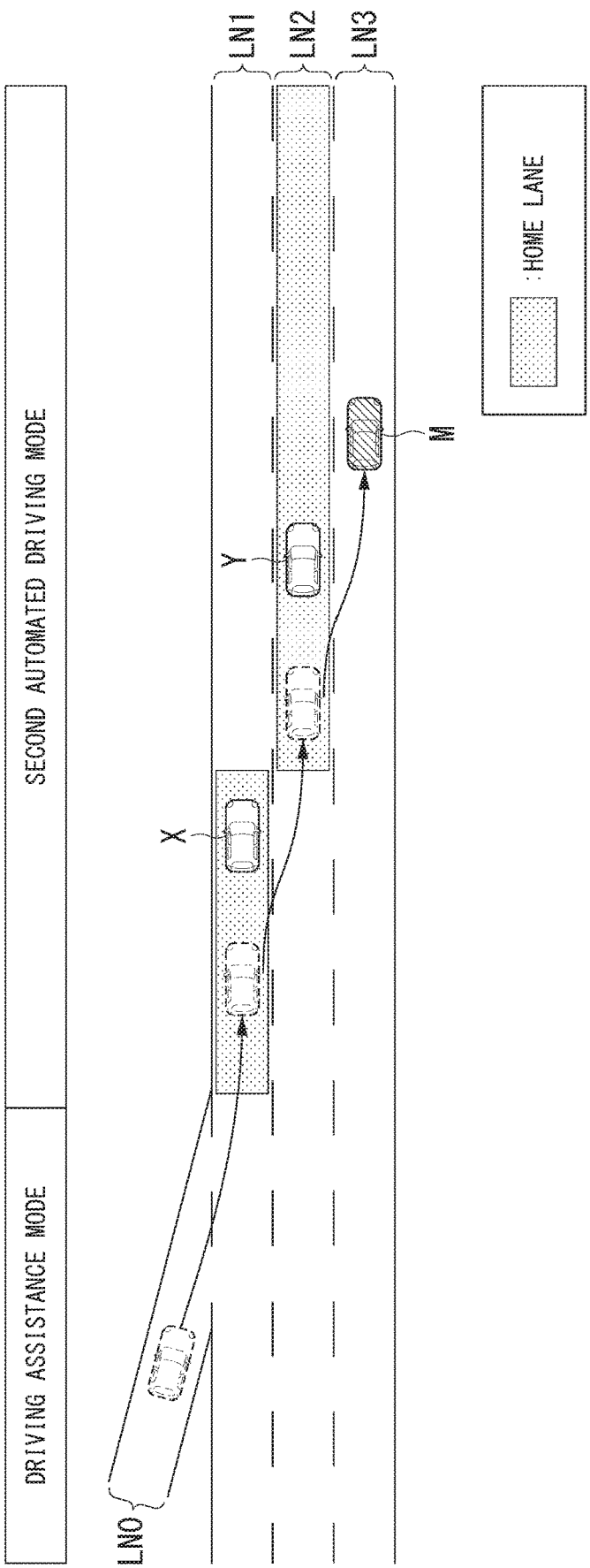
FIG. 20 is a diagram showing another example of the scenario in which the host vehicle travels in a section.

FIG. 20 is a diagram showing another example of the scenario in which the host vehicle M travels in the section S1. In the drawing, as in the preceding vehicle X, Y indicates a preceding vehicle whose speed is lower than the host vehicle M and whose relative speed with respect to the host vehicle M is equal to or larger than a threshold value while the host vehicle M travels on the second traveling lane LN2. The illustrated scenario shows that, in order to pass the preceding vehicle X, the host vehicle M is caused to change lanes from the first traveling lane LN1 to the second traveling lane LN2 temporarily and the low speed preceding vehicle Y is also in the second traveling lane LN2. In such a scenario, the action plan generator 140 plans a passing event and determines that the host vehicle M will be caused to change lanes to an adjacent passing lane LN3. Since the lane of the lane change destination is the passing lane LN3, the home lane determiner 180 continuously determines the second traveling lane LN2 as the home lane according to the determination process of S126 without changing the home lane from the second traveling lane LN2 to the passing lane LN3.

Figure 21:
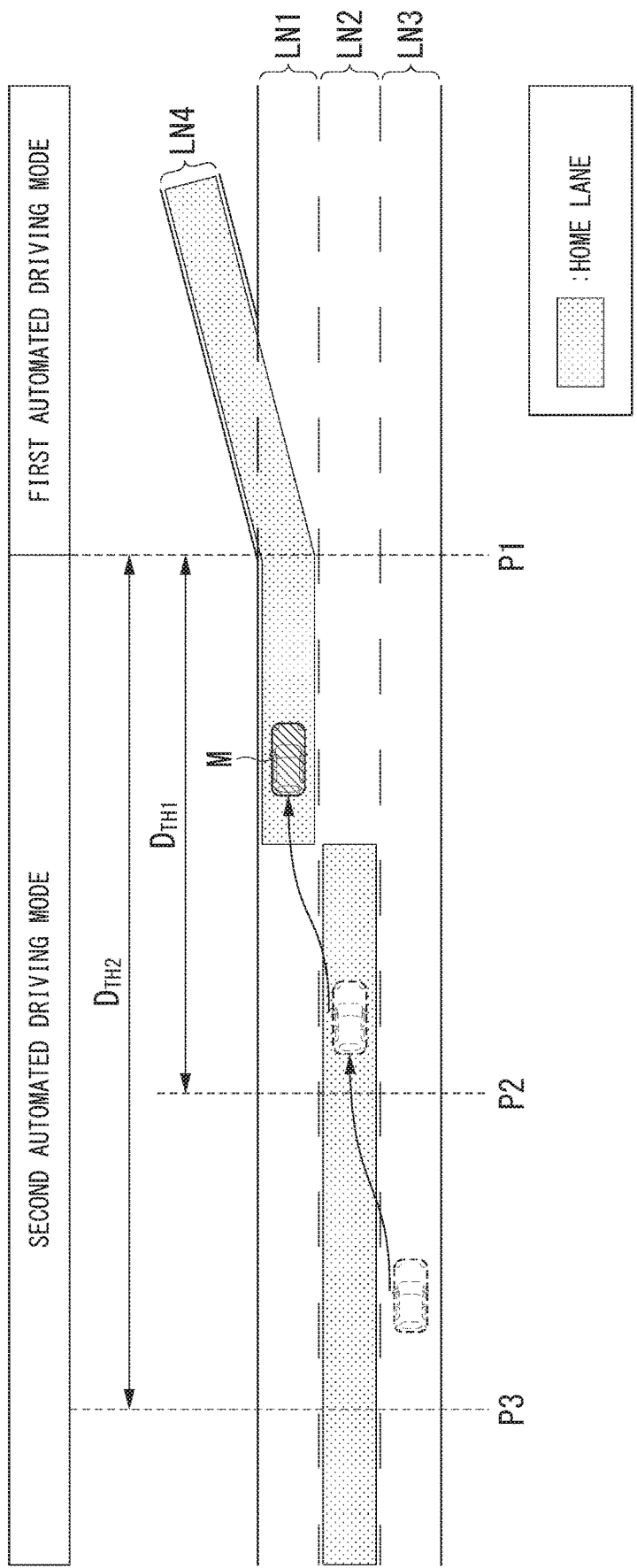
FIG. 21 is a diagram showing another example of the scenario in which the host vehicle travels in a section.

FIG. 21 is a diagram showing another example of the scenario in which the host vehicle M travels in the section S2. As in the scenario of FIG. 20, the illustrated example shows a scenario after the second traveling lane LN2 is determined as the home lane while the host vehicle M is traveling in the passing lane LN3 because the lane change destination is the passing lane LN3 in the section S. In this case, the action plan generator 140 plans a lane change event in which the host vehicle M is caused to change lanes from the passing lane LN3 to the second traveling lane LN2 at the lane change start point P2 and additionally causes the host vehicle M to change from the second traveling lane LN2 to the first traveling lane LN1. Accordingly, the home lane determiner 180 changes the home lane from the second traveling lane LN2 to the first traveling lane LN1 at a time which is after the lane change start point P2 and at which the host vehicle M changes lanes from the passing lane LN3 to the second traveling lane LN2.

Figure 22:
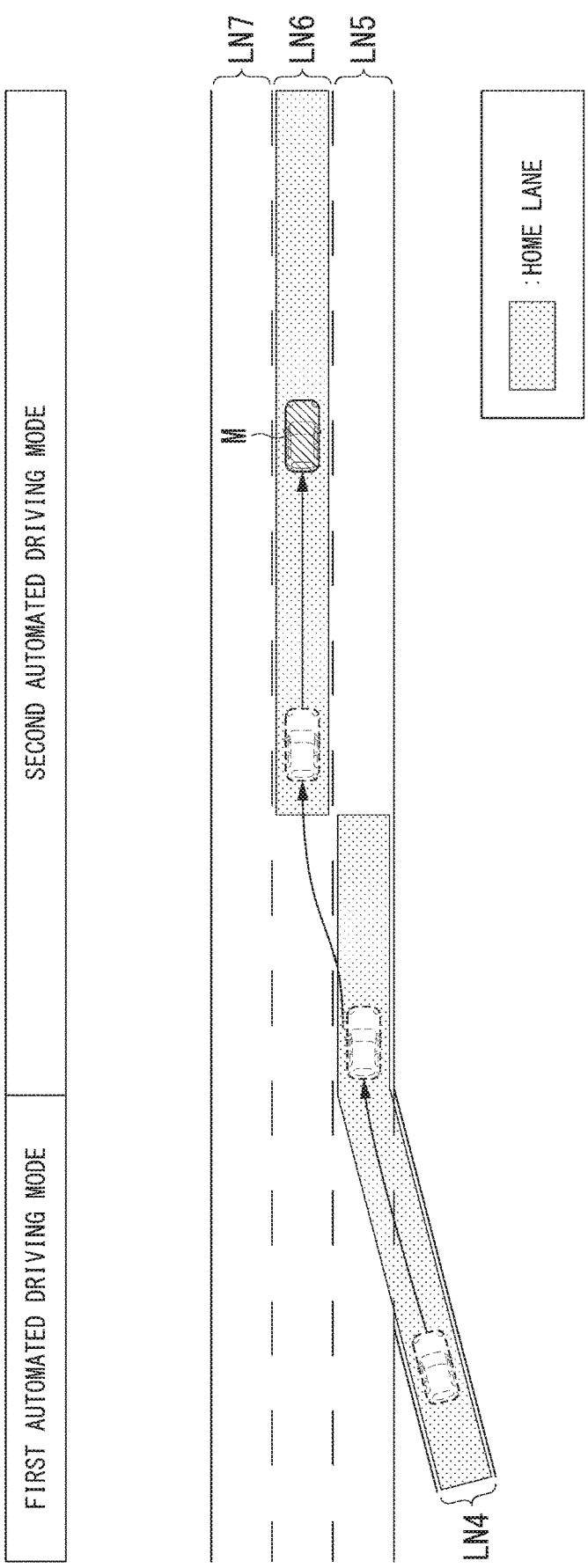
FIG. 22 is a diagram showing another example of the scenario in which the host vehicle travels in a section.

FIG. 22 is a diagram showing another example of the scenario in which the host vehicle M travels in the section S3. As in the scenario of FIG. 21, the illustrated example shows a scenario in which the host vehicle M has entered the section S3 from the section S2 in which the home lane is determined as the second traveling lane LN2 at the time of the determination position P3. In the scenario exemplified in FIG. 21, while the host vehicle M is traveling in the passing lane LN3, the home lane is determined as the second traveling lane LN2. Therefore, also in the second highway, the home lane determiner 180 determines a certain section of the passing lane LN5 connected to the merging lane LN4 as the home lane, and changes the home lane to the second traveling lane LN6 at the termination of the section.

Figure 23:
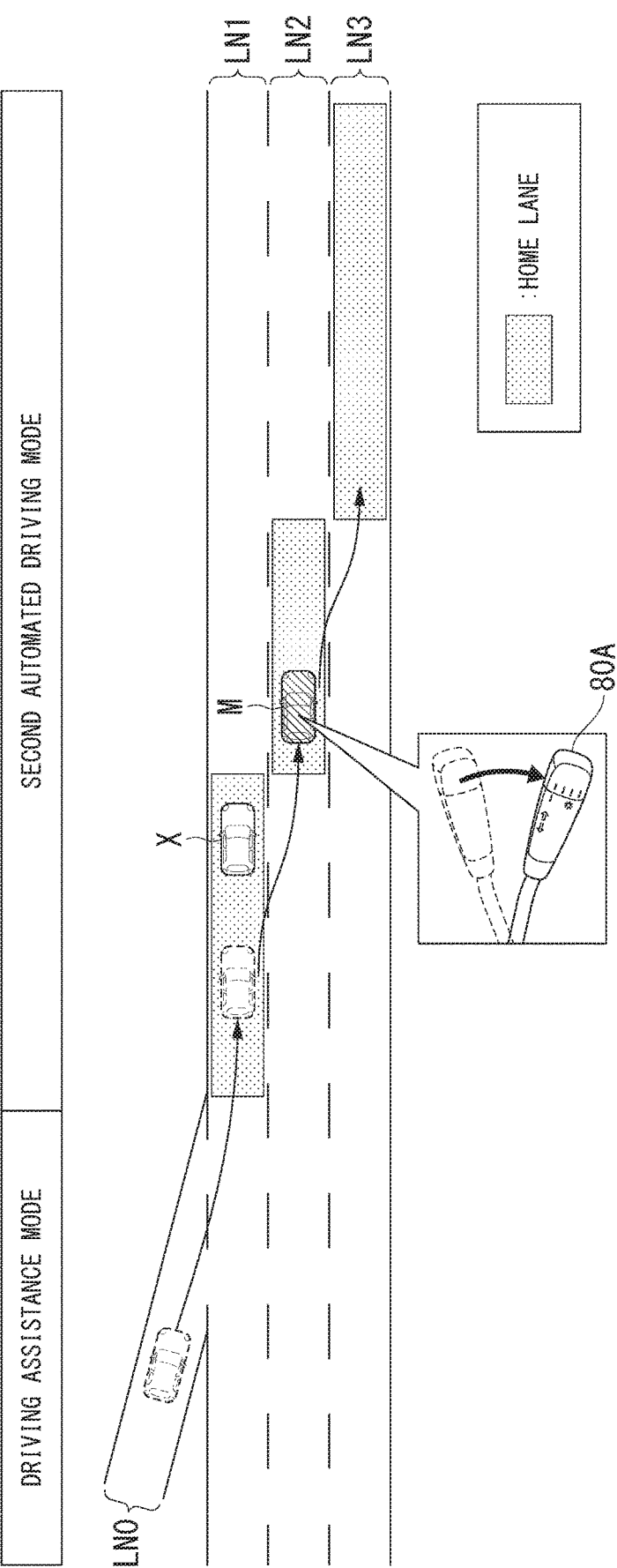
FIG. 23 is a diagram showing another example of the scenario in which the host vehicle travels in a section.

FIG. 23 is a diagram showing another example of the scenario in which the host vehicle M travels in the section S1. In the drawing, 80A indicates the lever of the direction indicator. The illustrated scenario shows that, in order to pass the preceding vehicle X, the host vehicle M changes lanes to the second traveling lane LN2, and additionally, the occupant operates a lever 80A and issues an instruction to turn right. In this case, the action plan generator 140 plans a lane change event in which lanes are caused to be changed to the passing lane LN3 and generates a target trajectory from the second traveling lane LN2 to the passing lane LN3. In this case, the home lane determiner 180 determines that the occupant is operating the lever 80A and issuing an instruction to change lanes to an adjacent lane on the right side when viewed from the host vehicle M. Therefore, even if the lane change destination is the passing lane LN3, the home lane determiner 180 determines the passing lane LN3 as a new home lane according to the determination process of S116. In this manner, even if the lane of the lane change destination is a passing lane, when the lane is changed according to the intention or an instruction of the occupant, the passing lane is exceptionally determined as the home lane.

Figure 24:
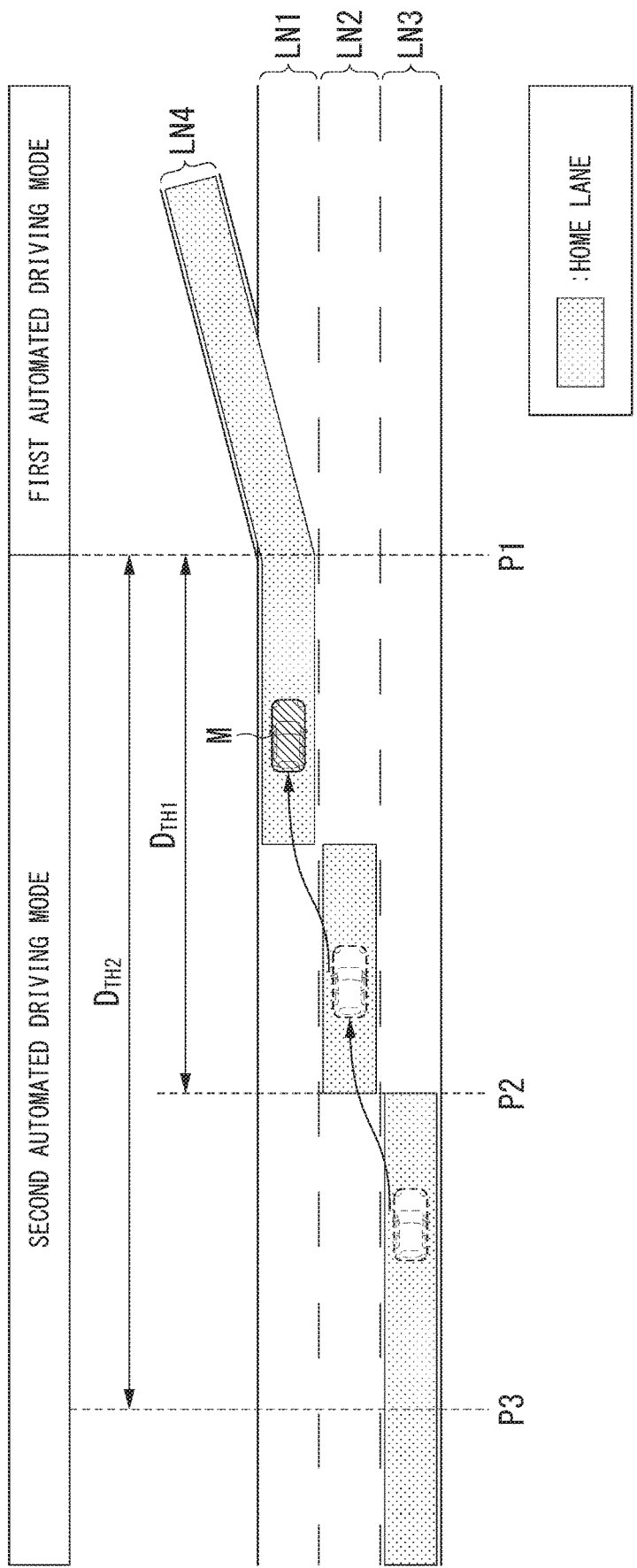
FIG. 24 is a diagram showing another example of the scenario in which the host vehicle travels in a section.

FIG. 24 is a diagram showing another example of the scenario in which the host vehicle M travels in the section S2. As in the scenario of FIG. 23, the illustrated example shows a scenario after the host vehicle M is traveling in the passing lane LN3 in the section S1, and additionally the home lane is determined as the passing lane LN3. In this case, the action plan generator 140 plans a lane change event in which the host vehicle M is caused to change lanes from the passing lane LN3 to the second traveling lane LN2 at the lane change start point P2 and additionally causes the host vehicle M to change from the second traveling lane LN2 to the first traveling lane LN1. Accordingly, the home lane determiner 180 changes the home lane from the passing lane LN3 to the second traveling lane LN2 at the lane change start point P2, and additionally, changes the home lane from the second traveling lane LN2 to the first traveling lane LN1 at a time at which the host vehicle M changes lanes from the passing lane LN3 to the second traveling lane LN2.

Figure 25:
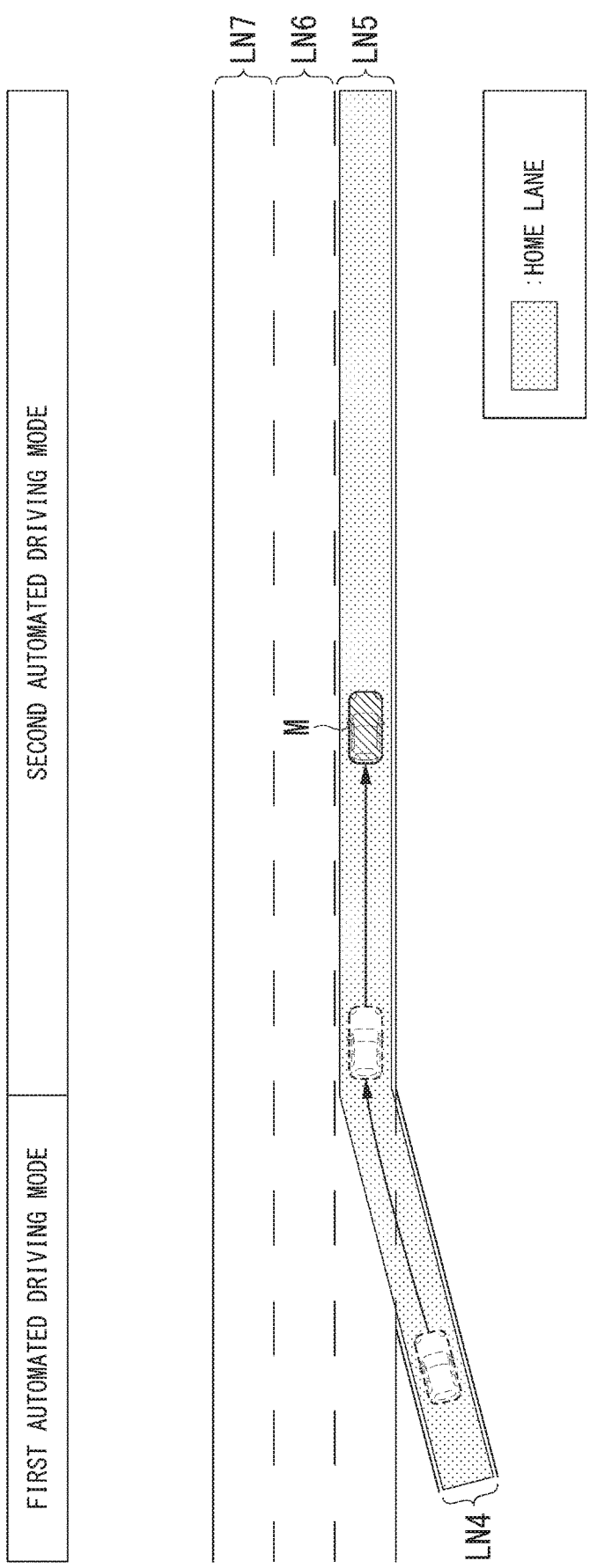
FIG. 25 is a diagram showing another example of the scenario in which the host vehicle travels in a section.

FIG. 25 is a diagram showing another example of the scenario in which the host vehicle M travels in the section S3. As in the scenario of FIG. 24, the illustrated example shows a scenario in which the host vehicle M has entered the section S3 from the section S2 in which the home lane is determined as the passing lane LN3 at the time of the determination position P3. In such a scenario, also in the second highway, the home lane determiner 180 determines the passing lane LN5 connected to the merging lane LN4 as the home lane. Since there is no need to change lanes after the host vehicle merges into the passing lane LN5 from the merging lane LN4, the action plan generator 140 plans a constant-speed traveling event and the like and generates a target trajectory for causing the host vehicle M to travel on the passing lane LN5 at a constant speed. As a result, a relative position of the home lane changed when the occupant operates the lever 80A of the direction indicator before passing through the junction can be restored after passing through the junction.

[Scenario Description-Part 2-]

Figure 26:
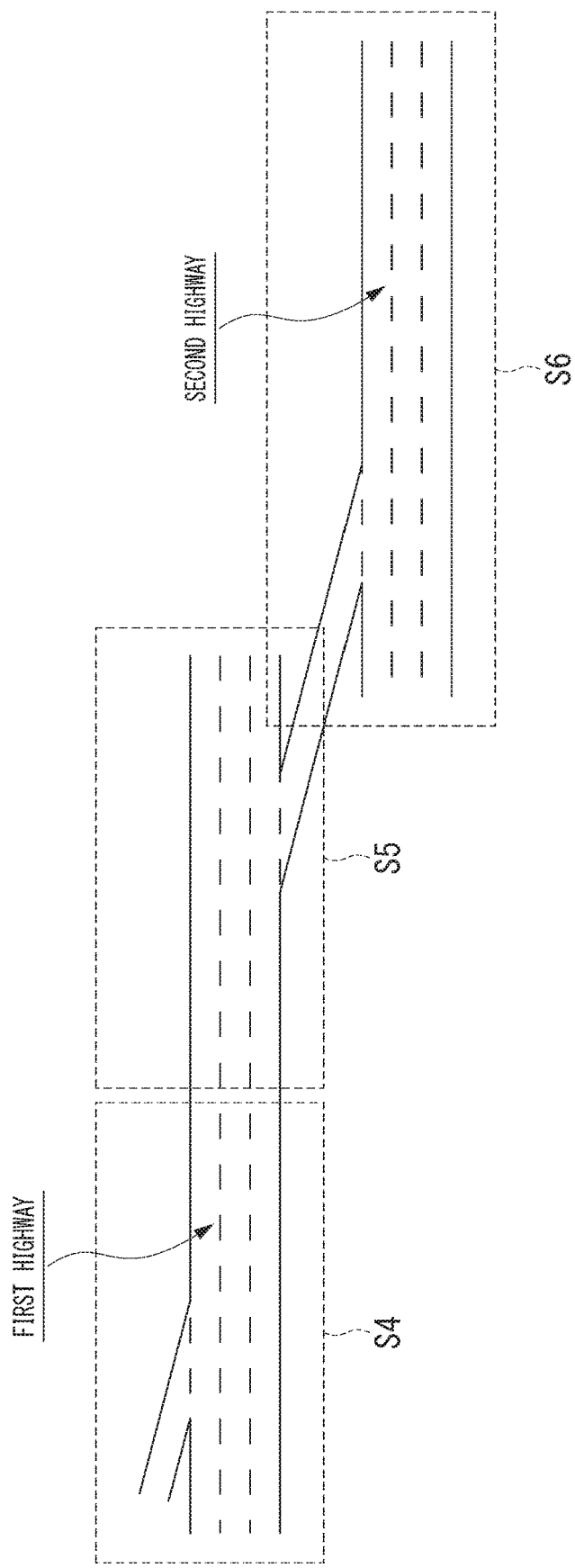
FIG. 26 is a diagram showing another example of the first highway and the second highway which are connected to each other via a junction.

Hereinafter, scenarios having different road configurations from the above various scenarios will be described. FIG. 26 is a diagram showing another example of the first highway and the second highway which are connected to each other via a junction. In the shown example, the second highway is present on the right side of the first highway.

Hereinafter, the first highway and the second highway will be described by dividing them into sections S4, S5, and S6. In order to simplify description, the numbers of lanes of the first highway and the second highway are the same, and the legal speeds and average speeds of vehicles that pass are the same.

Figure 27:
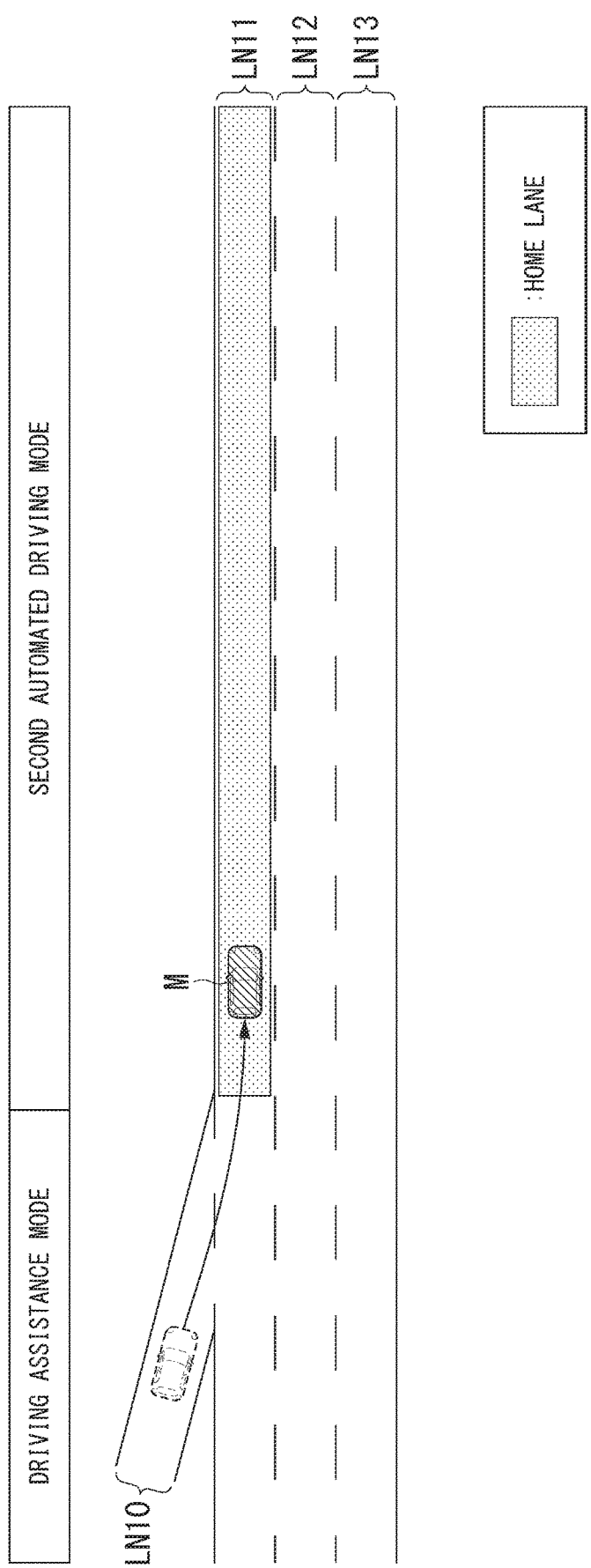
FIG. 27 is a diagram showing an example of a scenario in which the host vehicle travels in a section.

FIG. 27 is a diagram showing an example of a scenario in which the host vehicle M travels in the section S4. In the drawing, LN10 indicates a merging lane that merges onto the first highway, and LN11 to LN13 indicate lanes included in the first highway as the main line. Among the lanes LN11 to LN13, the lane LN13 indicates a passing lane, and the lane LN11 farthest from the passing lane LN13 indicates a first traveling lane, and the lane between the passing lane LN13 and the first traveling lane LN11 indicates a second traveling lane.

For example, while the host vehicle M travels on the merging lane LN0, the mode controller 178 determines the driving mode as the driving assistance mode. When the host vehicle M changes lanes from the merging lane LN10 to the first traveling lane LN11, the mode controller 178 switches the driving mode from the driving assistance mode to the second automated driving mode. In response to this, the HMI controller 182 causes the display device 32 to display prompting information for encouraging the occupant to operate (turn on) the second switch 34B. In response to this, the home lane determiner 180 determines the first traveling lane LN11 as the home lane.

Figure 28:
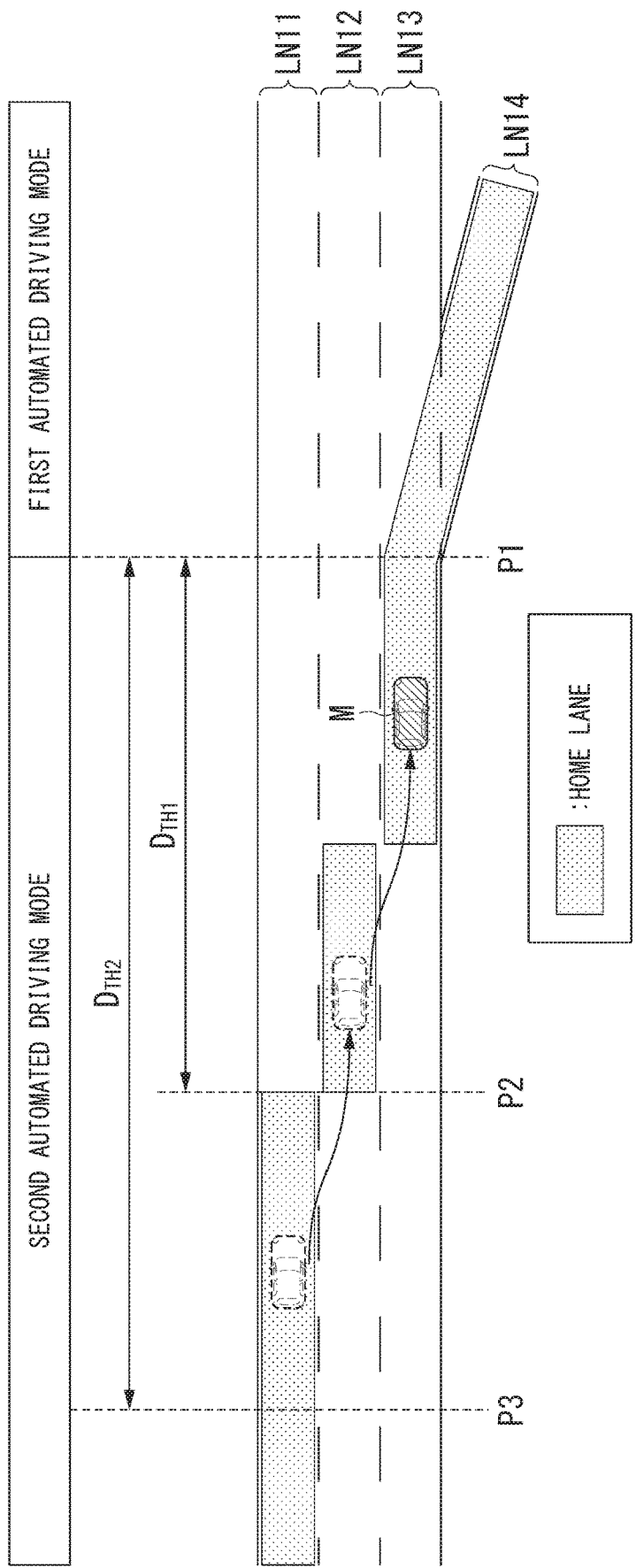
FIG. 28 is a diagram showing an example of a scenario in which the host vehicle travels in a section.

FIG. 28 is a diagram showing an example of a scenario in which the host vehicle M travels in the section S5. In the drawing, LN14 indicates a branch lane branched from the first highway. In the shown example, the branch lane LN14 is connected to the passing lane LN13 among the lanes LN11 to LN13 as the main lines, and additionally, the second highway is connected to the branch lane LN14. That is, the branch lane LN14 is a junction rampway that connects the first highway to the second highway.

In the scenario shown in the drawing, if the host vehicle M is not traveling the passing lane LN13, the action plan generator 140 plans a lane change event in which the host vehicle M is caused to change lanes to the passing lane LN13 at the lane change start point P2. Accordingly, the home lane determiner 180 determines the passing lane LN13 as the home lane up to the branching point P1. Specifically, the home lane determiner 180 determines a section from the branching point P1 to the lane change start point P2 as the home lane. In the shown example, since the host vehicle M is traveling in the first traveling lane LN11, the action plan generator 140 plans a lane change event in which the host vehicle M is caused to change lanes from the first traveling lane LN11 to the second traveling lane LN12 at the lane change start point P2 and additionally causes the host vehicle M to change lanes from the second traveling lane LN12 to the passing lane LN13. Accordingly, the home lane determiner 180 changes the home lane from the first traveling lane LN11 to the second traveling lane LN12 at the lane change start point P2, and additionally, changes the home lane from the second traveling lane LN12 to the passing lane LN13 at a time at which the host vehicle M changes lanes from the first traveling lane LN11 to the second traveling lane LN12. At the time of the determination position P3, the home lane is the rightmost passing lane LN13 among three lanes. In another point of view, when the lane determined as the home lane is a numbered lane from the first traveling lane LN1, the home lane indicates the passing lane LN13 which is the second lane from the first traveling lane LN1 at the time of the determination position P3.

When the passing lane LN13 is determined as the home lane up to the branching point P1, the home lane determiner 180 determines the branch lane LN14 as the home lane at the branching point P1 or thereafter. When the host vehicle M enters the branch lane LN14, the mode controller 178 switches the driving mode from the second automated driving mode to the first automated driving mode.

As in FIG. 28, in a scenario in which the second highway is present on the right side of the first highway, as exemplified in FIG. 24 and the like, the home lane determiner 180 may move the determination position P3 further away from the branching point P1 compared to a scenario in which the second highway is present on the left side of the first highway. Specifically, when a lane connected to the branch lane toward the second highway among a plurality of lanes included in the first highway is closer to the first traveling lane than the lane determined as the home lane, the home lane determiner 180 may set a second predetermined distance $D_{TH2}$ to be longer compared to when the lane connected to the branch lane toward the second highway is farther from the first traveling lane than the lane determined as the home lane. In the scenario exemplified in FIG. 28, the lane that is connected to the branch lane LN14 and determined as the home lane is the passing lane LN13, whereas, in the scenario exemplified in FIG. 24 and the like, the lane that is connected to the branch lane LN4 and is determined as the home lane is the first traveling lane LN1. Therefore, compared to the scenario exemplified in FIG. 24 and the like, in the scenario exemplified in FIG. 28, the lane determined as the home lane is farther from the first traveling lane. That is, there is a high probability that more lane changes are necessary. In this case, by increasing the second predetermined distance $D_{TH2}$, without consideration of a lane change necessary to enter the junction, based on a relative position of the home lane changed according to the lane change performed earlier, the home lane in the second highway can be determined.

Figure 29:
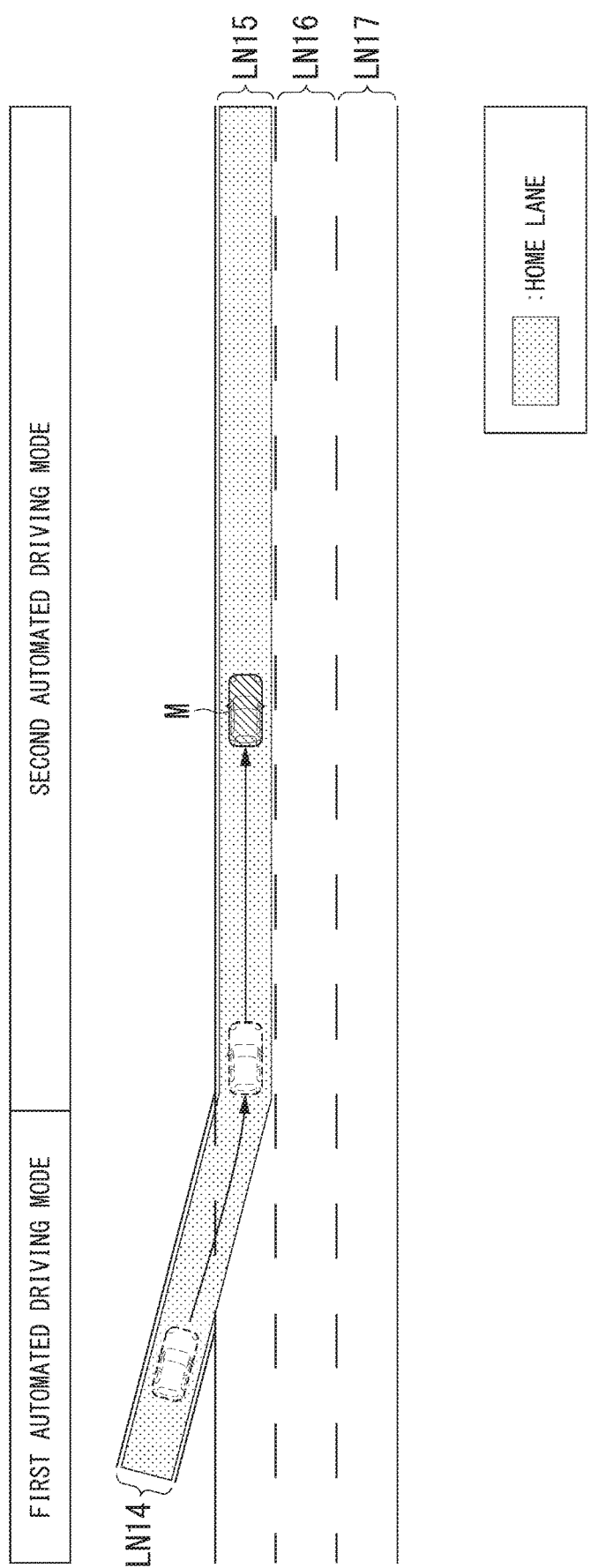
FIG. 29 is a diagram showing an example of a scenario in which the host vehicle travels in a section.

FIG. 29 is a diagram showing an example of a scenario in which the host vehicle M travels in the section S6. In the drawing, LN15 to LN17 indicate lanes included in the second highway. That is, the second highway has the same number of lanes as the first highway. Among the lanes LN15 to LN17, the lane LN15 indicates a passing lane, the lane LN17 farthest from the passing lane LN13 indicates a first traveling lane, and the lane between the passing lane LN15 and the first traveling lane LN17 indicates a second traveling lane. The branch line LN14 which is a branch lane of the first highway is a merging lane of the second highway in this scenario.

In the shown example, the merging lane LN14 is connected to the first traveling lane LN15. In this case, the home lane determiner 180 determines a lane at the same position as a relative position of the lane determined as the home lane at the determination position P3 of the section S4 among three lanes LN15 to LN17 as the home lane in the second highway. In the scenario exemplified in FIG. 28, the home lane at the time of the determination position P3 is the leftmost first traveling lane LN1 among three lanes. Therefore, also in the second highway, the home lane determiner 180 determines the leftmost first traveling lane LN15 among three lanes as the home lane.

Figure 30:
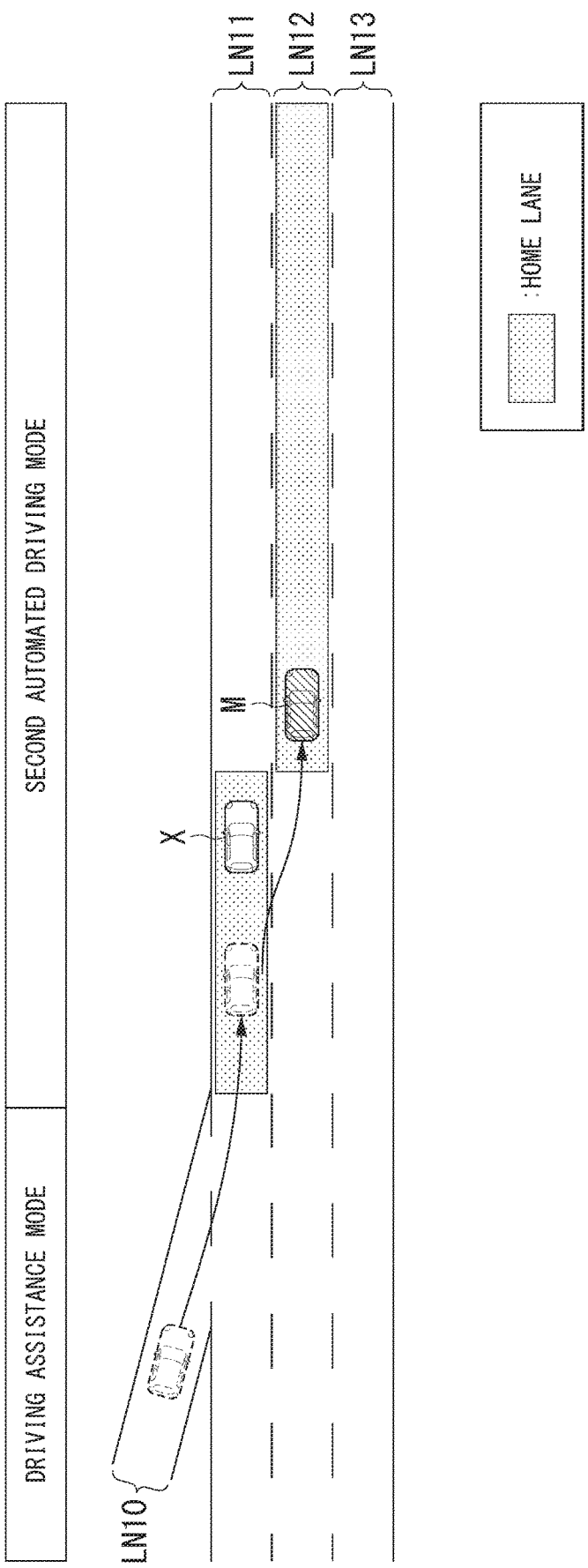
FIG. 30 is a diagram showing another example of the scenario in which the host vehicle travels in a section.

FIG. 30 is a diagram showing another example of the scenario in which the host vehicle M travels in the section S4. In the case of scenarios illustrated, the action plan generator 140 determines that it is necessary to change lanes to an adjacent lane in order to cause the host vehicle M to pass the preceding vehicle X. Then, the action plan generator 140 plans a passing event which is a type of lane change event, and determines that the host vehicle M will be caused to change lanes to an adjacent second traveling lane LN12. In response to this, the home lane determiner 180 changes the home lane from the first traveling lane LN11 to the second traveling lane LN12. The action plan generator 140 generates a target trajectory for causing the host vehicle M to change lanes to the second traveling lane LN12 based on the passing event, and outputs information on the target trajectory to the second controller 160. The second controller 160 controls the speed and steering based on the target trajectory and causes the host vehicle M to change lanes to the second traveling lane LN12 according to automated driving.

Figure 31:
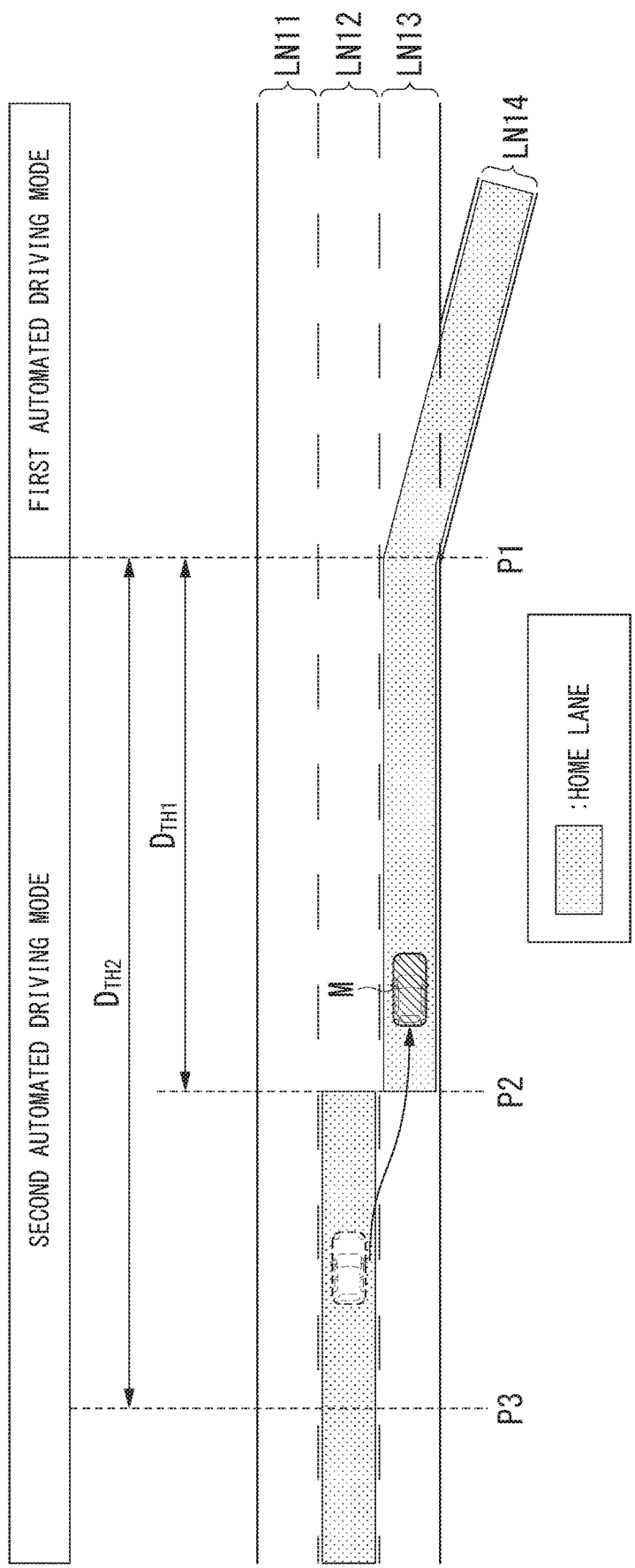
FIG. 31 is a diagram showing another example of the scenario in which the host vehicle travels in a section.

FIG. 31 is a diagram showing another example of the scenario in which the host vehicle M travels in the section S5. As in the scenario of FIG. 30, the illustrated example shows a scenario in which the host vehicle M has entered the section S5 after the home lane is determined as the second traveling lane LN12 in the section S4. Since the host vehicle M needs to change lanes from the main line to the branch lane LN14, the action plan generator 140 plans a lane change event in which the host vehicle M is caused to change lanes from the second traveling lane LN12 to the passing lane LN13 at the lane change start point P2. Accordingly, the home lane determiner 180 changes the home lane from the second traveling lane LN12 to the passing lane LN13 at the lane change start point P2.

Figure 32:
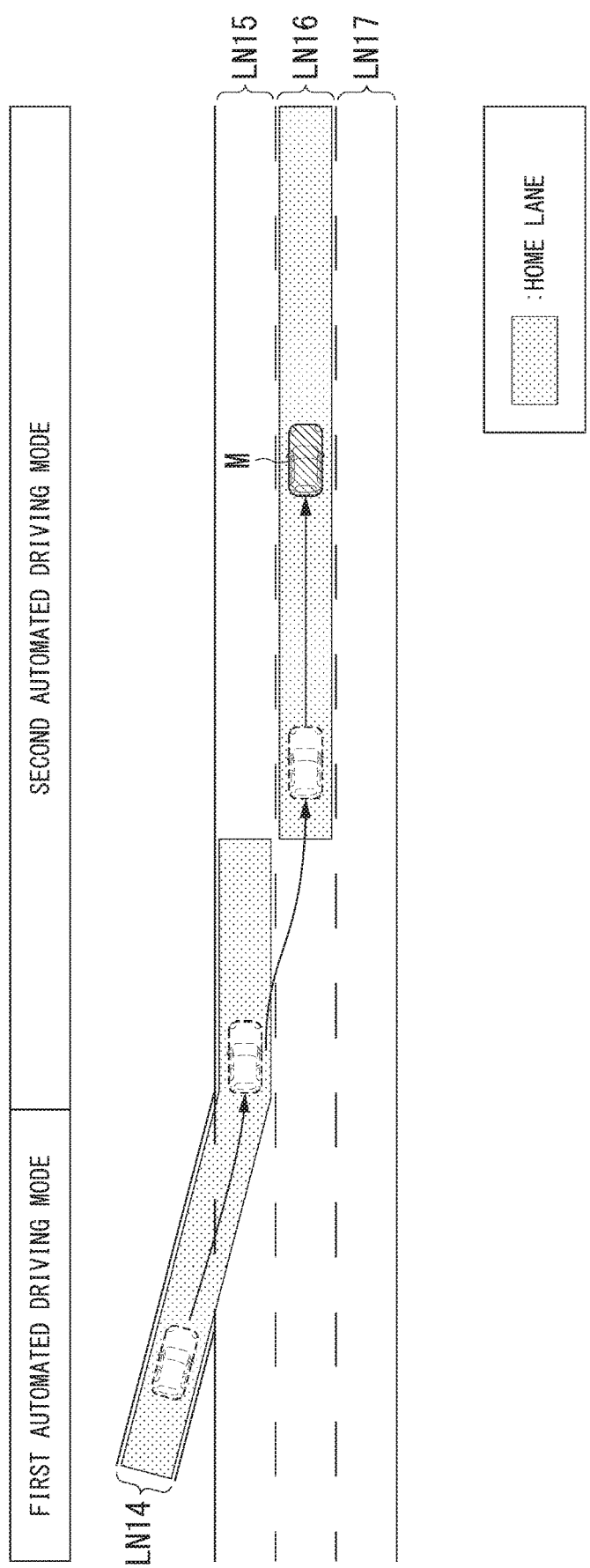
FIG. 32 is a diagram showing another example of the scenario in which the host vehicle travels in a section.

FIG. 32 is a diagram showing another example of the scenario in which the host vehicle M travels in the section S6. As in the scenario of FIG. 31, the illustrated example shows a scenario in which the host vehicle M has entered the section S6 from the section S5 in which the home lane is determined as the second traveling lane LN2 at the time of the determination position P3. In such a scenario, also in the second highway, the home lane determiner 180 determines a certain section of the first traveling lane LN15 connected to the merging lane LN4 as the home lane and changes the home lane to the second traveling lane LN16 at the termination of the section. As a result, a relative position of the home lane before the host vehicle M merges onto the second highway is restored.

In the shown example, since the home lane determined based on a relative position of the home lane of the first highway is the second traveling lane LN16 and the lane into which the host vehicle M merges from the junction is the first traveling lane LN15, compared to when the home lane determined based on a relative position of the home lane of the first highway is a lane on the left side of the lane into which the host vehicle M merges from the junction (for example, the scenario exemplified in FIG. 16 and the like), the action plan generator 140 increases a target speed or a traveling distance when the lane is changed from the first traveling lane LN15 to the second traveling lane LN16.

Figure 33:
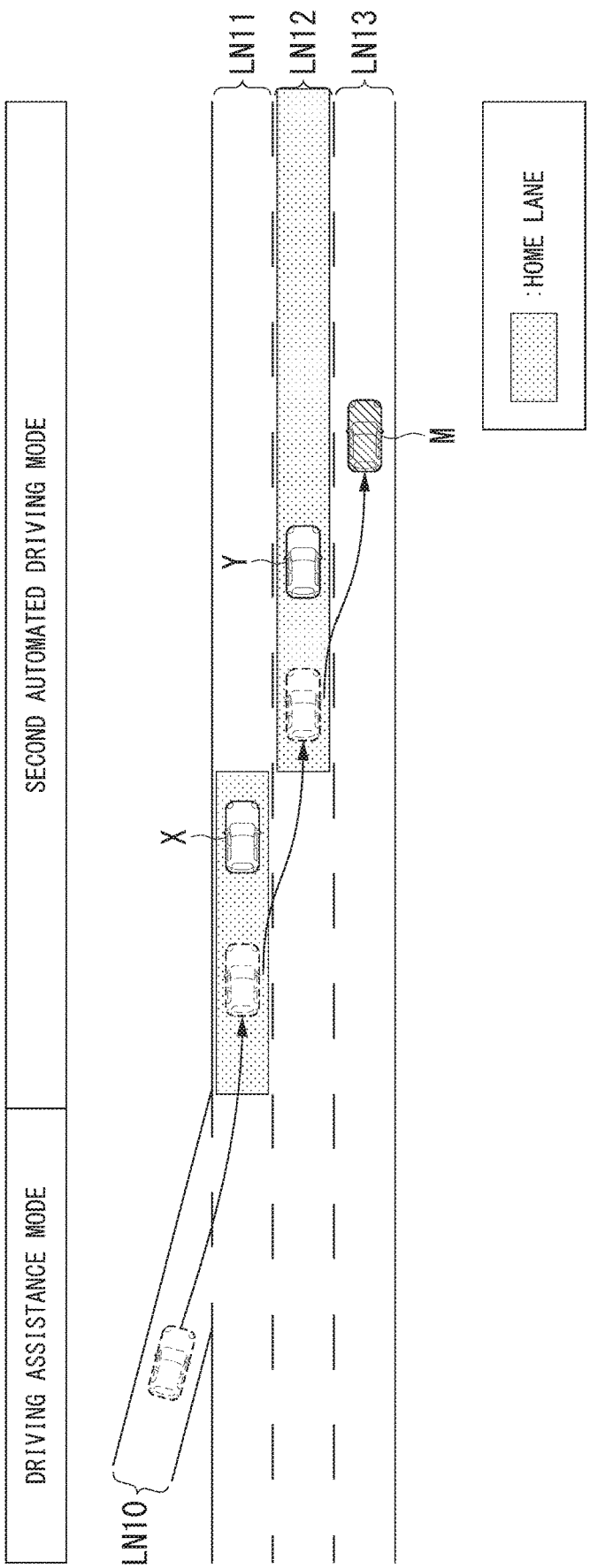
FIG. 33 is a diagram showing another example of the scenario in which the host vehicle travels in a section.

FIG. 33 is a diagram showing another example of the scenario in which the host vehicle M travels in the section S4. The illustrated scenario shows that, in order to pass the preceding vehicle X, the host vehicle M is caused to change lanes from the first traveling lane LN11 to the second traveling lane LN12 temporarily and the low speed preceding vehicle Y is also in the second traveling lane LN2. In such a scenario, the action plan generator 140 plans a passing event and determines that the host vehicle M will be caused to change lanes to an adjacent passing lane LN13.

Since the lane of the lane change destination is the passing lane LN13, the home lane determiner 180 continuously determines the second traveling lane LN12 as the home lane according to the determination process of S126 without changing the home lane from the second traveling lane LN12 to the passing lane LN13.

Figure 34:
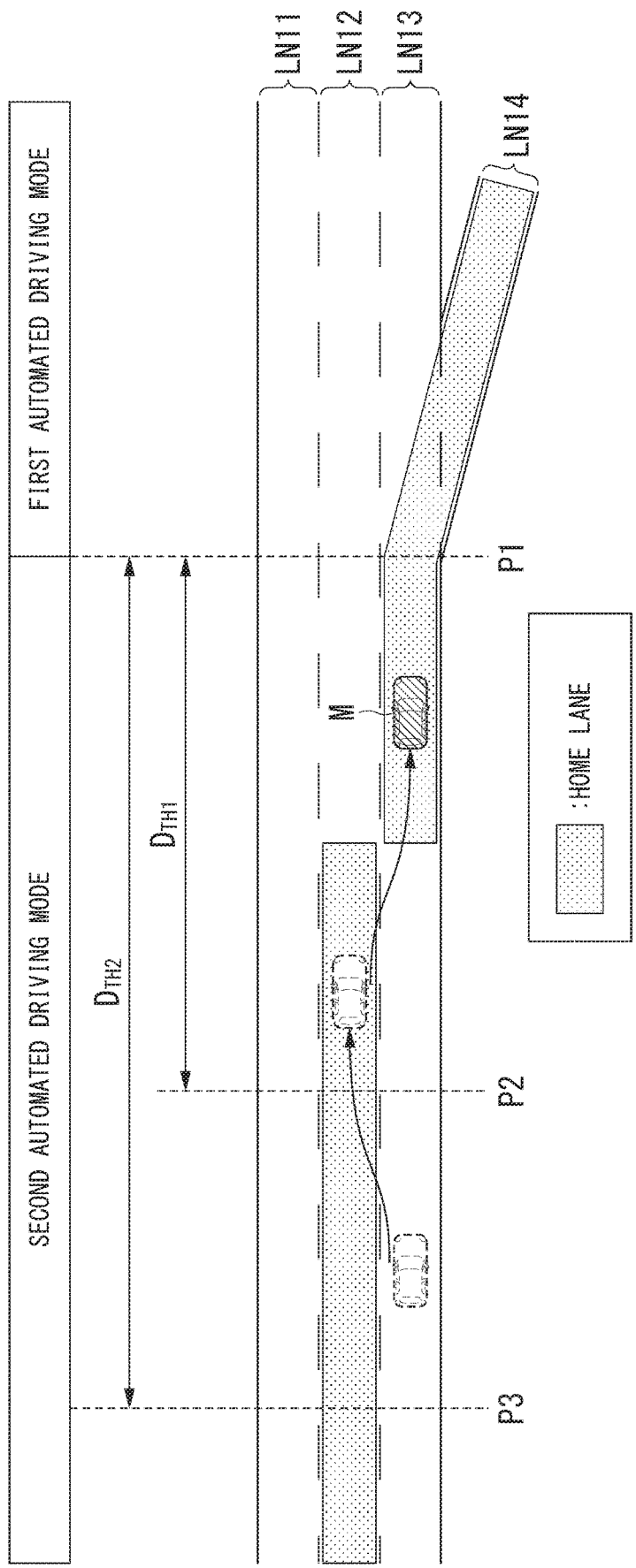
FIG. 34 is a diagram showing another example of the scenario in which the host vehicle travels in a section.

FIG. 34 is a diagram showing another example of the scenario in which the host vehicle M travels in the section S5. As in the scenario of FIG. 33, the illustrated example shows a scenario after the home lane is determined as the second traveling lane LN12 while the host vehicle M is traveling in the passing lane LN13 because the lane change destination is the passing lane LN13 in the section S4. In this case, the action plan generator 140 generates a target trajectory for causing the host vehicle M to change lanes to the second traveling lane LN12 at a time at which the host vehicle M passes the preceding vehicle Y on the passing lane LN13. In the shown example, at a position before the lane change start point P2, the lane is changed from the passing lane LN13 to the second traveling lane LN12. Therefore, the action plan generator 140 generates again a target trajectory for causing the host vehicle M to change lanes to the passing lane LN13 at the lane change start point P2. Accordingly, the home lane determiner 180 changes the home lane from the second traveling lane LN2 to the passing lane LN13 at a time which is after the lane change start point P2 and at which the host vehicle M changes lanes from the passing lane LN13 to the second traveling lane LN12.

Figure 35:
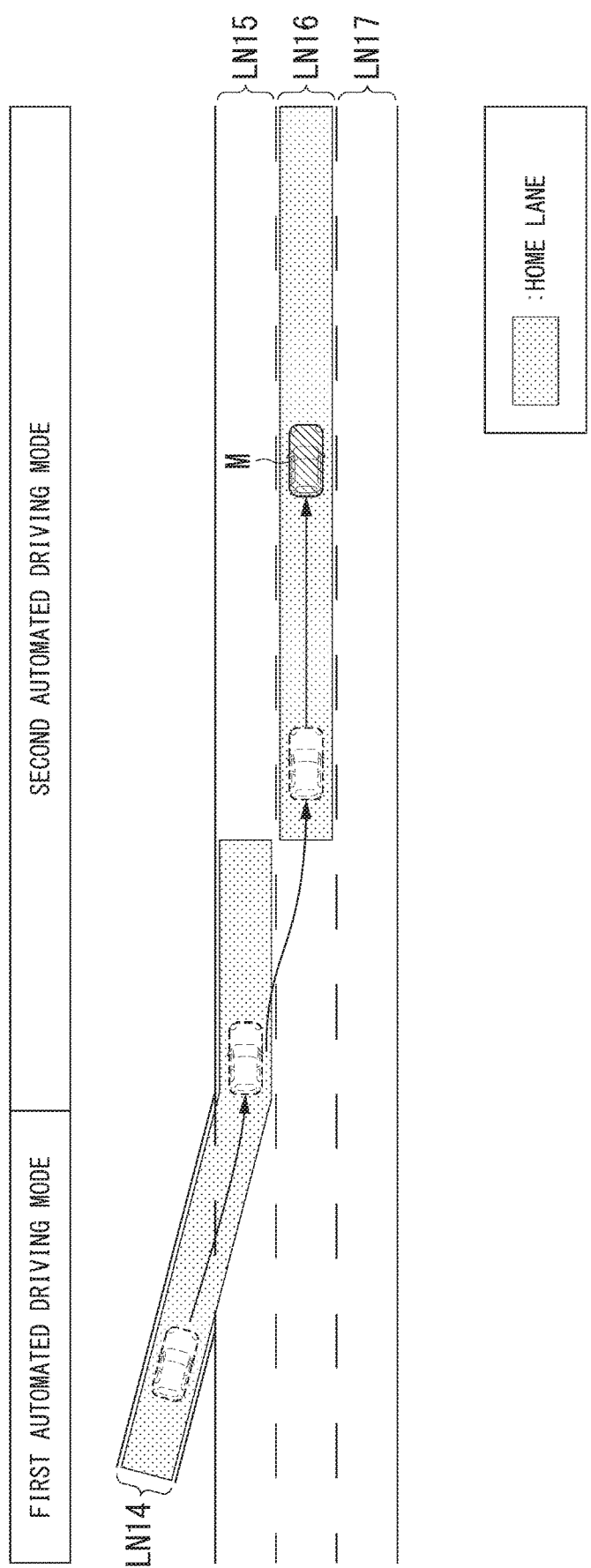
FIG. 35 is a diagram showing another example of the scenario in which the host vehicle travels in a section.

FIG. 35 is a diagram showing another example of the scenario in which the host vehicle M travels in the section S6. As in the scenario of FIG. 34, the illustrated example shows a scenario in which the host vehicle M has entered the section S6 from the section S5 in which the home lane is determined as the second traveling lane LN2 at the time of the determination position P3. Therefore, also in the second highway, the home lane determiner 180 determines a certain section of the first traveling lane LN15 connected to the merging lane LN14 as the home lane, and changes the home lane to the second traveling lane LN16 at the termination of the section.

Figure 36:
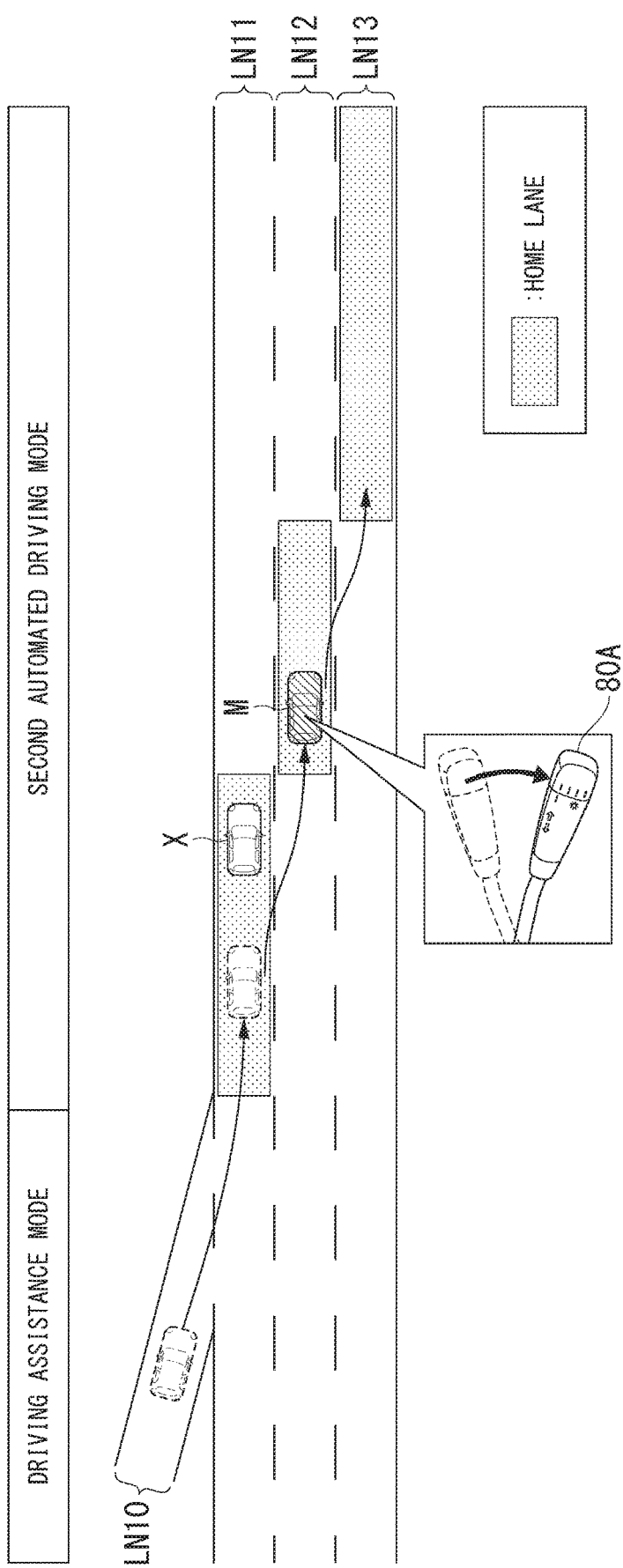
FIG. 36 is a diagram showing another example of the scenario in which the host vehicle travels in a section.

FIG. 36 is a diagram showing another example of the scenario in which the host vehicle M travels in the section S4. The illustrated scenario shows that, in order to pass the preceding vehicle X, the host vehicle M changes lanes to the second traveling lane LN12, and additionally, the occupant operates the lever 80A and issues an instruction to turn right. In this case, the action plan generator 140 plans a lane change event in which lanes are caused to be changed to the passing lane LN13 and generates a target trajectory from the second traveling lane LN12 to the passing lane LN13. In this case, the home lane determiner 180 determines that the occupant is operating the lever 80A and issuing an instruction to change lanes to an adjacent lane on the right side when viewed from the host vehicle M. Therefore, even if the lane change destination is the passing lane LN13, the home lane determiner 180 determines the passing lane LN13 as a new home lane according to the determination process of S116.

Figure 37:
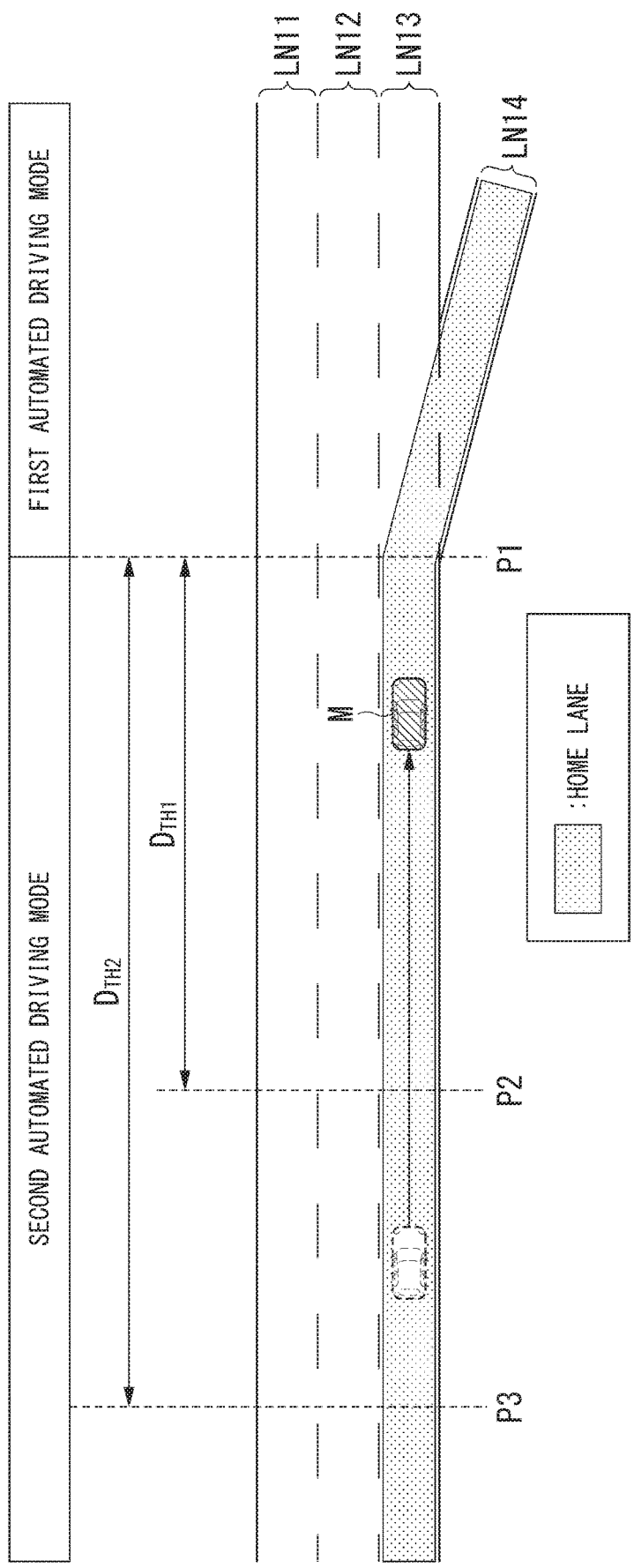
FIG. 37 is a diagram showing another example of the scenario in which the host vehicle travels in a section.

FIG. 37 is a diagram showing another example of the scenario in which the host vehicle M travels in the section S5. As in the scenario of FIG. 36, the illustrated example shows a scenario after the host vehicle M is traveling in the passing lane LN13 in the section S4, and additionally, the home lane is determined as the passing lane LN13. In this case, the action plan generator 140 plans a constant-speed traveling event and the like, and generates a target trajectory for causing the host vehicle M to travel on the passing lane LN13 at a constant speed. As a result, the host vehicle M moves straight and branches to the branch lane LN14 without changing lanes.

Figure 38:
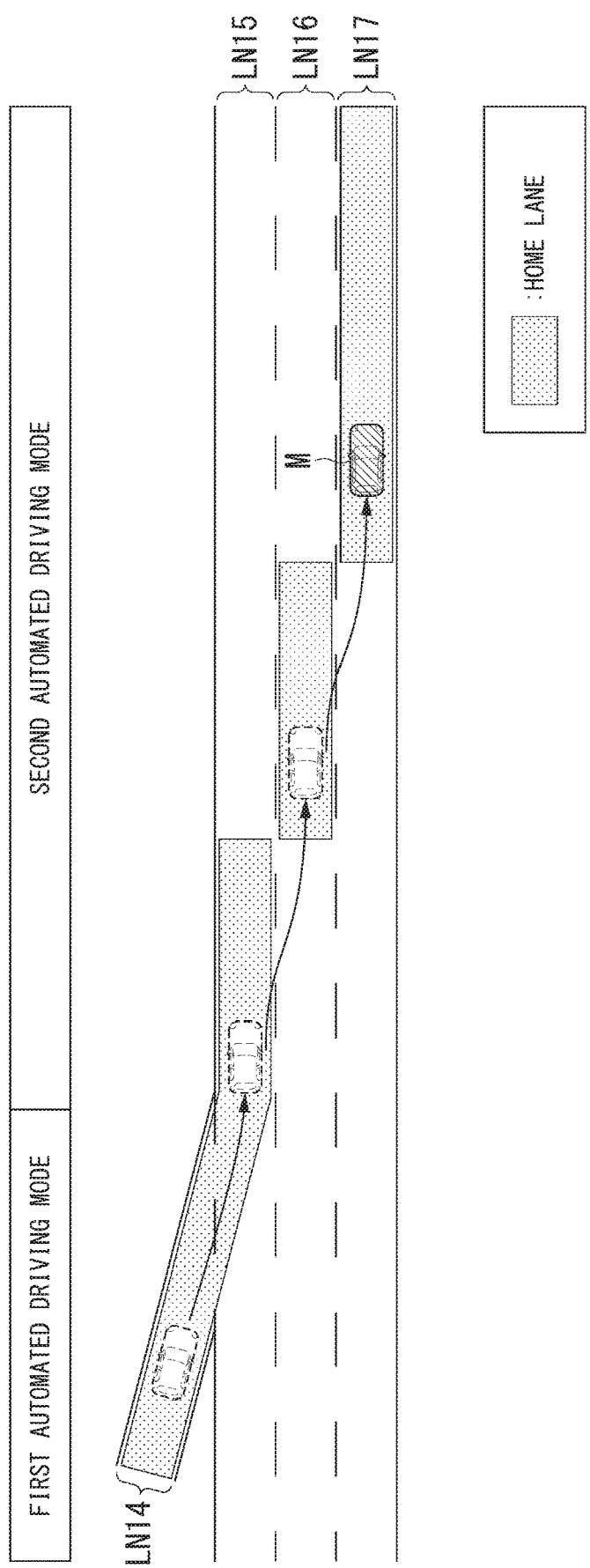
FIG. 38 is a diagram showing another example of the scenario in which the host vehicle travels in a section.

FIG. 38 is a diagram showing another example of the scenario in which the host vehicle M travels in the section S6. As in the scenario of FIG. 37, the illustrated example shows a scenario in which the host vehicle M has entered the section S6 from the section S5 in which the home lane is determined as the passing lane LN13 at the time of the determination position P3. In such a scenario, the home lane determiner 180 determines the passing lane LN17 as the home lane in the second highway. In this case, the home lane determiner 180 determines the second traveling lane LN16 as the temporary home lane.

When the host vehicle M merges into the first traveling lane LN15 from the merging lane LN14, the mode controller 178 returns the driving mode to the original automated lane change mode. When the driving mode returns to the automated lane change mode, the action plan generator 140 plans a lane change event in which lanes are caused to be gradually changed from the first traveling lane LN15 into which the host vehicle M merges to the passing lane LN17 as the home lane. As a result, the host vehicle M moves from the first traveling lane LN15 to the passing lane LN17.

According to the embodiment described above, when the host vehicle M moves from the first highway to the second highway, based on a relative position of the home lane of the first highway determined at a time before passing through the junction that connects these highways, since the home lane on the second highway is determined, it is possible to prevent the relative position of the home lane from changing before and after passing through the junction. As a result, when the first layer image and the second layer image that are superimposed are displayed on the display device 32, it is possible to allow the occupant to understand the lane in which the host vehicle M travels in the automated driving mode without causing the occupant who watches the screen of the display device 32 to feel uncomfortable. That is, it is possible to perform automated driving in which the occupant is unlikely to feel uncomfortable.

According to the above embodiment, when the numbers of lanes of the first highway and the second highway are significantly different or the speed at which the vehicle passes through the first highway and the speed at which the vehicle passes through the second highway are different from each other, since the home lane is not determined in the second highway based on the relative position of the home lane of the first highway, it is possible to make the occupant less likely to feel uncomfortable.

According to the above embodiment, if the occupant operates the lever 80A of the directional device and issues an instruction to change lanes according to one-touch function, when the host vehicle M is caused to change lanes to the instructed lane and the home lane determined at the time of the determination position P3 is a lane instructed by the occupant, the home lane is determined on the second highway based on a relative position of the home lane. Thereby, the home lane can be determined in consideration of the intention of the occupant regarding a lane change.

[Modified Examples of Embodiment]

Hereinafter, modified examples of the above embodiment will be described. In the above embodiment, a method of determining a home lane when the numbers of lanes of the first highway and the second highway match has been mainly described. On the other hand, in the modified examples, a method of determining a home lane when the numbers of lanes of the first highway and the second highway do not match will be described.

Figure 39:
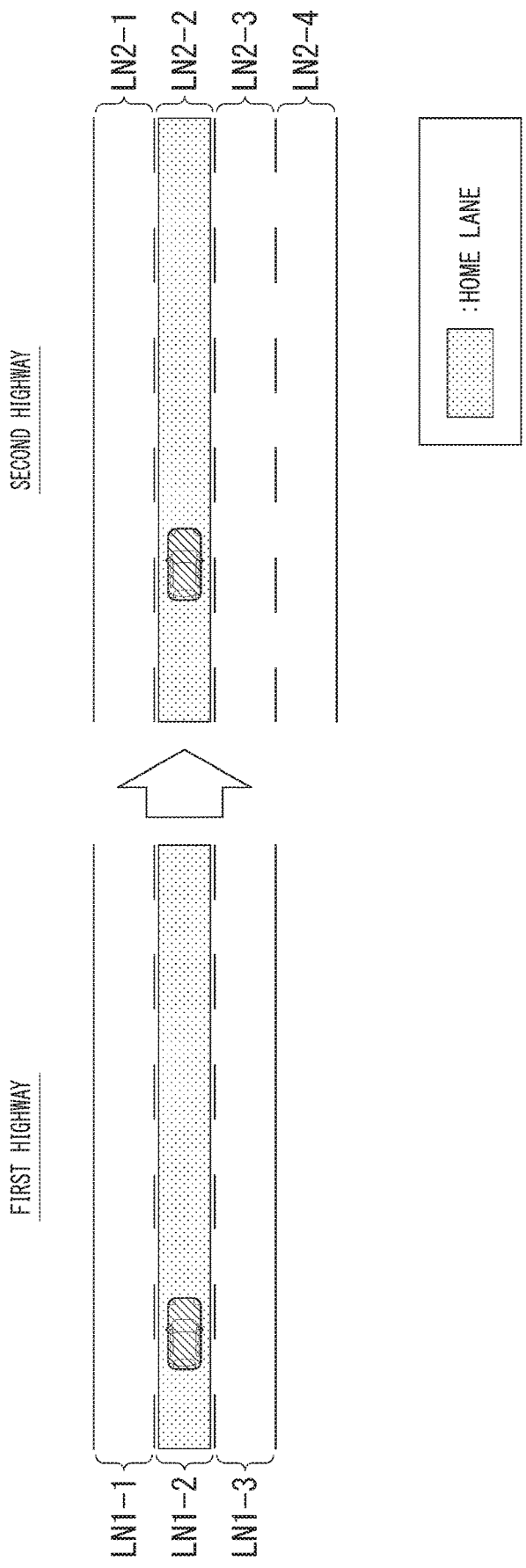
FIG. 39 is a diagram showing an example of a scenario in which the numbers of lanes of the first highway and the second highway do not match.

FIG. 39 is a diagram showing an example of a scenario in which the numbers of lanes of the first highway and the second highway do not match. In the drawing, LN1-1 indicates the first traveling lane of the first highway, LN1-2 indicates the second traveling lane of the first highway, and LN1-3 indicates the passing lane of the first highway. On the other hand, LN2-1 indicates the first traveling lane of the second highway, LN2-2 indicates the second traveling lane of the second highway, LN2-3 indicates the third traveling lane of the second highway, and LN2-4 indicates the passing lane of the second highway.

In the shown example, although the number of lanes of the second highway is larger than the number of lanes of the first highway, the ratio (=4/3) of the number of lanes of the second highway to the number of lanes of the first highway is less than a second threshold value, and these numbers of lanes are not significantly different. In this case, the home lane determiner 180 determines a home lane in the second highway after the degree of correspondence of the relative position of the home lane in the first highway is reduced. Reducing the degree of correspondence means that, for example, when a home lane is determined from among a plurality of lanes included in the second highway, a lane of the second highway with the positional relationship having the same tendency (it need not be exactly the same) as the relative positional relationship of the home lane in the first highway is determined as the home lane. Specifically, when the n-th lane from the first traveling lane LN1-1 is determined as the home lane in the first highway, the home lane determiner 180 determines the n-th lane from the first traveling lane LN2-1 as the home lane in the second highway. In the shown example, in the first highway, the second traveling lane LN1-2 is determined as the home lane. Therefore, also in the second highway, the second traveling lane LN1-2 is determined as the home lane.

Figure 40:
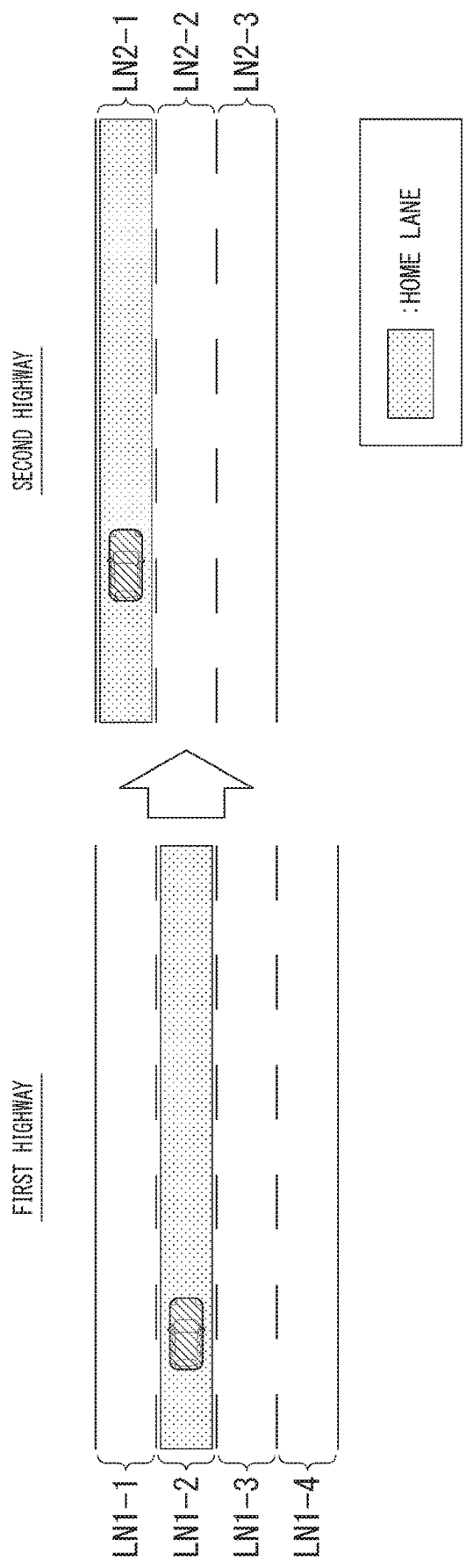
FIG. 40 is a diagram showing another example of the scenario in which the numbers of lanes of the first highway and the second highway do not match.

FIG. 40 is a diagram showing another example of the scenario in which the numbers of lanes of the first highway and the second highway do not match. In the drawing, LN1-1 indicates the first traveling lane of the first highway, LN1-2 indicates the second traveling lane of the first highway, LN1-3 indicates the third traveling lane of the first highway, and LN1-4 indicates the passing lane of the first highway. On the other hand, LN2-1 indicates the first traveling lane of the second highway, LN2-2 indicates the second traveling lane of the second highway, and LN2-3 indicates the passing lane of the second highway.

In the shown example, although the number of lanes of the second highway is fewer than the number of lanes of the first highway, the ratio (=3/4) of the number of lanes of the second highway to the number of lanes of the first highway is equal to or larger than a first threshold value, and these numbers of lanes are not significantly different. In this case, when the n-th lane from the outmost passing lane LN1-4 opposite to the first traveling lane LN1-1 is determined as the home lane in the first highway, the home lane determiner 180 determines the n-th lane from the outmost passing lane LN2-3 opposite to the first traveling lane LN2-1 as the home lane in the second highway. In the shown example, the second traveling lane LN1-2 is determined as the home lane in the first highway. Therefore, in the second highway, the first traveling lane LN1-1 is determined as the home lane.

Figure 41:
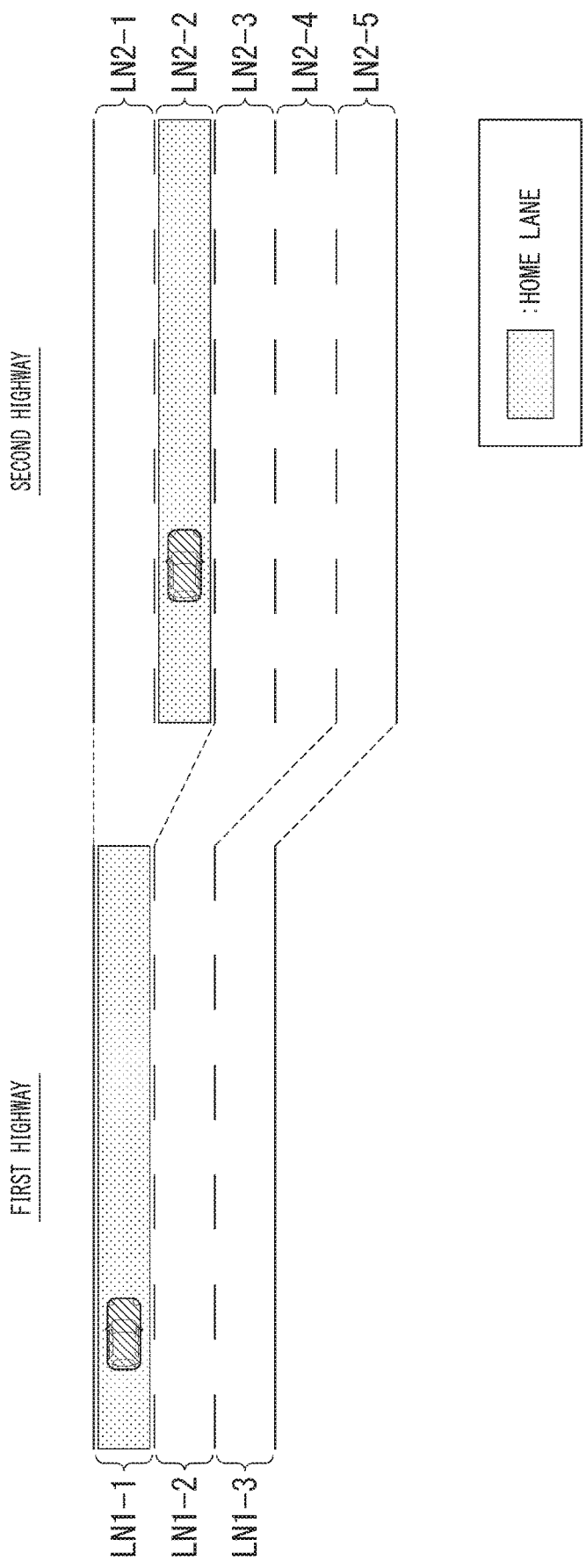
FIG. 41 is a diagram showing another example of the scenario in which the numbers of lanes of the first highway and the second highway do not match.

FIG. 41 is a diagram showing another example of the scenario in which the numbers of lanes of the first highway and the second highway do not match. In the drawing, LN1-1 indicates the first traveling lane of the first highway, LN1-2 indicates the second traveling lane of the first highway, and LN1-3 indicates the passing lane of the first highway. On the other hand, LN2-1 indicates the first traveling lane of the second highway, LN2-2 indicates the second traveling lane of the second highway, LN2-3 indicates the third traveling lane of the second highway, LN2-4 indicates the fourth traveling lane of the second highway, and LN2-5 indicates the passing lane of the second highway.

In the shown example, although the number of lanes of the second highway is larger than the number of lanes of the first highway, the ratio (=5/3) of the number of lanes of the second highway to the number of lanes of the first highway is equal to or larger than a first threshold value, and these numbers of lanes are not significantly different. In this case, the home lane determiner 180 may determine a home lane on the second highway so that a relative position of the home lane of the first highway and a relative position of the home lane of the second highway match with respect to two outermost lanes of the highways. Specifically, the home lane determiner 180 treats the passing lane LN1-3 and the passing lane LN2-5 as being in one-to-one correspondence, the first traveling lane LN1-1 corresponds to the first traveling lane LN2-1 and the second traveling lane LN2-1, and the second traveling lane LN1-2 corresponds to the third traveling lane LN2-3 and the fourth traveling lane LN2-4. In the shown example, in the first highway, the first traveling lane LN1-1 is determined as the home lane. Therefore, the home lane determiner 180 determines one of the first traveling lane LN2-1 and the second traveling lane LN2-1 corresponding to the first traveling lane LN1-1 among a plurality of lanes included in the second highway as the home lane.

When the number of lanes of the second highway is equal to or larger than a threshold value (for example, 5 lanes), the home lane determiner 180 may stop determining the home lane in the second highway based on a relative position of the home lane of the first highway, and perform the process of S208 instead.

[Hardware Configuration]

Figure 42:
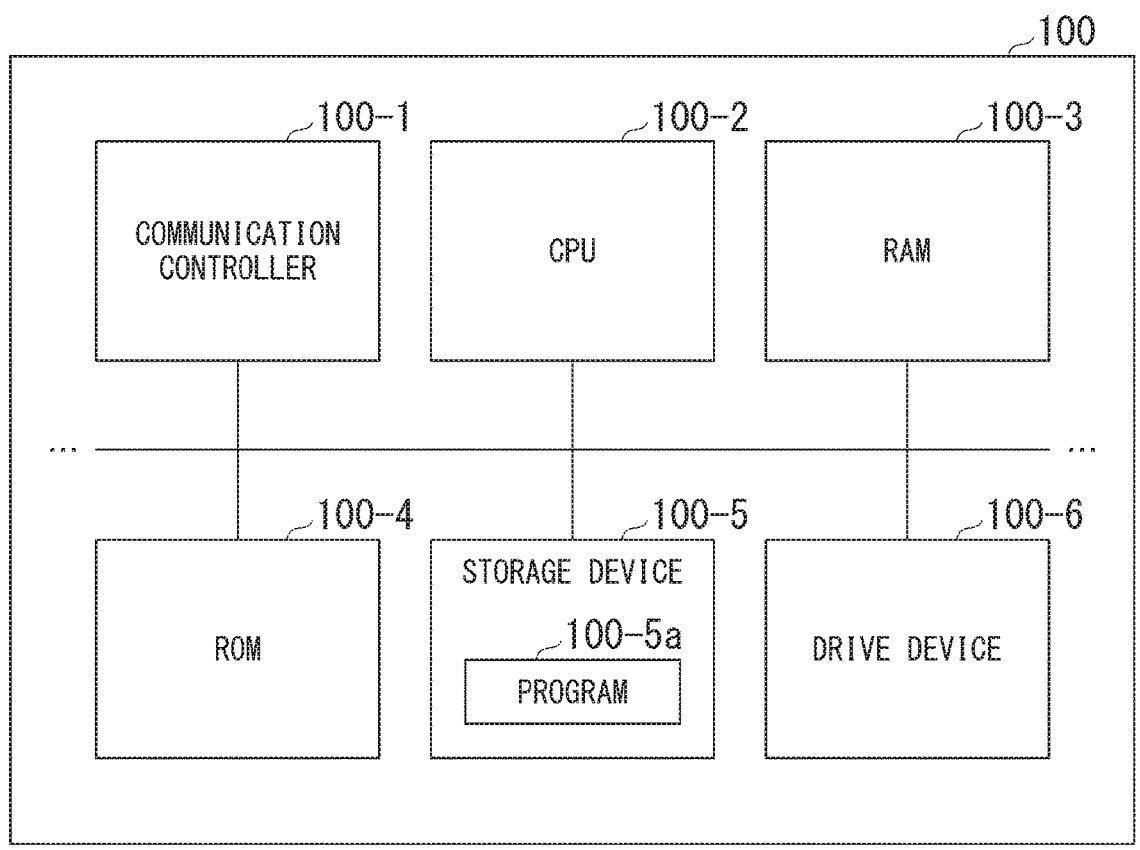
FIG. 42 is a diagram showing an example of a hardware configuration of an automated driving control device according to an embodiment.

FIG. 42 is a diagram showing an example of a hardware configuration of the automated driving control device 100 according to the embodiment. As illustrated, the automated driving control device 100 has a configuration including a communication controller 100-1, a CPU 100-2, a RAM 100-3 used as a working memory, a ROM 100-4 in which a boot program and the like are stored, a storage device 100-5 such as a flash memory and a HDD, a drive device 100-6, and the like which are connected to each other via an internal bus or a dedicated communication line. The communication controller 100-1 communicates with components other than the automated driving control device 100. In the storage device 100-5, a program 100-5*a* that the CPU 100-2 executes is stored. This program is loaded into the RAM 100-3 by a direct memory access (DMA) controller (not shown) or the like and executed by the CPU 100-2. Thereby, some or all of the first controller 120, the second controller 160, and the third controller 170 are realized.

The embodiment described above can be expressed as follows.

A vehicle control device has a configuration including a storage in which a program is stored and a processor, the processor executes the program to perform:

recognizing situations around a vehicle;

determining any of lanes included in a road on which the vehicle travels as a reference lane;

controlling at least one of a speed and steering of the vehicle based on the recognized situations and the determined reference lane; and when the vehicle moves from a first road to a second road different from the first road, among a plurality of lanes included in the first road, based on a relative position of a first reference lane determined at a time before the vehicle moves to the second road with respect to the plurality of lanes, determining a second reference lane on the second road.

While forms for implementing the present invention have been described above with reference to embodiments, the present invention is not limited to the embodiments at all, and various modifications and substitutions can be made without departing from the spirit and scope of the present invention.

What is claimed is:

1. A vehicle control device, comprising:
a recognizer configured to recognize situations around a vehicle;
a determiner configured to determine any of lanes included in a road on which the vehicle travels as a reference lane; and
a driving controller configured to control at least one of a speed and steering of the vehicle according to the situations recognized by the recognizer and the reference lane determined by the determiner,
wherein the determiner is configured to, when the vehicle moves from a first road to a second road different from the first road, among a plurality of lanes included in the first road, according to a relative position of a first reference lane determined at a time before the vehicle moves to the second road with respect to the plurality of lanes, determine a second reference lane on the second road, and
wherein, if the number of lanes of the first road is different from the number of lanes of the second road, when the second reference lane in the second road is determined, the determiner is configured to reduce a degree of correspondence of a relative position of the first reference lane.

2. The vehicle control device according to claim 1, wherein the determiner is configured to determine the second reference lane according to a relative position of the first reference lane when the number of lanes of the first road and the number of lanes of the second road are the same.

3. The vehicle control device according to claim 2, wherein, when the n-th lane out of lanes in one direction among a plurality of lanes included in the first road is determined as the first reference lane, the determiner is configured to determine the n-th lane out of lanes in the one direction among a plurality of lanes included in the second road as the second reference lane.

4. The vehicle control device according to claim 1, wherein, when the number of lanes of the first road is different from the number of lanes of the second road, the determiner is configured to determine the second reference lane according to a relative position of the first reference lane and predetermined regulations applying to the first road and the second road.

5. The vehicle control device according to claim 4, wherein, when the number of lanes of the second road is larger than the number of lanes of the first road and the n-th lane out of lanes determined by the predetermined regulations among a plurality of lanes included in the first road is determined as the first reference lane, the determiner is configured to determine the n-th lane out of lanes determined by the predetermined regulations among a plurality of lanes included in the second road as the second reference lane.

6. The vehicle control device according to claim 4, wherein, when the number of lanes of the second road is fewer than the number of lanes of the first road, and the n-th lane from the outermost lane opposite to the lane determined by the predetermined regulations among a plurality of lanes included in the first road is determined as the first reference lane, the determiner is configured to determine the n-th lane counted from the outermost lane opposite to the lane determined by the predetermined regulations among a plurality of lanes included in the second road as the second reference lane.

7. The vehicle control device according to claim 5, wherein, when a ratio between the number of lanes of the first road and the number of lanes of the second road is equal to or larger than a first threshold value which is smaller than 1 or less than a second threshold value which is larger than 1, the determiner is configured to determine the second reference lane.

8. The vehicle control device according to claim 1, wherein, when a ratio between the number of lanes of the first road and the number of lanes of the second road is less than a first threshold value which is smaller than 1 or equal to or larger than a second threshold value which is larger than 1, the determiner is configured to determine the second reference lane so that a relative position of the first reference lane in the first road and a relative position of the second reference lane in the second road match.

9. The vehicle control device according to claim 1, wherein the determiner is configured to determine the second reference lane according to a relative position of the first reference lane at a position a predetermined distance away from a connection point between the first road and the second road.

10. The vehicle control device according to claim 9, wherein, among the plurality of lanes included in the first road, at the connection point, when a lane connected to a junction connecting the first road and the second road is closer to a lane determined by predetermined regulations than the first reference lane, the determiner is configured to set the predetermined distance to be longer than when the lane connected to the junction is farther from a lane determined by the predetermined regulations than the first reference lane.

11. The vehicle control device according to claim 1, wherein, when a speed at which the vehicle passes along the first road is different from a speed at which the vehicle passes along the second road, the determiner is not configured to determine the second reference lane according to a relative position of the first reference lane.

12. The vehicle control device according to claim 1, wherein, when an entering lane in which the vehicle enters from the first road is different from the second reference lane among a plurality of lanes included in the second road, the driving controller is configured to determine a control mode of a lane change from the entering lane to the second reference lane according to a relative position between the entering lane and the second reference lane.

13. The vehicle control device according to claim 12,
wherein the driving controller is configured to reduce a traveling speed or a traveling distance when lanes are changed from the entering lane to the second reference lane compared to when left-hand traffic regulations are applied to the first road and the second road, when the second reference lane is a lane on the left side of the entering lane, or when the second reference lane is a lane on the right side of the entering lane, and
reduce a traveling speed or a traveling distance when lanes are changed from the entering lane to the second reference lane compared to when a right-hand traffic regulations are applied to the first road and the second road, when the second reference lane is a lane on the right side of the entering lane, or when the second reference lane is a lane on the left side of the entering lane.

14. The vehicle control device according to claim 1, further comprising
a detector configured to detect an instruction to change lanes issued from an occupant of the vehicle,
wherein, when the detector detects the instruction, the driving controller is configured to control a speed and steering of the vehicle, and causes the vehicle to change lanes to the lane instructed by the occupant, and
wherein, when the first reference lane determined at a time before the vehicle moves to the second road is the lane instructed by the occupant, the determiner is configured to determine the second reference lane according to a relative position of the first reference lane.

15. The vehicle control device according to claim 1,
wherein, when the number of lanes of the second road is equal to or larger than a threshold value, the determiner is not configured to determine the second reference lane according to a relative position of the first reference lane.

16. A vehicle control method causing a computer mounted in a vehicle to perform:
recognizing situations around the vehicle;
determining any of lanes included in a road on which the vehicle travels as a reference lane;
controlling at least one of a speed and steering of the vehicle according to the recognized situations and the determined reference lane;
when the vehicle moves from a first road to a second road different from the first road, among a plurality of lanes included in the first road, according to a relative position of a first reference lane determined at a time before the vehicle moves to the second road with respect to the plurality of lanes, determining a second reference lane on the second road; and
if the number of lanes of the first road is different from the number of lanes of the second road, when the second reference lane in the second road is determined, reducing a degree of correspondence of a relative position of the first reference lane.

17. A computer readable non-transitory storage medium storing a program causing a computer mounted in a vehicle to execute:
recognizing situations around the vehicle;
determining any of lanes included in a road on which the vehicle travels as a reference lane;
controlling at least one of a speed and steering of the vehicle according to the recognized situations and the determined reference lane;
when the vehicle moves from a first road to a second road different from the first road, among a plurality of lanes included in the first road, according to a relative position of a first reference lane determined at a time before the vehicle moves to the second road with respect to the plurality of lanes, determining a second reference lane on the second road; and
if the number of lanes of the first road is different from the number of lanes of the second road, when the second reference lane in the second road is determined, reducing a degree of correspondence of a relative position of the first reference lane.

18. A vehicle control device, comprising:
a recognizer configured to recognize situations around a vehicle;
a determiner configured to determine any of lanes included in a road on which the vehicle travels as a reference lane; and
a driving controller configured to control at least one of a speed and steering of the vehicle according to the situations recognized by the recognizer and the reference lane determined by the determiner,
wherein the determiner is configured to, when the vehicle moves from a first road to a second road different from the first road, among a plurality of lanes included in the first road, according to a relative position of a first reference lane determined at a time before the vehicle moves to the second road with respect to the plurality of lanes, determine a second reference lane on the second road, and
wherein, when a ratio between the number of lanes of the first road and the number of lanes of the second road is less than a first threshold value which is smaller than 1 or equal to or larger than a second threshold value which is larger than 1, the determiner is configured to determine the second reference lane so that a relative position of the first reference lane in the first road and a relative position of the second reference lane in the second road match.

19. A vehicle control device, comprising:
a recognizer configured to recognize situations around a vehicle;
a determiner configured to determine any of lanes included in a road on which the vehicle travels as a reference lane; and
a driving controller configured to control at least one of a speed and steering of the vehicle according to the situations recognized by the recognizer and the reference lane determined by the determiner,
wherein the determiner is configured to, when the vehicle moves from a first road to a second road different from the first road, among a plurality of lanes included in the first road, according to a relative position of a first reference lane determined at a time before the vehicle moves to the second road with respect to the plurality of lanes, determine a second reference lane on the second road, and
wherein the determiner is configured to determine the second reference lane according to a relative position of the first reference lane at a position a predetermined distance away from a connection point between the first road and the second road.

20. A vehicle control method causing a computer mounted in a vehicle to perform:
recognizing situations around the vehicle;
determining any of lanes included in a road on which the vehicle travels as a reference lane;

controlling at least one of a speed and steering of the vehicle according to the recognized situations and the determined reference lane;

when the vehicle moves from a first road to a second road different from the first road, among a plurality of lanes included in the first road, according to a relative position of a first reference lane determined at a time before the vehicle moves to the second road with respect to the plurality of lanes, determining a second reference lane on the second road; and when a ratio between the number of lanes of the first road and the number of lanes of the second road is less than a first threshold value which is smaller than 1 or equal to or larger than a second threshold value which is larger than 1, determining the second reference lane so that a relative position of the first reference lane in the first road and a relative position of the second reference lane in the second road match.

21. A vehicle control method causing a computer mounted in a vehicle to perform:

recognizing situations around the vehicle;

determining any of lanes included in a road on which the vehicle travels as a reference lane;

controlling at least one of a speed and steering of the vehicle according to the recognized situations and the determined reference lane;

when the vehicle moves from a first road to a second road different from the first road, among a plurality of lanes included in the first road, according to a relative position of a first reference lane determined at a time before the vehicle moves to the second road with respect to the plurality of lanes, determining a second reference lane on the second road; and determining the second reference lane according to a relative position of the first reference lane at a position a predetermined distance away from a connection point between the first road and the second road.

22. A computer readable non-transitory storage medium storing a program causing a computer mounted in a vehicle to execute:

recognizing situations around the vehicle;

determining any of lanes included in a road on which the vehicle travels as a reference lane;

controlling at least one of a speed and steering of the vehicle according to the recognized situations and the determined reference lane;

when the vehicle moves from a first road to a second road different from the first road, among a plurality of lanes included in the first road, according to a relative position of a first reference lane determined at a time before the vehicle moves to the second road with respect to the plurality of lanes, determining a second reference lane on the second road; and when a ratio between the number of lanes of the first road and the number of lanes of the second road is less than a first threshold value which is smaller than 1 or equal to or larger than a second threshold value which is larger than 1, determining the second reference lane so that a relative position of the first reference lane in the first road and a relative position of the second reference lane in the second road match.

23. A computer readable non-transitory storage medium storing a program causing a computer mounted in a vehicle to execute:

recognizing situations around the vehicle;

determining any of lanes included in a road on which the vehicle travels as a reference lane;

controlling at least one of a speed and steering of the vehicle according to the recognized situations and the determined reference lane;

when the vehicle moves from a first road to a second road different from the first road, among a plurality of lanes included in the first road, according to a relative position of a first reference lane determined at a time before the vehicle moves to the second road with respect to the plurality of lanes, determining a second reference lane on the second road; and determining the second reference lane according to a relative position of the first reference lane at a position a predetermined distance away from a connection point between the first road and the second road.

* * * * *